United States Patent [19]

Yamada et al.

[11] Patent Number: 5,424,969

[45] Date of Patent: Jun. 13, 1995

[54] PRODUCT-SUM OPERATION UNIT

[75] Inventors: Kenji Yamada; Kiichiro Iga; Masaru Sawada, all of Kasugai, Japan

[73] Assignees: Fujitsu Limited, Kanagawa, Japan; Fujitsu VLSI Limited, Aichi, both of Japan

[21] Appl. No.: 13,798

[22] Filed: Feb. 5, 1993

[30] Foreign Application Priority Data

Feb. 5, 1992 [JP] Japan .................................. 4-020312
Feb. 28, 1992 [JP] Japan .................................. 4-043958
Mar. 16, 1992 [JP] Japan .................................. 4-058440
Mar. 19, 1992 [JP] Japan .................................. 4-064147

[51] Int. Cl.⁶ .................................................. G06F 7/00
[52] U.S. Cl. ................................. 364/750.5; 364/736; 395/375
[58] Field of Search ........................... 364/736, 750.5; 395/250, 375, 550

[56] References Cited

U.S. PATENT DOCUMENTS 4,755,965 7/1988 Mary et al. ..................... 395/550

Primary Examiner—Tan V. Mai
Attorney, Agent, or Firm—Staas & Halsey

[57] ABSTRACT

A product-sum operation unit including a multiplying unit, a pipeline register for loading a multiplication result, an adder unit for adding a summand and either an output of the pipeline register or an addend. A timing signal generating unit generates first and second timing signals (T1, T2) that are synchronized with first and second clocks (CK1, CK2). A first instruction latch loads an instruction synchronously with the first timing signal (T1) to output a first control signal. A second instruction latch loads an instruction loaded in the first instruction latch synchronously with the second timing signal (T2) to output the second control signal. A control signal selector outputs the second control signal in response to the first timing signal (T1), and also outputs the first control signal to the adder unit, in response to the second timing signal (T2).

24 Claims, 37 Drawing Sheets

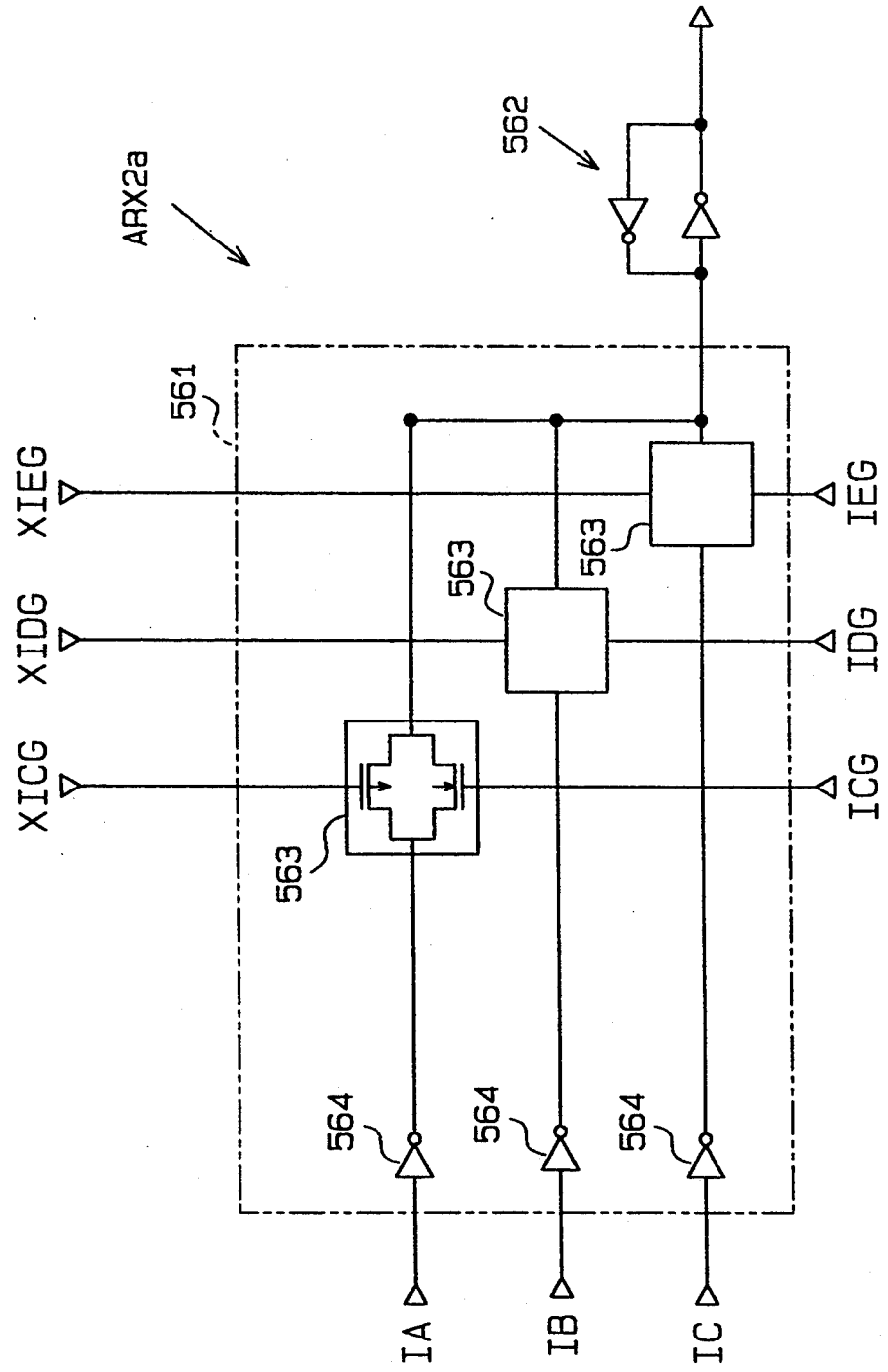

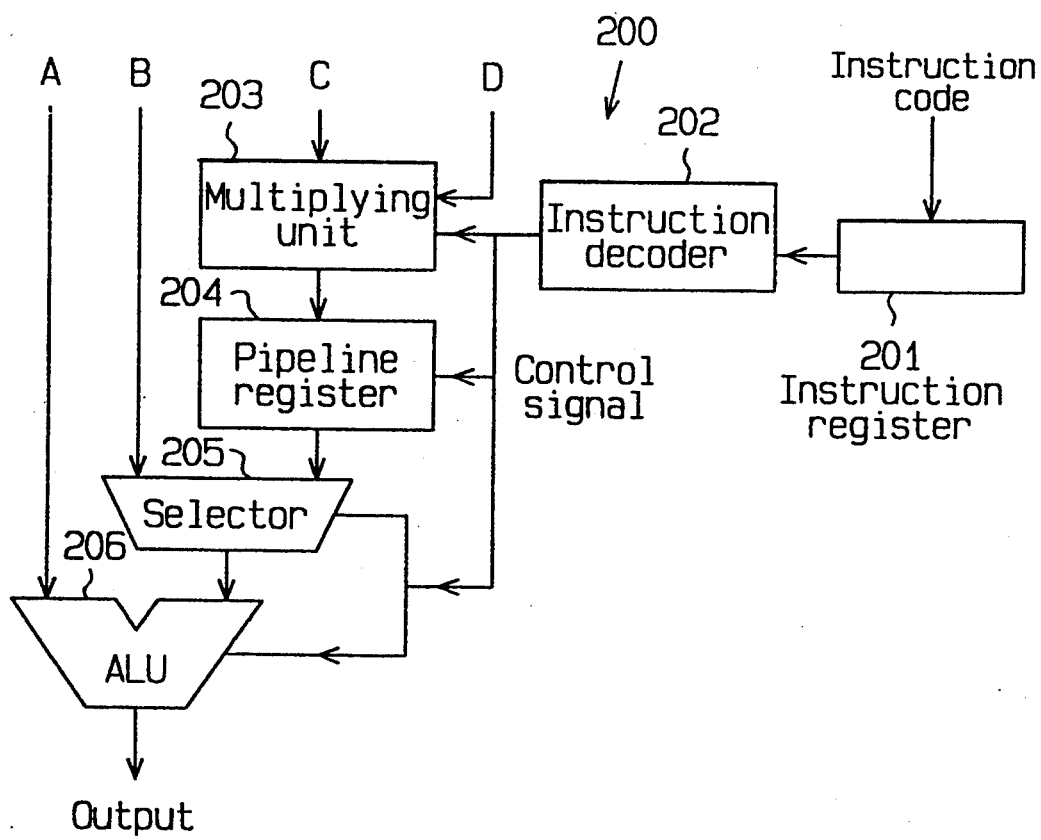

PRODUCT-SUM OPERATION UNIT

BACKGROUND OF THE INVENTION

This application claims the priority of Japanese Patent application Nos. 4-20312 filed Feb. 5, 1992, 4-43958 filed Feb. 28, 1992, 4-58440 filed Mar. 16, 1992 and 4-64147 filed Mar. 19, 1992.

1. Field of the Invention

The present invention relates to a product-sum operation unit included in a variety of processors.

Due to the requirement for high speed operation of computer sytems in recent years, arithmetic operations, particularly high speed product-sum operation is in a high demand. Product-sum operation means the addition of the multiplication result of two numbers (multiplicand and multiplier), to another number (addend). This product-sum operation is an indispensable arithmetic operation for processing, for example, a digital output signal from an analog-to-digital converter. Namely, the product-sum operation is an indispensable arithmetic operation for realizing, for example, the filtering process of a modem (modulator-demodulator) comprising and analog-to-digital converter, or high speed servo control, for the positioning of the read head in a hard disk driver.

Owing to the progress of semiconductor technology in recent years, a high performance product-sum operation unit included in a digital signal processor (DSP) or a micro-controller, etc. As explained above, a product-sum operation unit is now an indispensable element for realizing a variety of communication equipment or high performance control equipment.

2. Description of the Related Art

As a product-sum operation unit, a digital multiplication cumulative adder unit has been proposed in the Japanese Unexamined Laid-Open Provisional Publication SHO 59-194242. This digital multiplication cumulative adder unit is formed by three or four multiplying units, first and second adders, first and second registers and a plurality of multiplexers. Each multiplying unit calculates each partial product by multiplying each partial data of a multiplicand and each partial data of a multiplier. The first and second adders generate a product by adding such partial products. The first register stores the resulting products. The second adder cumulatively adds the values of the first and second registers, and the second register stores the result of such additions. While the second adder cumulatively adds the values of the first and second registers, each multiplying unit calculates the partial products of the multiplicands and multipliers. The first and second adders generate a product by adding the new partial products. The first register stores the resulting products. The second adder cumulative adds the values of first and second registers and the second register stores the result of the addition.

As explained above, a digital multiplication cumulative adder unit realizes high speed multiplication cumulative addition, namely a product-sum operation by introducing a strategic hardware configuration.

However, the product-sum operation of this digital multiplication cumulative adder unit considers the cumulative result, which is stored in the second register, as an addend. Therefore, this digital multiplication cumulative adder unit cannot execute a product-sum operation using a desired number as an addend, and operations other than the product-sum operation, such as the continuous addition of two desired numbers. Therefore, when it is required to form a digital signal processor or microcontroller, etc., by loading this digital multiplication cumulative adder unit, another arithmetic unit which can execute operations other than the product-sum operation is also required. Accordingly, there rises a problem that it is impossible to realize integration of digital signal processor or microcontroller, etc.

A product-sum operation unit for executing a product-sum operation through program control has also been proposed. FIG. 41 illustrates a block diagram of a product-sum operation unit 200, for executing a product-sum operation, with two instructions, a multiplication instruction and an addition instruction. This product-sum operation unit 200 is formed by an instruction register 201, an instruction decoder 202, a multiplying unit 203, a pipeline register 204, a data selector 205 and an adder unit (hereinafter, referred to as ALU) 206. The pipeline register 204 is provided for realizing high speed product-sum operation.

This product-sum operation unit 200 uses a multiplication instruction "C×D →P" and an addition instruction "P+A →A". The multiplication instruction "C×D →P" is used for storing a product of a multiplicand C and a multiplier D in the pipeline register 204. The addition instruction "P+A →A" is used for adding a value stored in the pipeline register 204, namely the multiplication result of the multiplying unit 203, and a number A, and for assigning the resulting sum to the new number A.

As shown in FIG. 42, when the multiplication instruction "C×D →P" is loaded in an instruction register 201 during the first machine cycle Tc1, this multiplication instruction "C×D →P" is decoded into a control signal by the instruction decoder 202. This control signal is outputted to the multiplying unit 203. On the basis of this control signal, the multiplying unit 203 executes the multiplication, and outputs the multiplication result to the pipeline register 204. This multiplication result is loaded into the pipeline register 204 during the next machine cycle Tc2.

When the addition instruction "P+A →A" is loaded into the instruction register 201 during the next machine cycle, this addition instruction "P+A →A" is decoded into a control signal by the instruction decoder 202. This control signal is outputted to the selector 205. On the basis of this control signal, the multiplication result is selected via the pipeline register 204, by the data selector 205.

Thereafter, the addition of the multiplication result and the number A is executed by ALU 206, based on the control signal from the instruction decoder 202. The addition result is the desired product-sum, and is used as a new number A to be added.

However, when a programmer generates a program for executing the product-sum operation, using the product-sum operation unit 200 shown in FIG. 41, with the generation of a program consisting of the multiplication instruction and addition instruction, etc., to recognize the operation of the pipeline register 204, namely recognition of the fact that the desired multiplication result has been stored or not, is required. Namely, as shown in FIG. 42, it must be recognized that a value of the pipeline register 204 of the addition instruction "P+A →A", that is loaded into the instruction register 201 during the machine cycle Tc2, uses a value of the pipeline register 204 of the multiplication instruction "C×D →P", that is loaded into the instruction register 201 during the first machine cycle Tc1. Moreover, in the case of loading the multiplication and addition instructions "C×D →P, P+A →A" to the instruction register 201 during the machine cycle Tc3, it must be recognized that a value of the pipeline register 204 of the addition instruction "P+A →A" must be a value of the pipeline register 204 of the multiplication instruction "C×D →P", that is loaded into the instruction register 201, during the machine cycle Tc2. As explained above, there lies a problem that the generation of a program to operate the product-sum operation unit 200 is a large load for a programmer.

In addition, this product-sum operation unit 200 requires two machine cycles Tc1, Tc2 in order to generate only a result of the product-sum operation, thus causing a problem in the processing speed.

SUMMARY OF THE INVENTION

The present invention has been proposed to overcome the problems described above, and therefore it is an object of the present invention to alleviate the load of the programmer by executing, on the occasion of generating a program by the programmers, the product-sum operations with a product-sum instruction consisting of a single instruction which does not require the operations of the pipeline register to be recognized, and to realize high speed product-sum operations by operating twice an adder unit during a single machine cycle.

A product-sum operation unit of the present invention comprises, as shown in FIG. 1, which illustrates the principle of the present invention, a multiplying unit (1) for calculating a product, by multiplying a multiplier with a multiplicand; and a pipeline register (2) for loading a multiplication result, which is calculated by the multiplying unit (1) and an adder unit (3), for adding a summand and any one of an output of the pipeline register (2), or an addend.

A timing signal generating means (4) generates a first and a second timing signals (T1, T2) that are synchronized with a first and a second clocks (CK1, CK2). A first instruction latch (5) loads an instruction synchronously with the first timing signal (T1) to output a first control signal. A second instruction latch (6) loads an instruction loaded into the first instruction latch (5), synchronously with the second timing signal (T2), to output a second control signal. A control signal selector (7) outputs the second control signal to an adder (3), which is responsive to the first timing signal (T1), and outputs the first control signal to the adder (3), which is responsive to the second timing signal (T2).

It is now also possible to utilize a third timing signal, which is generated synchronously with the first timing signal, and a fourth timing signal, which is generated synchronously with the second timing signal, and to control a control signal selector with the third and fourth timing signals. In this case, it is desirable that the third timing signal be outputted in the same timing as the first timing signal, and the fourth timing signal in the same timing as the second timing signal.

Moreover, it is also possible to utilize a first and a second clocks, as the basic clocks, for controlling the operations of the product-sum operation unit; for outputting the third timing signal in the same timing as the first clock; and for outputting the fourth timing signal in the same timing as the second clock.

In addition, it is also allowed for an adder unit to add a summand and an output of the pipeline register based on the second control signal, and to add a summand and an addend based on the first control signal.

As another embodiment, it is also possible to form a product-sum operation unit comprising a multiplying unit for calculating a product, by multiplying a multiplicand with a multiplier. A pipeline register loads a multiplication result calculated by the multiplying unit. A data selector inputs both an output of the pipeline register and an addend, and selects and output any one of an output of the pipeline register or an addend. An adder unit adds a summand and an output of the data selector. A timing signal generating circuit generates a first timing signal synchronized with a first clock, and a second timing signal synchronized with a second clock, which has the same frequency as, but different phase from the first clock. A second instruction register loads an instruction synchronously with the first timing signal, to output the loaded instruction. A third instruction register loads the instruction sent from the second instruction register synchronously with the second timing signal, to output the loaded instruction. A control signal selector inputs instructions through the second instruction register and third instruction register, and outputs an instruction sent from the third instruction register, in response to the first timing signal and an instruction sent from the second instruction register, in response to the second timing signal. A first instruction decoder decodes the instruction sent through the second instruction register into the multiplying unit control signal, to output the decoded instruction, to the multiplying unit and the pipeline register. A second instruction decoder decodes an instruction outputted from the control signal selector into an ALU control signal, to output the decoded instruction to the data selector and adder unit.

As the other embodiment, it is moreover possible to form a product-sum operation unit comprising a multiplying unit for calculating a product, by multiplying a multiplicand with a multiplier. A pipeline register loads a multiplication result calculated by the multiplying unit. A data selector inputs both an output of the pipeline register and an addend, and selects and outputs any one of an output of the pipeline register or an addend. An adder unit adds a summand and an output of data selector. A timing signal generating circuit generates a first timing signal synchronized with a first clock, and a second timing signal synchronized with a second clock, which has the same frequency as, and a different phase from the first clock. A second instruction register loads an instruction synchronously with the first timing signal, to output the loaded instruction. A third instruction decoder decodes an instruction sent from the second instruction register into a control signal, to output the decoded instruction to the multiplying unit and pipeline register, a control signal latch for loading the control signal outputted from the third instruction decoder, synchronously with the second timing signal, in order to output the loaded control signal. A control signal selector inputs the control signal outputted from the third instruction decoder and the control signal sent through the control signal latch; selects the control signal sent through the control signal latch, in response to the first timing signal; and selects the control signal outputted from the third instruction decoder in response to the second timing signal and outputs the selected control signal to the data selector and adder unit.

Moreover, as the further embodiment, it is possible to form a product-sum operation unit comprising a multiplying unit for calculating a product by multiplying a multiplicand with a multiplier. A pipeline register loads a multiplication result calculated by the multiplying unit. A data selector inputs both an output of the pipeline register and an addend, and selects and outputs any one of an output of the pipeline register or an addend. An adder unit adds a summand and an output of data selector. A state counter outputs a state signal by counting the first clock and also outputs a state signal, by counting the second clock having the same frequency as, and different phase from the first clock. A fourth instruction decoder decodes input instructions into the control signals, to output to the multiplying unit and to the pipeline register, and also to output the control signal when the number of cycles required for the execution of the instruction code is matched with each state signal. A logic circuit generates a first timing signal synchronized with the first clock, and a second timing signal synchronized with the second clock on the basis of the control signals and the first and second clocks. A second instruction register loads an instruction synchronously with the first timing signal, to output the loaded instruction to the fourth instruction decoder. A third instruction register loads the instruction sent through the second instruction register synchronously with the second timing signal, to output the loaded instruction. A fifth instruction decoder decodes and outputs the instruction sent through the third instruction register into an ALU control signal. An ALU control signal output circuit inputs a control signal outputted from the fourth instruction decoder, and a control signal outputted from the fifth instruction decoder, to select the control signal from the fifth instruction decoder based on the first clock, to select the control signal outputted from the fourth instruction decoder based on the second clock, and to output the selected control signal to the data selector and adder unit.

In this case, the logic circuit could include a first AND circuit for generating a first timing signal that is synchronized with the first clock, based on any one of the control signals, and any one of the first and second clocks. The logic circuit could also include a second AND circuit for generating a second timing signal synchronized with the second clock, based on the other control signal and the other clock signal.

Moreover, the first AND circuit is preferably a NAND circuit, for generating the fist timing signal synchronized with the first clock, based on the control signals and the second clock, while the second AND circuit is preferably a NAND circuit for generating the second timing signal synchronized with the second clock based on the control signals and the first clock.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments, together with the accompanying drawings, in which:

FIG. 40 is a diagram illustrating a buffer register AXR2, employed in yet another embodiment according to the present invention;

FIG. 41 is a block diagram illustrating a conventional device; and

FIG. 42 is a timing chart illustrating the operation of the conventional device of FIG. 41.

DESCRIPTION OF THE PREFERRED EMBODIMENTS

A first embodiment of a digital signal processor according to the present invention will be explained in detail, with reference to FIGS. 2 to 5.

Figure 1:
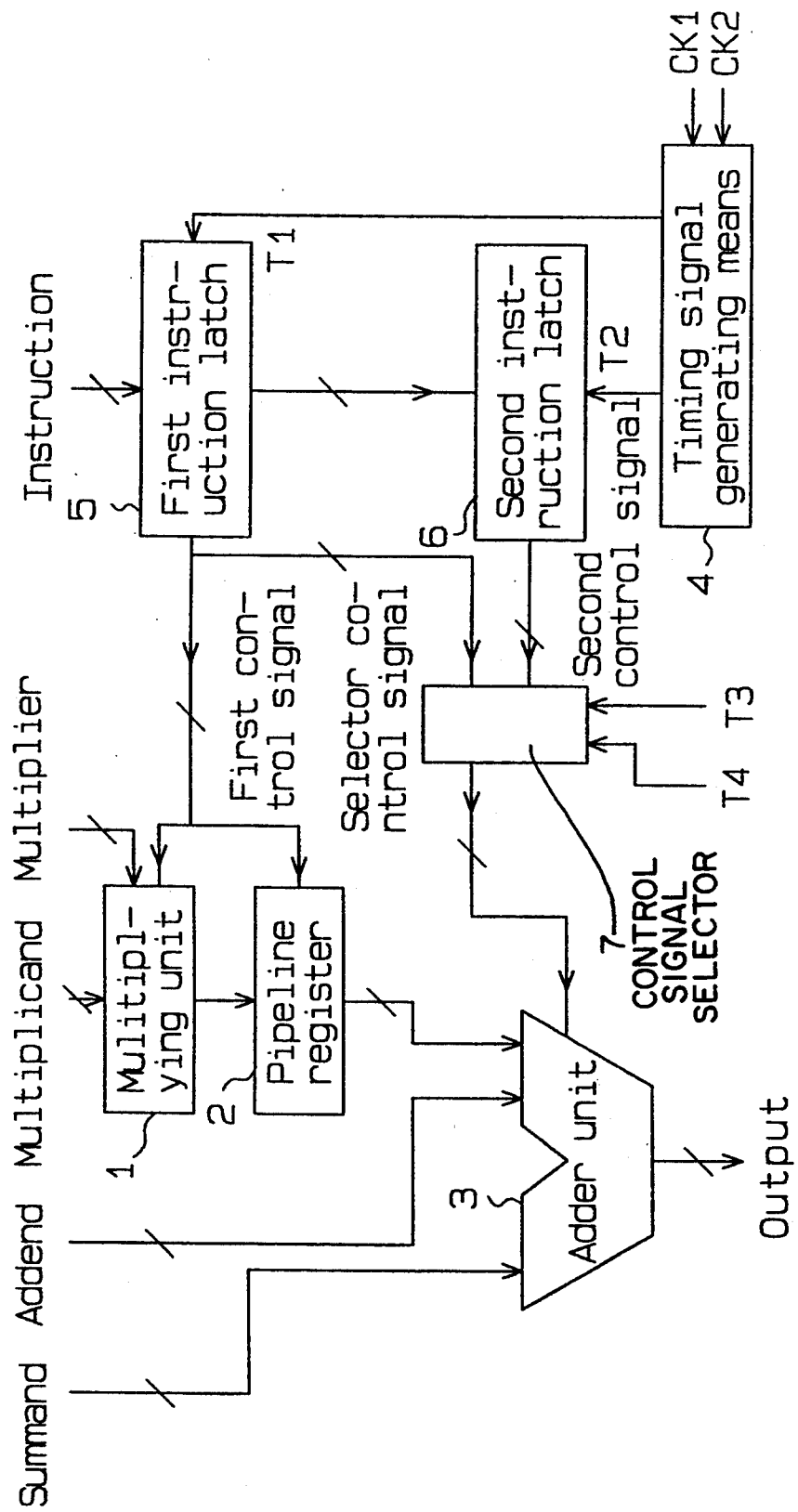
FIG. 1 is a block diagram for explaining the principle disclosed in the present invention.
Figure 2:
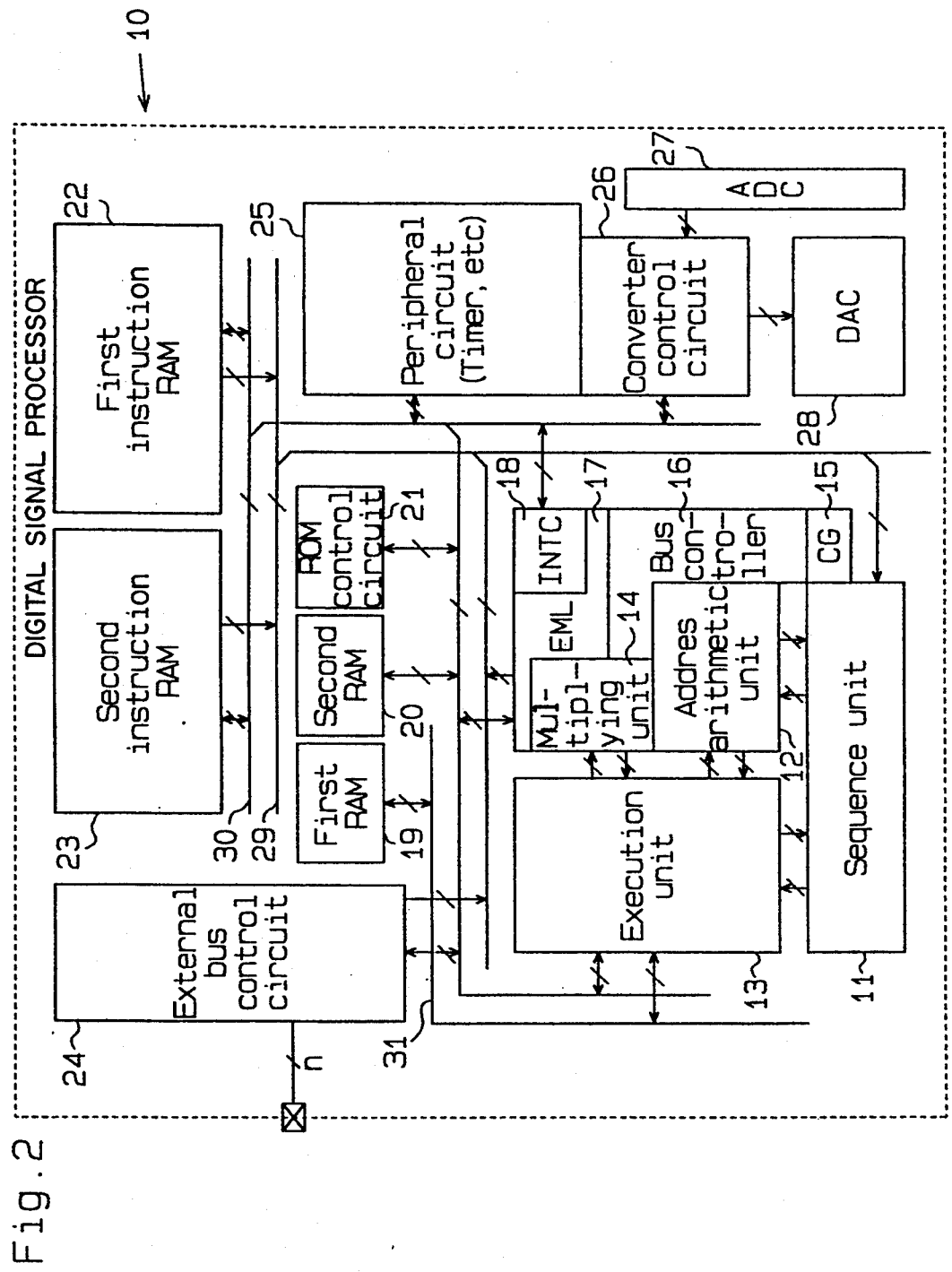
FIG. 2 is a layout diagram illustrating an embodiment of a DSP to which the present invention is applied.

As shown in FIG. 2, a digital signal processor (DSP) 10 comprises a sequence unit 11, an execution unit 13, a multiplying unit 14, a clock generator (CG) 15, a bus controller 16, an emulator interface (EML) 17, an interrupt controller (INTC) 18, a first RAM 19, a second RAM 20, a ROM control circuit 21, first and second instruction RAMs 22, 23, an external bus control circuit 24, a peripheral circuit 25 such as a timer, a converter control circuit 26, an analog-to-digital converter (ADC) 27, a digital-to-analog converter (DAC) 28, an instruction bus 29 and data buses 30, 31.

The instruction bus 29 mutually connects the sequence unit 11, the emulator interface (EML) 17, the first and second instruction RAM 22, 23, and the external bus control circuit 24. The data bus 30 mutually connects the execution unit 13, the INTC 18, the second RAM 20, the ROM control circuit 21, the first and second instruction RAMs 22, 23, the external buss control circuit 24, the peripheral circuit 25, and the converter control circuit 26. The data bus 31 mutually connects the execution unit 13 and the first RAM 19.

The clock generator 15 generates a first machine clock CK1, with a 50% duty ratio, which changes in the predetermined period, and a second machine clock CK2, which is delayed by half a cycle from the first machine clock CK1. In this embodiment, the clock generator 15 generates the first and second machine clocks CK1, CK2, having a period of 40 ns, namely the frequency of 25 Mhz. The clock generator 15 supplies the first and second machine clocks CK1, CK2 to each part of the DSP 10.

The first and second instruction RAMs 22, 23 store programs. These stored programs are transferred through the instruction bus 29 or data bus 30, for use as instruction code or data.

ADC 27 converts an analog input signal to a digital signal, to output the digital signal to the converter control circuit 26. The converter control circuit 26 transfers the digital signal inputted from the ADC 27 through the data bus 30. Moreover, the converter control circuit 26 outputs the digital signal that is inputted via the data bus 30, to the DAC 28. The DAC 28 converts a digital signal inputted from the converter control circuit 26, into an analog signal, and outputs it.

Figure 3:
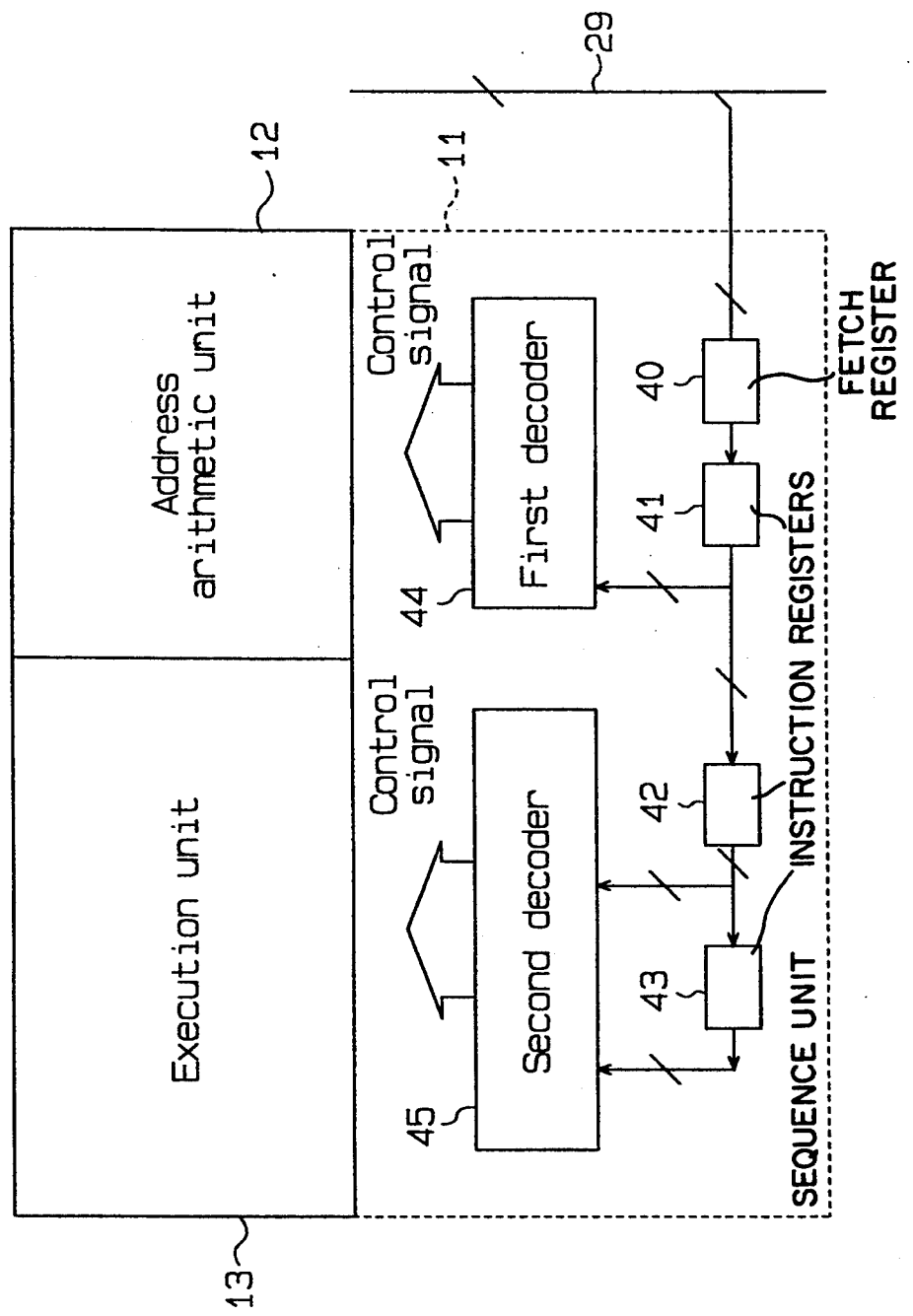
FIG. 3 is a block diagram illustrating a sequence unit.

The sequence unit 11 comprises, as shown in FIG. 3, a fetch register 40, a first instruction register 41, a second instruction register 42 as a first instruction latch, a third instruction register 43 as a second instruction latch, and first and second decoders 44, 45, etc. The fetch register 40 is connected to the instruction bus 29. The first to third instruction registers 41, 42, 43 are connected, in this sequence, to the fetch register 40. The fetch register 40 fetches an instruction code, that is transferred via the instruction bus 29 on the basis of the predetermined latch signal. The first to third instruction registers 41 to 43, respectively load the outputs of the registers in the preceding stage, on the basis of the predetermined latch signals.

A first decoder 44 is connected to a first instruction register 41. This decoder 44 decodes an instruction code outputted from the first instruction register 41 into a control signal, and outputs this control signal to the address arithmetic unit 12. The address arithmetic unit 12 calculates an address for access depending on the control signal sent from the first decoder 44.

A second decoder 45 is connected to a second and a third instruction registers 42, 43. The second decoder 45 decodes each instruction code outputted from the second and third instruction registers 42, 43, and outputs the control signal to the execution unit 13.

Figure 4:
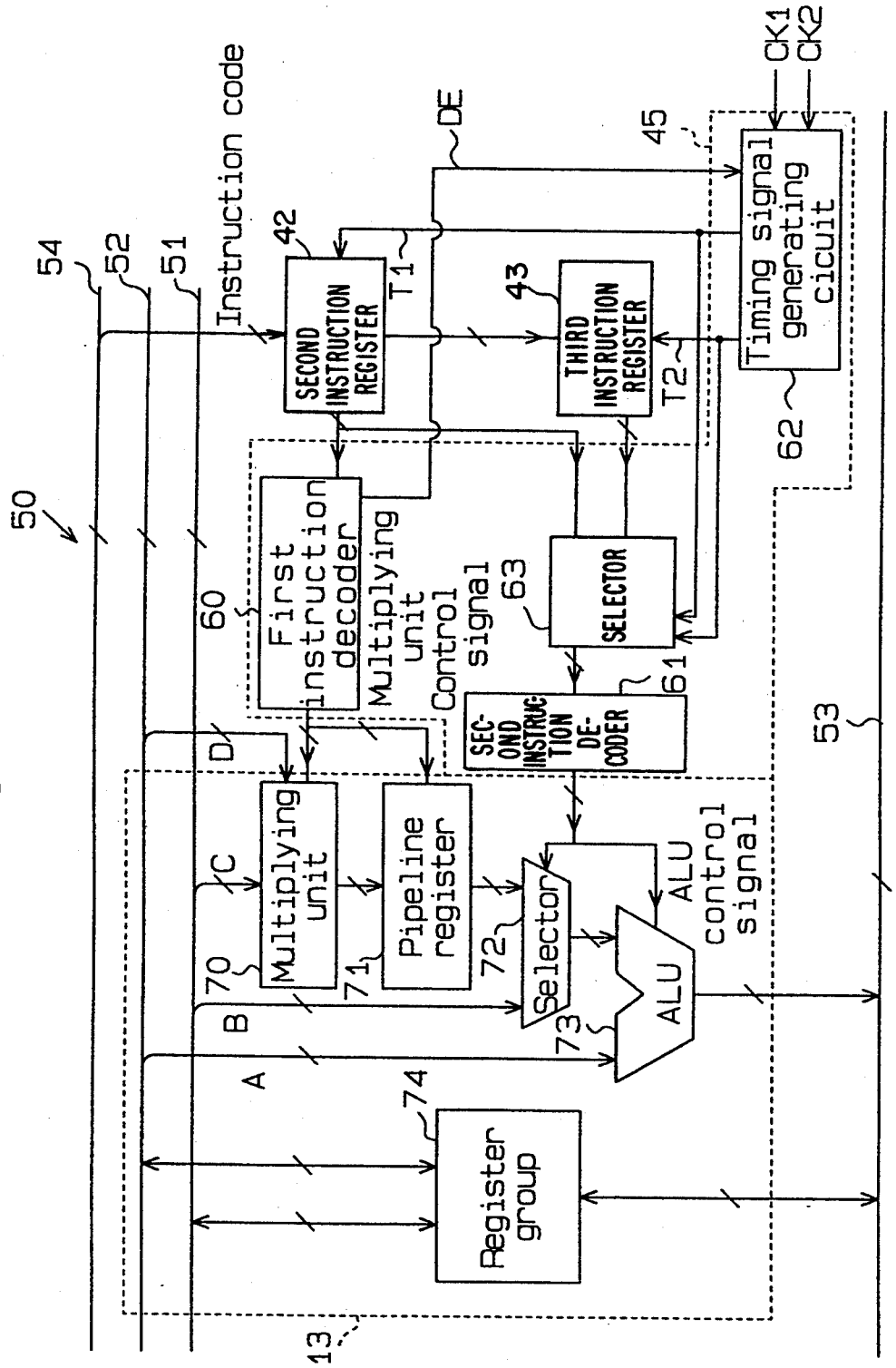
FIG. 4 is a block diagram illustrating a product-sum operation unit, according to a first embodiment, formed by a part of the sequence unit and an execution unit.

As shown in FIG. 4, a product-sum operation unit 50 of the present invention comprises second and third instruction registers 42, 43, a second decoder 45, an execution unit 13, data buses 51 to 53, and an instruction bus 54 connected to the instruction bus 29, etc.

The second decoder 45 comprises first and second instruction decoders 60, 61, a timing signal generating circuit 62, and a control signal selector 63. The execution unit 13 comprises a multiplying unit 70, a pipeline register 71, a data selector 72, an adder unit (ALU) 73, and a register group 74.

Figure 5:
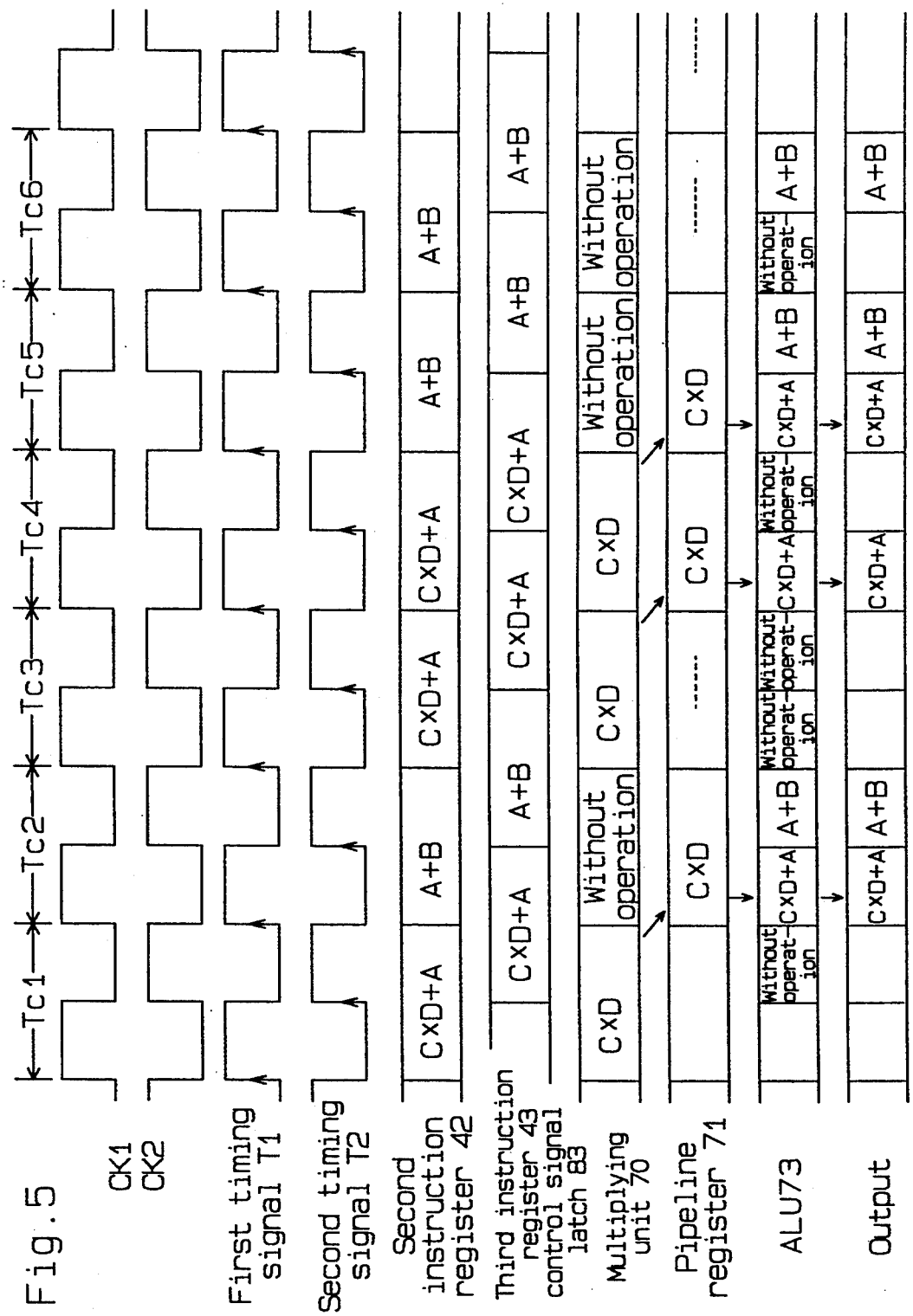
FIG. 5 is a timing chart illustrating the operation of a product-sum operation unit, according to a first embodiment.

The timing signal generating circuit 62 inputs a decoded signal DE of a first instruction decoder 60, and also inputs first and second machine clocks CK1, CK2. The timing signal generating circuit 62 generates, based on the decoded signal DE of the first instruction decoder 60, the first timing signal T1 which is synchronized with the starting point of the machine cycles Tc1 to Tc6, and the second timing signal T2 which is delayed by half a cycle from the first timing signal T1, as shown in FIG. 5. Moreover, the timing signal generating circuit 62 outputs the first timing signal T1 to the second instruction register 42 and the control signal selector 63, and also outputs the second timing signal T2 to the third instruction register 43 and the control signal selector 63.

The second instruction register 42 loads each instruction code inputted via the instruction bus 54, depending on the rising edge of the first timing signal T1. The second instruction register 42 then outputs the loaded instruction code to the first instruction decoder 60, and control signal selector 63. The first instruction decoder 60 decodes the input instruction code into a multiplying unit control signal, and then outputs the multiplying unit control signal to the multiplying unit 70 and the pipeline register 71.

The third instruction register 43 loads an instruction loaded in the second instruction register 42, at the rising edge of the second timing signal T2, and outputs this instruction code to the control signal selector 63. Accordingly, the instruction code loaded in the second instruction register 43 is delayed by half a cycle of each machine cycle Tc1 to Tc6, from the instruction code loaded in the second instruction register 42.

The control signal selector 63 selects the instruction code outputted from the third instruction register 43, in response to the first timing signal T1, and outputs the instruction code to the second instruction decoder 61. Moreover, the control signal selector 63 selects the instruction code outputted from the second instruction register 42, in response to the second timing signal T2, and outputs the instruction code to the second instruction decoder 61. Namely, at the former half cycle of each machine cycle Tc1 to Tc6, the control signal selector 63 selects the instruction code from the third instruction register 43, and selects and outputs the instruction code from the second instruction register 42 in the latter half cycle of each machine cycle Tc1 to Tc6. The second instruction decoder 61 decodes the instruction code input, and outputs the ALU control signal to the data selector 72 and to the ALU 73.

The multiplying unit 70 inputs a multiplicand C and a multiplier D via the data buses 51, 52. The multiplying unit 70 calculates a product, by multiplying the multiplicand C with the multiplier D, when the multiplying unit control signal, from the first instruction decoder 60, is based on the multiplication instruction or the product-sum instruction. The pipeline register 71 also loads an output of the multiplying unit 70 based on the multiplying unit control signal from the first instruction decoder 60, and outputs a multiplication result to the data selector 72 in the next stage.

The data selector 72 inputs an output of the pipeline register 71, and also inputs an addend B, via the data bus 71. The data selector 72 also selects any one of an output from the pipeline register 71, or a first addend B, and then outputs it to the ALU 73, in response to the ALU control signal outputted from the second instruction decoder 61. Namely, the data selector 72 selects the addend B, when the ALU control signal is inputted, based on the instruction code of the second instruction register 42, or selects the output of the pipeline register 71, namely the multiplication result, and then outputs the instruction code to the ALU 73, when the ALU control signal is inputted based on the instruction code of the third instruction register 43.

The ALU 73 inputs an output of the data selector 72, namely an output of the pipeline register 71, or an addend B, and also inputs a summand A, via the data bus 52. The ALU 73 adds the summand A and an output of the pipeline register 71 or addend B, based on the ALU control signal outputted from the second instruction decoder 61. Namely, the ALU 73 adds the addend B and the summand A, when the ALU control signal is inputted based on the instruction code of the second instruction register 42. Alternatively, the ALU 73 adds an output of the pipeline register 71 and the summand A, when the ALU control signal is inputted based on the instruction code of the third instruction register 43.

An addition result by the ALU 73 is transferred to the register group 74, via the data bus 53. The register group 74 outputs the multiplicand C, multiplier D, addend B, and summand A, via the data buses 51, 52. Here, it is assumed that the product-sum operation unit 50, described above, uses the product-sum instruction "C×D+A" and the addition instruction "A+B". The product-sum instruction "C×D+A" means that a summand A is added to a product of a multiplicand C and a multiplier D. The addition instruction "A+B" means addition of an addend B transferred via the data buses 51, 52 and a summand A.

As shown in FIG. 5, when the product-sum instruction "C×D+A" is inputted in the first machine cycle Tc1, this product-sum instruction is loaded in the second instruction register 42 synchronously with the first timing signal T1, which is outputted from the timing signal generating circuit 62. The product-sum instruction loaded in the second instruction register 42 is outputted to the first instruction decoder 60, the third instruction register 43 and the control signal selector 63. This product-sum instruction is decoded to the multiplying unit control signal by the first instruction decoder 60, and is then outputted to the multiplying unit 70 and the pipeline register 71.

Since this multiplying unit control signal triggers the product-sum operation, the multiplication of the multiplicand C and the multiplier D is executed by the multiplying unit 70, during the machine cycle Tc1. This multiplication result is loaded in the pipeline register 71 during the next machine cycle Tc2, based on the multiplying unit control signal.

When the second timing signal T2 is outputted from the timing signal generating circuit 62 during the machine cycle Tc1, the product-sum instruction "C×D+A" that is outputted from the second instruction register 42, is loaded in the third instruction register 43 synchronously with this second timing signal T2, and this product-sum instruction is outputted to the control signal selector 63. In this timing, the control signal selector 63 selects the instruction code of the second instruction register 42, based on the second timing signal T2. It is then decoded to the ALU control signal by the second instruction decoder 61, and is then outputted to the data selector 72. In this case, since the multiplication result is not yet loaded to the pipeline register 71, the ALU 73 does not operate.

When the addition instruction "A+B" is inputted in the second machine cycle Tc2, this addition instruction is loaded in the second instruction register 42 synchronously with the first timing signal T1. The addition instruction loaded in the second instruction register 42 is outputted to the first instruction decoder 60, the third instruction register 43, and the control signal selector 63. This addition instruction is decoded by the first instruction decoder 60, and is then outputted to the multiplying unit 70 and the pipeline register 71, as the multiplying unit control signal. However, this multiplying unit control signal is the addition instruction, and therefore the multiplying unit 70 does not operate.

In the machine cycle Tc2, the instruction code of the product-sum instruction of the third instruction register 43 is selected by the control signal selector 63, depending on the first timing signal T1. The instruction code of this product-sum instruction is decoded into the ALU control signal by the second instruction decoder 61, and is then outputted to the data selector 72 and the ALU 73. Thereby, the multiplication result "C×D" loaded in the pipeline register 71 is selected by the data selector 72, and this multiplication result is outputted to the ALU 73. This multiplication result is added to the summand A by the ALU 73 to obtain the product-sum. The obtained product-sum result is stored in the register group 74, via the data bus 53.

In the machine cycle Tc2, when the second timing signal T2 is outputted from the timing signal generating circuit 62, the addition instruction "A+B" that is outputted from the second instruction register 42, is loaded in the third instruction register 43, synchronously with the second timing signal T2. This addition instruction is outputted to the control signal selector 63. In this case, the instruction code of the addition instruction of the second instruction register 42 is selected by the control signal selector 63, depending on the second timing signal T2. This addition instruction is decoded into the ALU control signal by the second instruction decoder 61, and is then outputted to the data selector 72. Thereby, the addend B is selected by the data selector 72, and is then outputted to the ALU 73. This addend B is added to the summand A by the ALU 73. The obtained addition result is stored in the register group 74, via the data bus 53.

When the product-sum instruction "C×D+A" is inputted in the third machine cycle Tc3, this product-sum instruction is loaded in the second instruction register 42, synchronously with the first timing signal T1. The product-sum instruction loaded in the second instruction register 42 is then outputted to the first instruction register 60, the third instruction register 43, and the control signal selector 63. This product-sum instruction is decoded into the multiplying unit control signal, by the first instruction decoder 60, and is then outputted to the multiplying unit 70 and the pipeline register 71.

Since this multiplying unit control signal triggers the product-sum operation, the multiplication of the summand C and the multiplier D is executed in the machine cycle Tc3. In this case, the product-sum operation result based on the product-sum instruction in the machine cycle Tc1, and the addition result based on the addition instruction in the machine cycle Tc2, are respectively defined at the end of the machine cycle Tc2. Therefore, the multiplication result of the machine cycle Tc1, or the addition result of the machine cycle Tc2, could be used as a summand C or a multiplier D of the product-sum instruction in the machine cycle Tc3. The multiplication result in the machine cycle Tc3 is loaded in the pipeline register 71 in the next machine cycle Tc4, in response to the multiplying unit control signal.

Moreover, in the machine cycle Tc3, the product-sum instruction "C×D+A" outputted from the second instruction register 42 is loaded in the third instruction register 43, synchronously with the second timing signal T2. This product-sum instruction is then outputted to the control signal selector 63. In this case, the instruction code of the addition instruction of the second instruction register 42 is selected by the control signal selector 63, depending on the second timing signal T2, and is then decoded to the ALU control signal by the second instruction decoder 61, and outputted to the date selector 72. In this timing, since the multiplication result is not yet loaded in the pipeline register 71, the ALU 73 does not operate.

When the product-sum instrction "C×D+A" is inputted in the fourth machine cycle Tc4, this product-sum instruction is loaded in the second instruction register 42 synchronously with the first timing signal T1. The product-sum instruction loaded in the second instruction register 42 is outputted to the first instruction decoder 60, the third instruction register 43, and the control signal selector 63. This product-sum instruction is decoded to the multiplying unit control signal by the first instruction decoder 60, and is then outputted to the multiplying unit 70 and the pipeline register 71.

Since this multiplying unit control signal triggers the product-sum operation, the multiplication of the summand C and the multiplier D is executed by the multiplying unit 70 in the machine cycle Tc4. In this case, the product-sum result based on the product-sum instruction of the machine cycle Tc3 is not defined at the ending time of the machine cycle Tc3. Therefore, the summand C and the multiplier D of the product-sum instruction in the machine cycle Tc4, have new values that are not related to the multiplication result of the machine cycle Tc3. The multiplication result in the machine cycle Tc4 is loaded in the pipeline register 71 in the next machine cycle Tc5, depending on the multiplying unit control signal.

In the machine cycle Tc4, the instruction code of the product-sum instruction of the third instruction register 43 is selected by the control signal selector 63, based on the first timing signal T1, and is then decoded to the ALU control signal by the second instruction decoder 61. It is then outputted to the data selector 72 and the ALU 73. Thereby, the multiplication result "C×D" loaded in the pipeline register 71 is selected by the date selector 72 and is then outputted to the ALU 73. This multiplication result is added to a summand A by the ALU 73, to obtain a product-sum based on the product-sum instruction in the machine cycle Tc3. The obtained product-sum result is stored in the register group 74 via the date bus 53.

In the machine cycle Tc4, the product-sum instruction "C×D+A" outputted from the second instruction register 42 is loaded in the third instruction register 43, synchronously with the second timing signal T2. This product-sum instruction is outputted to the control signal selector 63. In this case, the instruction code of the product-sum instruction of the second instruction register 42 is selected by the control signal selector 63, depending on the second timing signal T2, and is then decoded to the ALU control signal by the second instruction decoder 651, and outputted to the data selector 72. In this timing, since a new multiplication result is not loaded in the pipeline register 71, the ALU 73 does not operate.

When the addition instruction "A+B" is inputted in the fifth machine cycle Tc5, this addition instruction is loaded in the second instruction register 42, synchronously with the first timing signal T1. The addition instruction loaded in the second instruction register 42 is outputted to the first instruction decoder 60, the third instruction register 43 and the control signal selector 63. This addition instruction is decoded by the first instruction decoder 60, and is then outputted as the multiplying unit control signal to the multiplying unit 70 and to the pipeline register 71. However, this multiplying unit control signal is the addition signal, and therefore the multiplying unit 70 does not operate.

In the machine cycle Tc5, the instruction code of the product-sum instruction of the third instruction register 43 is selected by the control signal selector 63, based on the first timing signal T1. The instruction code of this product-sum instruction is decoded to the ALU control signal by the second instruction decoder 61, and is then outputted to the data selector 72 and the ALU 73. Thereby, the multiplication result "C×D" loaded in the pipeline register 71 is selected by the data selector 72, and this multiplication result is outputted to the ALU 73. This multiplication result is added to the summand A by the ALU 73, to obtain a product-sum based on the product-sum instruction in the machine cycle Tc4. The obtained product-sum result is stored in the register group 74 via the data bus 53.

In the machine cycle Tc5, the addition instruction "A+B" which is outputted from the second instruction register 42, is loaded in the third instruction register 43, synchronously with the second timing signal T2. This addition instruction is outputted to the control signal selector 63. In this case, the instruction code of the addition instruction of the second instruction register 42 is selected by the control signal selector 63, based on the second timing signal T2, and is then decoded to the ALU control signal by the second instruction decoder 61, and outputted to the data selector 72. Thereby, the addend B is selected by the data selector 72, and is then outputted to the ALU 73. This addend B is added to the summand A by the ALU 73. The obtained addition result is stored in the register group 74 via the data bus 53.

Moreover, in the sixth machine cycle Tc6, when the addition instruction "A+B" is inputted, this addition instruction is loaded in the second instruction register 42, synchronously with the first timing signal T1. The addition instruction loaded in the second instruction register 42 is outputted to the first instruction decoder 60, the third instruction register 43, and the control signal selector 63. This addition instruction is decoded by the first instruction decoder 60, and then outputted as the multiplying unit control signal to the multiplying unit 70 and the pipeline register 71. However, since this multiplying unit control signal is the addition instruction, the multiplying unit 70 does not operate.

In the machine cycle Tc6, the instruction code of the addition instruction of the third instruction register 43 is selected by the control signal selector 63, based on the first timing signal T1. The instruction code of this addition instruction is decoded by the second instruction decoder 61 into the ALU control signal, and is then outputted to the data selector 72 and the ALU 73. However, since this addition instruction is already executed in the latter half of the machine cycle Tc5, the ALU 73 does not operate.

When the second timing signal T2 is outputted from the timing signal generating circuit 62 in the machine cycle Tc6, the addition instruction "A+B" outputted from the second instruction register 42 is loaded in the third instruction register 43, synchronously with the second timing signal T2. This addition instruction is outputted to the control signal selector 63. In this case, the instruction code of the addition instruction of the second instruction register 42 is selected by the control signal selector 63, based on the second timing signal T2. This addition instruction is decoded into the ALU control signal by the second instruction decoder 61, and is then outputted to the data selector 72. Thereby, the addend B is selected by the data selector 72, and is then outputted to the ALU 73. This addend B is added to the summand A by the ALU 73. In this case, the addition result, based on the addition instruction in the machine cycle Tc5, is defined at the ending time of the machine cycle Tc5. Therefore, the addition result in the machine cycle Tc5 could be used as the summand A or addend B of the addition instruction of the machine cycle Tc6. The obtained addition result is stored in the register group 74, via the data bus 53.

As explained above, this embodiment comprises, in the design stage, a pipeline register 71 within the product-sum operation unit 50, and also comprises second and third instruction registers 42, 43, a first instruction decoder 60 for outputting a multiplying unit control signal, in order to control a multiplying unit 70, and the pipeline register 71, and a second instruction decoder 61 for outputting an ALU control signal, in order to control a data selector 72 and the ALU 73. Therefore, it is possible for the product-sum operation unit 50 to execute the product-sum operation with the product-sum instruction consisting of a single instruction. As a result, when a programmer generates a program for controlling the product-sum operation unit 50, it is no longer necessary to recognize operations of the pipeline register 71 and thereby the load of the programmer can be alleviated.

In this embodiment, the timing signal generating circuit 62 generates a first timing signal T1 that is synchronized with the starting time of the first machine cycle CK1, and a second timing signal T2 that is synchronized with the starting time of the second machine cycle CK2, namely delayed by half a cycle of the machine cycle, from the first timing signal T1. The instruction code is loaded in the second instruction register 42, depending on the first timing signal T1, and the instruction code is loaded, after a delay time of a half cycle of the machine cycle, in the third instruction register 43, based on the second timing signal T2. The control signal selector 63 selects the instruction code of the third instruction register 43, based on the first timing signal T1, and the instruction code of the second instruction register 42, based on the second timing signal T2, to output these instruction codes to the data selector 72 and the ALU 73, via the second instruction decoder 61.

Therefore, the ALU 73 can be operated twice during the one machine cycle. Thereby, this product-sum operation unit 50 can continuously execute the product-sum operation and addition, during two machine cycles, selecting the desired value for a multiplicand C, a multiplier D, a summand A and an added B, in order to realize high speed arithmetic operations. Moreover, this product-sum operation unit can continuously execute the additions by selecting desired value for a summand A and a addend B. In addition, this product-sum operation unit can continuously execute the product-sum operation or multiplication. In this case, the preceding product-sum result or multiplication result cannot be used as a multiplicand C or a multiplier D.

Figure 6:
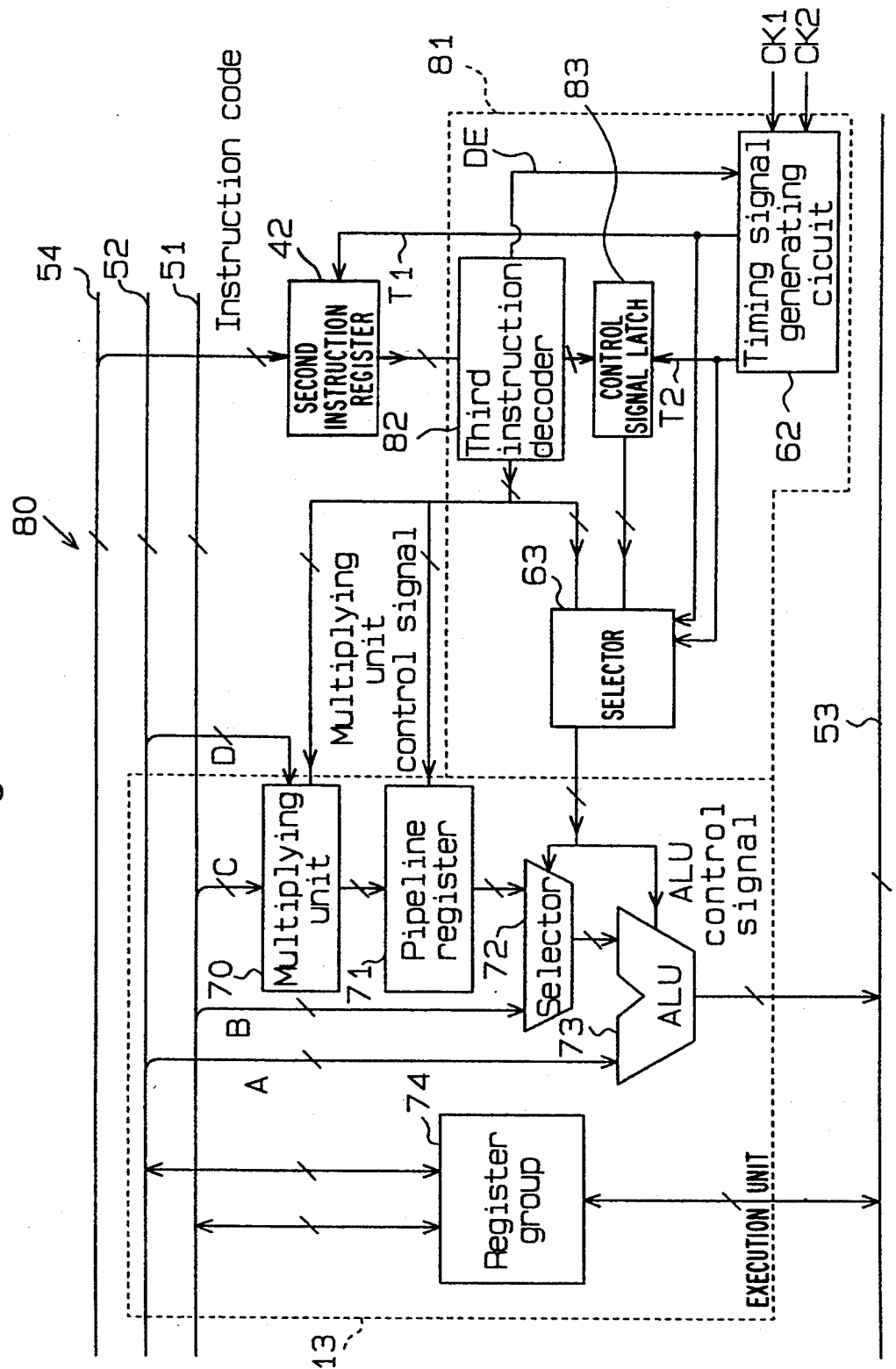
FIG. 6 is a block diagram illustrating a product-sum operation unit, according to a second embodiment.

Next, a second embodiment of a product-sum operation unit will be explained with reference to FIG. 6. The elements similar to those in the above embodiment are given similar reference numerals, and the explanation of these element is partly omitted.

A product-sum operation unit 80 of this embodiment provides only one third instruction decoder 82, and replaces the third instruction register 42 of the product-sum operation unit 50, with a control signal latch 83. The first timing signal T1 of the timing signal generating circuit 62 is inputted to the second instruction register 42, while the second timing signal T2 is inputted to the control signal latch 83.

The third instruction decoder 82 decodes an instruction code loaded in the second instruction register 42, and outputs the decoded signal to a multiplying unit 70, a pipeline register 71, a control signal selector 63, and a control signal latch 83. The control signal latch 83 loads the decoded signal of the instruction decoder 41 based on the second timing signal T2, and outputs the loaded decoded signal to the control signal selector 63.

The third instruction decoder 82 outputs a control signal for controlling the selector 72, and the ALU 73, via the selector 63. The selector 63 operates, as in the case of the first embodiment, in response to the first and second timing signals T1, T2, generated on the basis of the first and the second machine clocks CK1, CK2.

The product-sum operation unit of this embodiment provides an effect that is similar to that of the above embodiment, and simplifies the circuit configuration, through the use of only one third instruction decoder 82.

Figure 7:
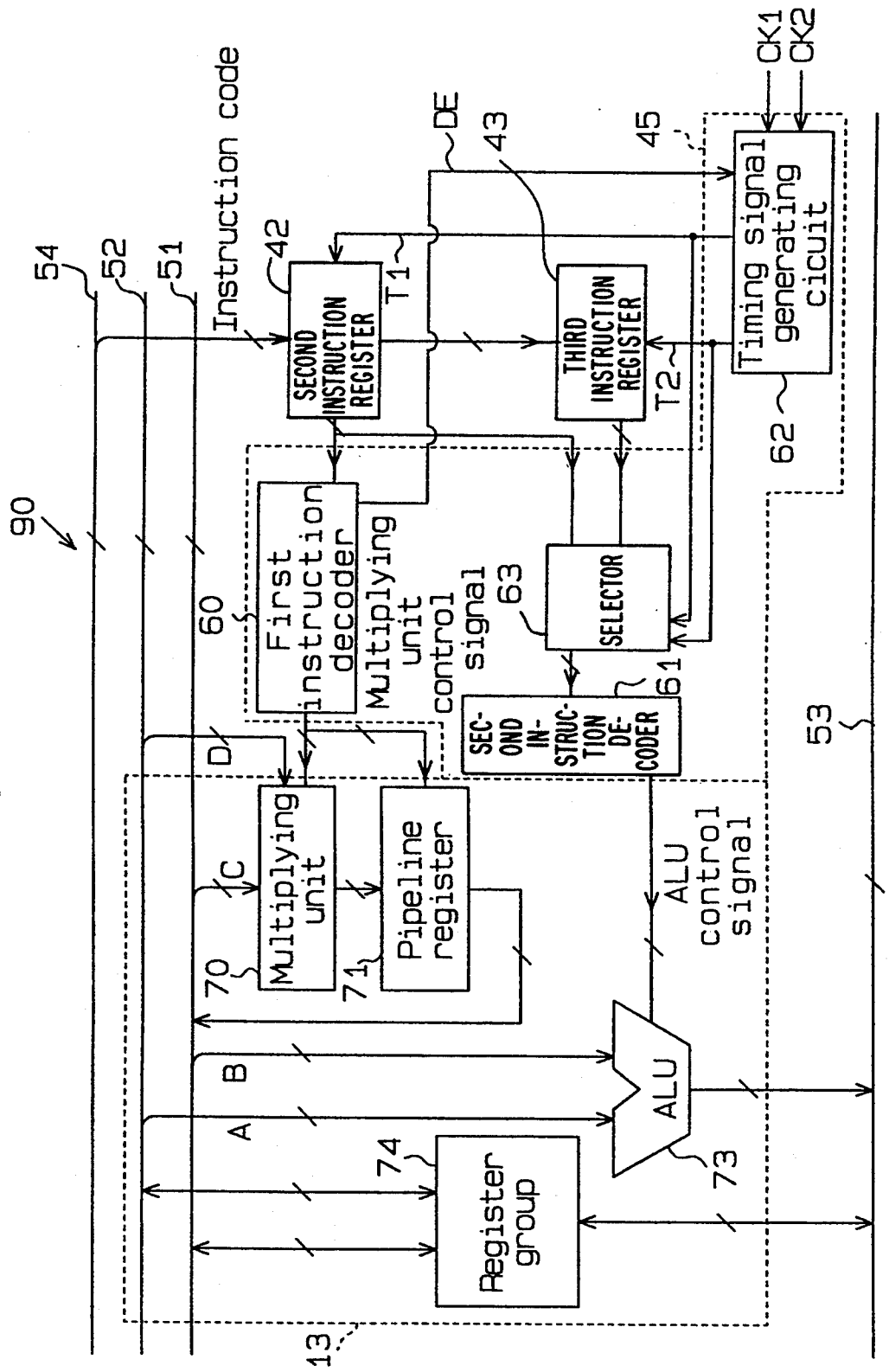
FIG. 7 is a block diagram illustrating a product-sum operation unit, according to a third embodiment.

A third embodiment of the product-sum operation unit will be explained with reference to FIG. 7. In this embodiment, elements similar to those in the above embodiments are given similar reference numerals, and the explanation of these elements is partly omitted.

A product-sum operation unit 90 in this embodiment does not include a data selector 72 provided in the product-sum operation unit 50 shown in FIG. 4. A data bus 51 is used as a data selector based on the control signal from the control unit (not illustrated).

While continuously executing the addition after the product-sum operation in the product-sum operation unit 90, a multiplication result of the multiplying unit 70 that is loaded in the pipeline register 71, is inputted to the ALU 73 as an addend B, via the data bus 51. A summand A is inputted to the ALU 73 from a register group 74, via a data bus 52. The ALU 73 adds the summand A and the addend B, to calculate a product-sum result. This product-sum result is stored in the register group 74, via the data bus 53. Next, the addend B and the summand A are inputted to the ALU 73, via the data buses 51, 52, and the ALU 73 executes the addition.

This product-sum operation unit 90 also provides the effect similar to that of the above embodiments, and also simplifies the circuit configuration through the employment of only one data selector 72.

A more preferred fourth embodiment of a product-sum operation unit will be explained hereafter, with reference to FIGS. 8 and 9. In this embodiment, the elements similar to those in above embodiments are also given similar reference numerals, and the explanation of these elements are partly omitted.

Figure 8:
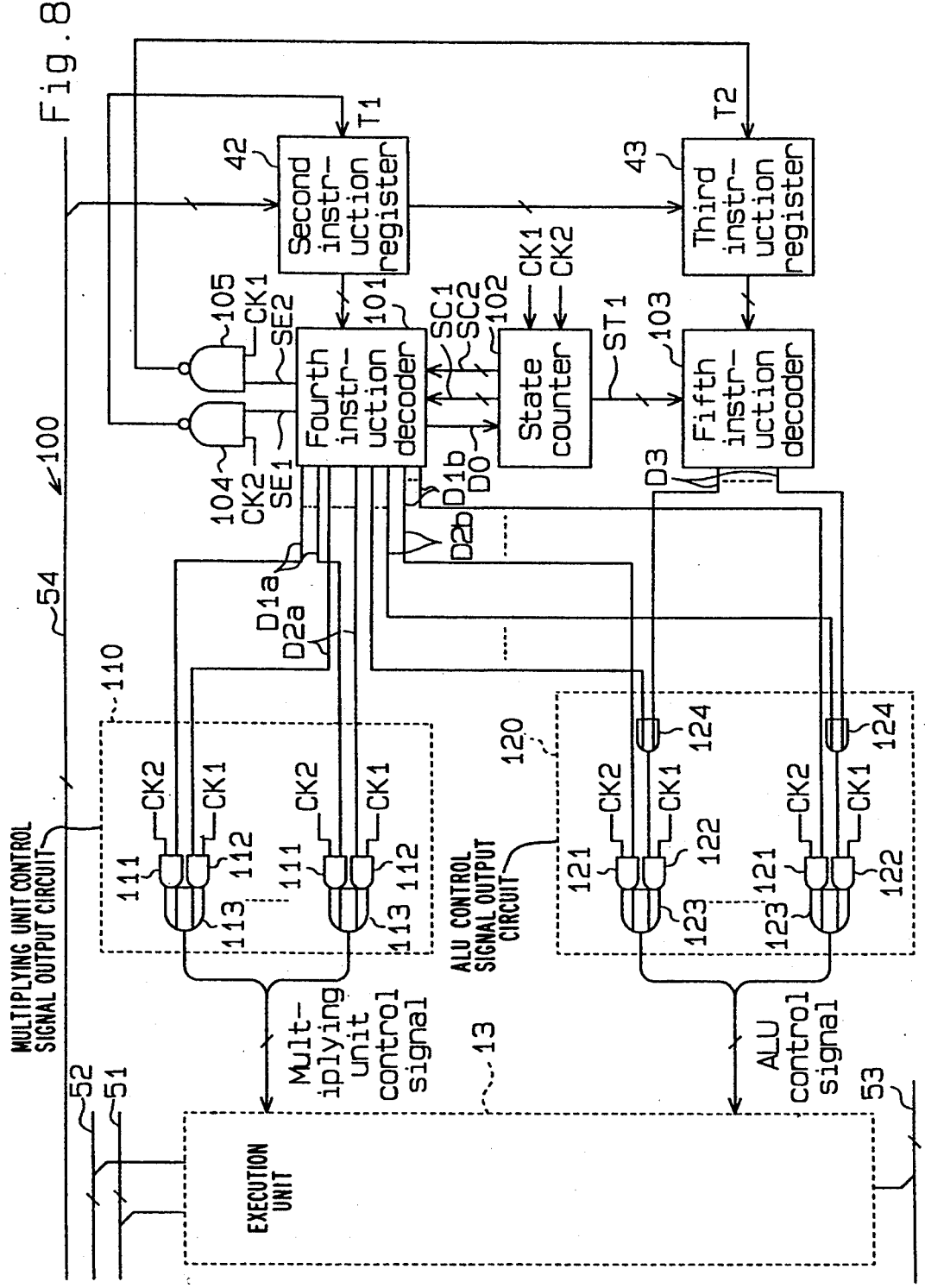
FIG. 8 is a block diagram illustrating a product-sum operation unit composed of a part of the sequence unit and the execution unit, according to a fourth embodiment.

A product-sum operation unit 100 comprises, as shown in FIG. 8, an execution unit 13, second and third instruction registers 42, 43, fourth and fifth instruction decoders 101, 103, a state counter 102, NAND circuits 104, 105, a multiplying unit control signal output circuit 110, and an ALU control signal output circuit 120 operating as a control signal selector.

In this embodiment, a timing signal generating means is formed by the fourth instruction decoder 101, the state counter 102, and NAND circuits 104, 105. Namely, the fourth instruction decoder 101 is connected to the second instruction register 42, and also to the state counter 102. The fifth instruction decoder 103 is connected to the third instruction register 43, and also to the state counter 102.

The state counter 102 inputs the first and second machine clocks CK1, CK2. When a decode start signal D0 is inputted from the fourth instruction decoder 101, the state counter 102 is reset, outputting a start indicating signal ST1, for indicating the start of an instruction to the fifth instruction decoder 103. When the state counter 102 is once reset, it counts up each input of the first and second machine clock pulses CK1, CK2. The state counter 102 generates, for example, in response to the first machine clock CK1, a plurality of clocks CS1 generated in the timing of each one cycle, two cycles, . . . , n cycles of the clock CK1. The state counter 102 also generates, in response to the second machine clock CK2, a plurality of clocks CS2. The state counter 102 outputs the state signals SC1, SC2 to the fourth instruction decoder 101.

When an instruction code is inputted from the second instruction register 42, the fourth instruction decoder 101 decodes the instruction code, judges the number of machine cycles required for executing this instruction, and outputs a decode start signal D0 to the state counter 102. The fourth instruction decoder 101 separately outputs multi-bit (m bits in this embodiment) control signals D1a, D2a to the multiplying unit control signal output circuit 110, and also outputs multi-bit (k bits in this embodiment) control signals D1b, D2b to the ALU control signal output circuit 120. The control signals D1a, D1b are generated on the basis of the result of the logical operation between the decode result of the instruction code, and the state signal SC1 of the state counter 102. The control signals D2a, D2b are generated on the basis of the result of logical operation between the decode result of instruction code, and the state signal SC2 of the state counter 102.

Moreover, the fourth instruction decoder 101 separately outputs the control signals SE1, SE2. The control signal SE1 is generated on the basis of the state signal SC1 and the number of machine cycles required for instruction code, and, when the state signal SC1 matches the number of machine cycles of the instruction code, the control signal SE1 becomes an H level. The control signal SE2 is generated on the basis of the state signal SC2 and the number of machine cycles required for the instruction code, and, when the state signal SC1 matches the number of machine cycles of the instruction code, the control signal SE2 becomes an H level.

A NAND circuit 104 inputs a second machine clock CK2 and also the control signal SE1. The NAND circuit 104 generates a first timing signal T1 shown in FIG. 9, on the basis of the logic of the second machine clock CK2, and the control signal SE1. The NAND circuit 105 inputs a first machine clock CK1 and also the control signal SE2. The NAND circuit 105 generates a second timing signal T2 shown in FIG. 9 on the basis of the logic of the first machine clock CK1 and the control signal SE2.

Figure 9:
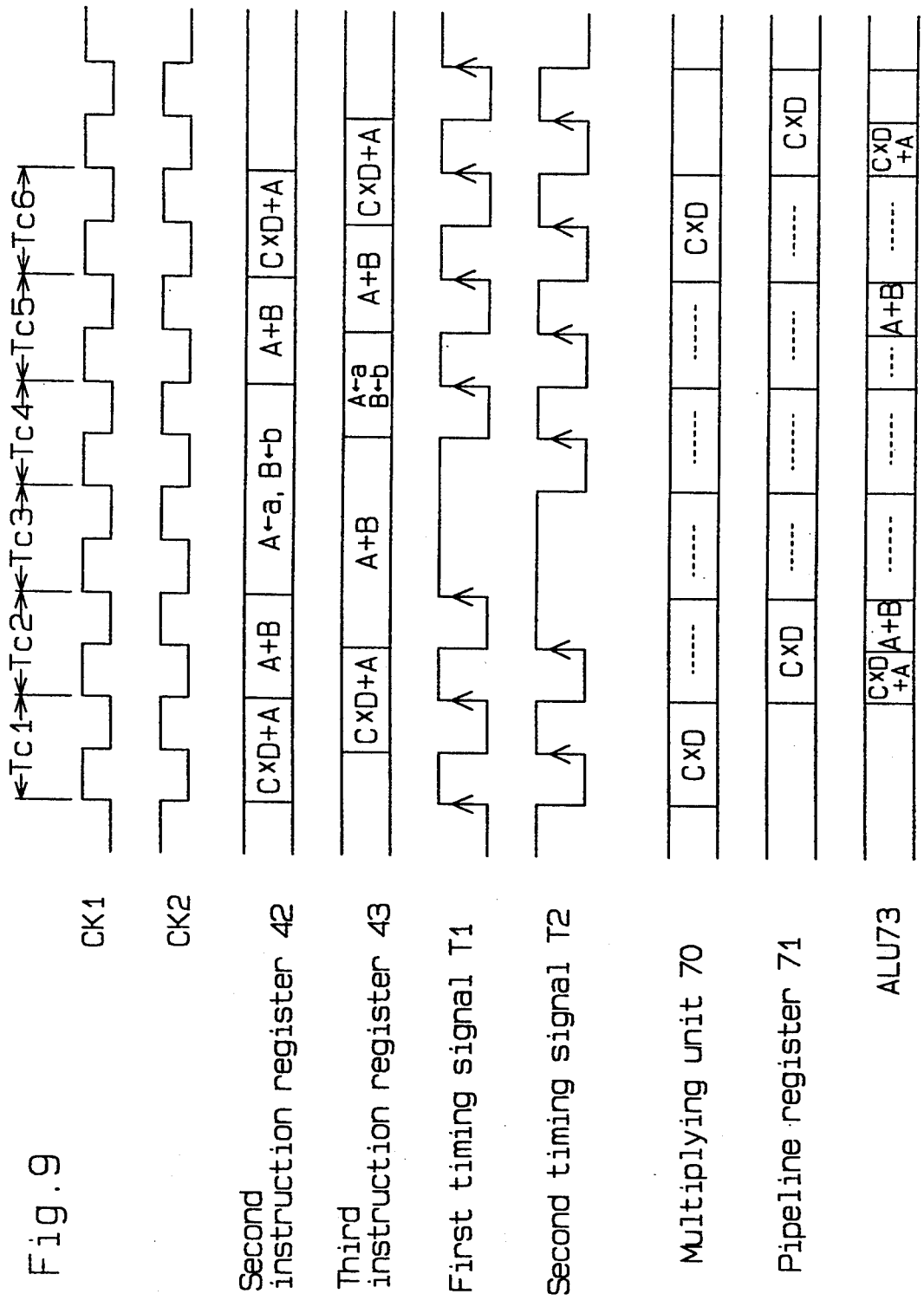
FIG. 9 is a timing chart illustrating the operation of a product-sum operation unit, according to the fourth embodiment.

Therefore, as shown in FIG. 9, when the instruction code is an instruction of one machine cycle, pulses are generated to the first and second timing signals T1, T2, similar to the machine cycles Tc1, Tc2 of FIG. 9, synchronously with each pulse of the first and second machine clocks CK1, CK2. Moreover, when the instruction code requires two machine cycles, pulses are generated as part of the first and second timing signals T1, T2, synchronously with every second pulse of the first and second machine clocks CK1, CK2. For example, the pulses in the first timing signal T1 are generated during the machine cycles Tc3 to Tc4, and the pulses in the second timing signal T2 are generated during the machine cycles Tc2 to Tc4.

When the start indicating signal ST1 is inputted from the state counter 102, the fifth instruction decoder 103 decodes the instruction code inputted from the third instruction register 43 into a multi-bit (k bits in the case of this embodiment) control signal D3, and then outputs it to the ALU control signal output circuit 120.

The multiplying unit control signal output circuit 110 comprises a plurality of pairs (m pairs in this embodiment) of AND circuits 111, 112, and a plurality of OR circuits 113 (m circuits in this embodiment). Each AND circuit 111 inputs each bit of the control signal D1$a$ as the one input, and the second machine clock CK2 as the other input. Each AND circuit 112 inputs each bit of the control signal D2$a$ as the one bit, and the first machine clock CK1 as the other input. Each OR circuit 113 inputs the outputs of a pair of AND circuits 111, 112. Therefore, when the first machine clock CK1 becomes an H level, each OR circuit 113 outputs each bit of the control signal D2$a$ as the multiplying unit control signal. Moreover, each OR circuit 113 outputs, when the second machine clock CK2 becomes an H level, each bit signal of the control signal D1$a$, as the multiplying unit control signal.

The ALU control signal output circuit 120 comprises a plurality of pairs (k pairs in this embodiment) of AND circuits 121, 122, and a plurality (k circuits in this embodiment) of OR circuits 123, 124. Each OR circuit 124 inputs each bit of the control signal D2$b$ as the one input, and each bit of control signal D3 as the other input. Each AND circuit 121 inputs each bit of the control signal D1$b$ as the one input and a second machine clock CK2 as the other input. Each AND circuit 122 inputs an output of the OR circuit 124 as the one input and a first machine clock CK1 as the other input. Each OR circuit 123 inputs the outputs of the pair of AND circuits 121, 122. Therefore, each OR circuit 123 outputs, when the first machine clock CK1 becomes an H level, each bit signal of the control signal D2$b$ or D3, as the ALU control signal. Moreover, each OR circuit 123 outputs, when the second machine clock CK2 becomes an H level, each bit signal of control signal D1$b$ as the ALU control signal.

As shown in FIG. 9, when the product-sum instruction "C×D+A" is inputted to the fourth instruction decoder 101 in the first machine cycle Tc1, in the product-sum operation unit, explained above, the fourth instruction decoder 101 outputs a decode start signal D0 to the state counter 102. The fourth instruction decoder 101 determines that the product-sum instruction is executed in the one machine cycle. The fourth instruction decoder 101 receives the state signal SC1 of the state counter 102, to generate the control signal SE1. The NAND circuit 104 generates the first timing signal T1 synchronously with the second machine clock CK2. On the other hand, a pulse of the second timing signal T2 is generated in the machine cycle Tc1, from the control signal SE2, based on the state signal SC2. A pulse of the first timing signal T1 is outputted in the next machine cycle Tc2.

When the addition instruction "A+B" is inputted in the second machine cycle Tc2, the state counter 102 is reset by the decode start signal D0, and the addition instruction is loaded in the second instruction register 42, synchronously with the first timing signal T1. Since this addition instruction is a one-machine-cycle instruction, a pulse of the second timing signal T2 is generated in the machine cycle Tc2, and a pulse of the first timing signal T1 is outputted in the next machine cycle Tc3.

Therefore, the product-sum instruction "C×D+A", and addition instruction "A+B" are executed continuously in the two machine cycles of the cycle Tc1, Tc2.

When a transfer instruction "A-a, B-b" is inputted in the third machine cycle Tc3, the state counter 102 is reset by the decode start signal D0, and this transfer instruction is loaded in the second instruction register 42, synchronously with the first timing signal T1. Since this transfer instruction is a two-machine-cycle instruction, the fourth instruction decoder 101 receives the state signals SC1, SC2 that are outputted in the two machine cycles, and generates the control signals SE1, SE2, in order to generate the first and second timing signals T1, T2. In the next fourth machine cycle Tc4, a pulse of the second timing signal T2 is generated, and in the machine cycle Tc5, a pulse of the first timing signal T1 is outputted. Moreover, since an instruction of the machine cycle Tc3 is a transfer instruction of the two machine cycles, the multiplying unit 70 and the ALU 73 do not operate during the machine cycles Tc3 and Tc4.

When the addition instruction "A+B" is inputted in the fifth machine cycle Tc5, this addition instruction is loaded in the second instruction register 42, synchronously with the first timing signal T1. Since this addition instruction is a one machine cycle instruction, a pulse of the second timing signal T2 is generated in the machine cycle Tc5, and a pulse of the first timing signal T1 is outputted in the next machine cycle Tc6. In this machine cycle Tc5, since an instruction loaded in the second instruction register 42 is an addition instruction, the multiplying unit 70 does not operate. In the machine cycle Tc5, the ALU control signal output circuit 110 selects a control signal of the addition instruction from the fourth instruction decoder 101, based on the second machine clock CK2 and executes the addition.

The product-sum operation unit 100 of this embodiment provides a similar effect to that of above embodiments, and matches the interval for generating the first and second timing signals T1, T2, depending on the instruction which requires a plurality of machine cycles for execution. Therefore, this unit 100 widens the degree of freedom in the generation of programs.

Figure 10:
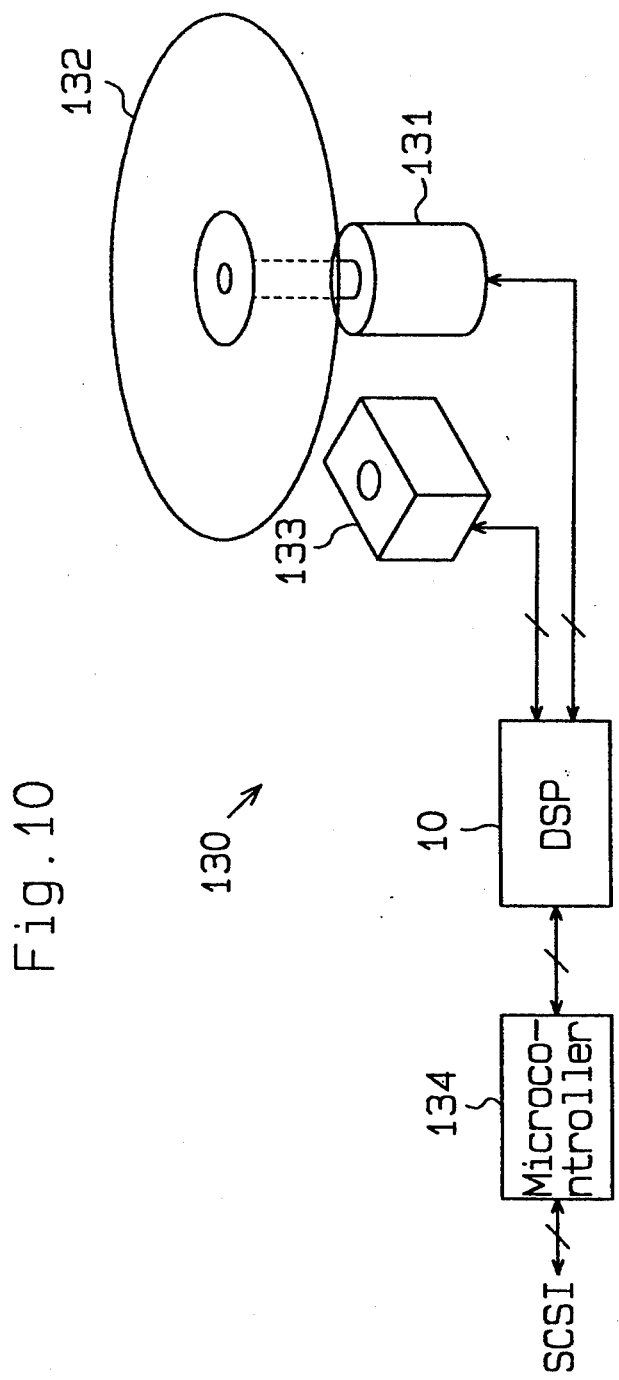
FIG. 10 is a schematic diagram illustrating an optical disk driver utilizing the DSP.
Figure 11:
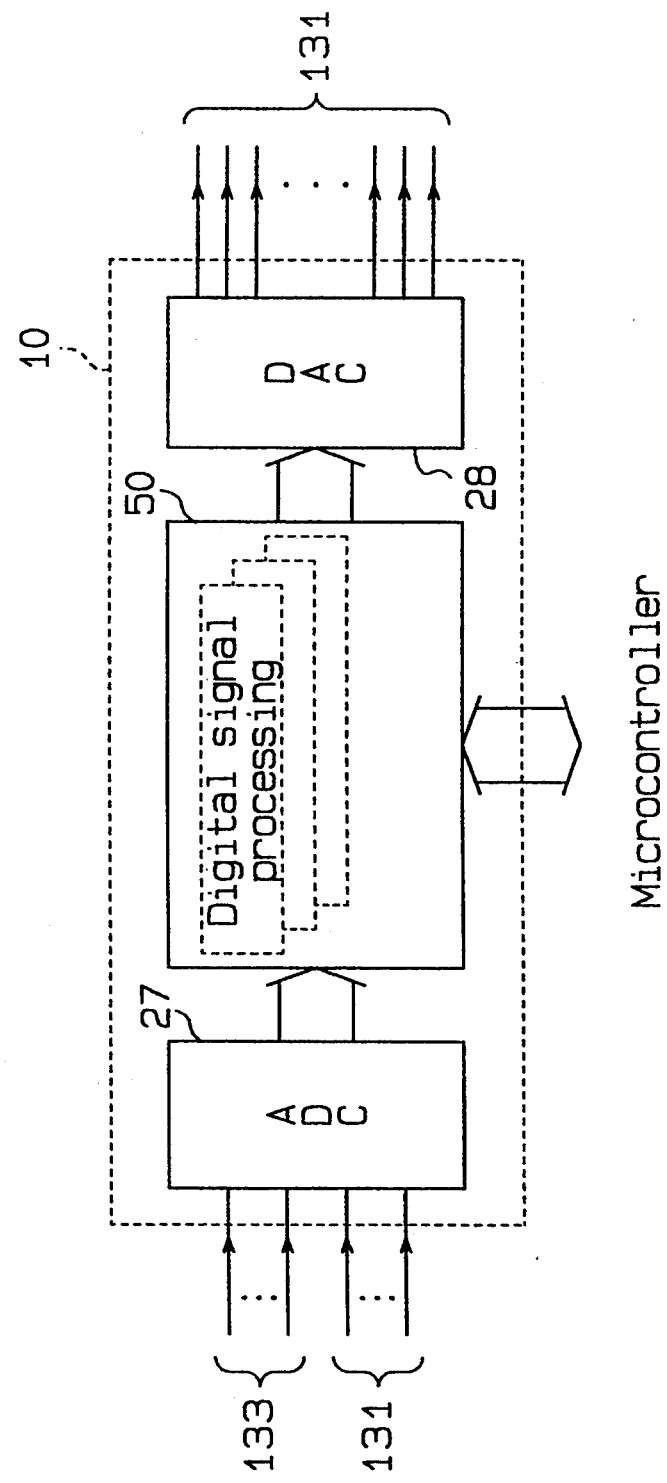
FIG. 11 is a diagram of DSP for explaining a software technology in the high speed servo control system of optical disk.

Another embodiment of the unit according to the present invention will also be explained hereunder with reference to FIGS. 10 and 11.

As shown in FIG. 10, an optical disk driver 130 comprises a digital signal processor (DSP) 10, a drive motor 131, a disk drive consisting of a lens actuator/linear motor 133, etc., and a controller consisting of a microcontroller 134.

The drive motor 131 detects analog values of the rotating position, and the rotating speed of the drive shaft and outputs such analog values to the DSP 10. The drive motor 131 rotates an optical disk, based on the analog control signal outputted from the DSP 10.

The lens actuator/linear motor 133 detects analog signals, such as the position of the lens, etc., and outputs the analog signals to the DSP 10. Moreover, the lens actuator/linear motor 133 also adjusts the position of the lens based on the analog control signal outputted from the DSP 10.

As shown in FIG. 11, the DSP 11 converts an analog signal, which is inputted from the driver motor 131, or the lens actuator/linear motor 133, into a digital signal in the analog-to-digital converter 27. The product-sum operation unit 50 processes, at a high speed, this digital signal, and outputs the processing result to the digital-to-analog converter 28. The digital-to-analog converter 28 converts a digital signal sent from the product-sum operation unit 50, into an analog control signal, in order to output the analog control signal to the drive motor 131, or to the lens actuator/linear motor 133.

The microcontroller 134 exchanges the digital signals with the DSP 10, and also exchanges the data through an interface in the optical disk side (SCS1). The microcontroller 134 conducts a variety of controls, such as error correction and data modulation/demodulation.

An opticla disk drive unit 130 in this embodiment uses the DSP 10 comprising the product-sum operation unit 50, and thereby controls, at a high speed, the drive motor 311 or the lens actuator/linear motor 133.

As explained above, the product-sum operation unit of the present invention is suitable for the configuration of a digital signal processor, and a microcontroller for the processing of digital output signals from an analog-to-digital converter. It is available for a modem, hard disk drive and optical disk drive, using digital signal processors, microcontrollers, etc.

Next, another micro processor according to the present invention will now be explained, with reference to FIGS. 12 through 16. In this embodiment, the design of the second decoder section 45 differs from that of the above-described embodiment.

Figure 12:
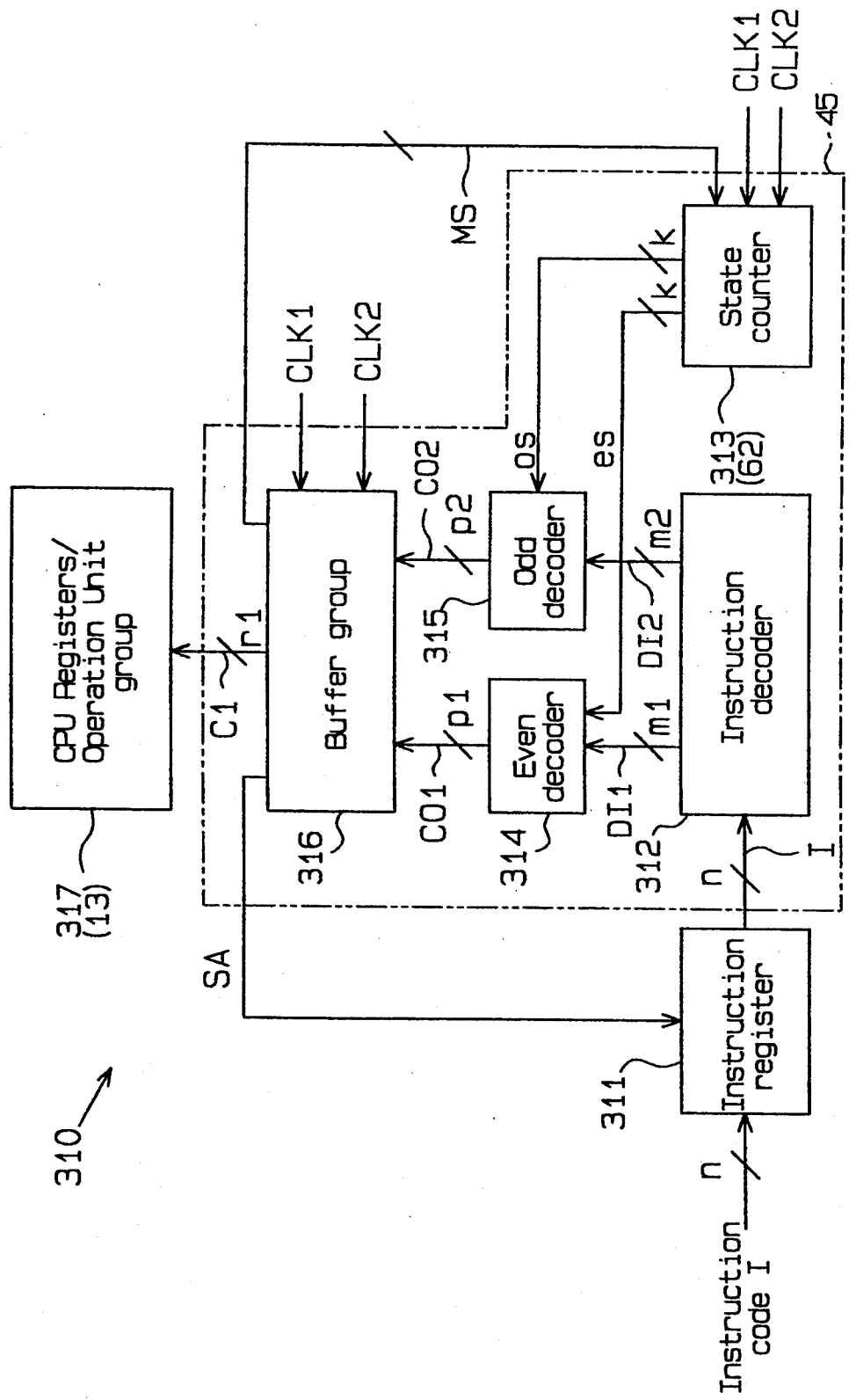
FIG. 12 is a block diagram of a microprocessor used in the present invention.

As shown in FIG. 12, a micro processor 310 includes an instruction register 311, an instruction decoder 312, a state counter 313, an even decoder 314, and odd decoder 315, a buffer group 316, and CPU registers/operation unit group 317. The state counter 313 and the CPU registers/operation unit group 317 respectively correspond to the timing signal generating circuit 62 and the execution unit 13 that are shown in FIG. 4. The "even" and "odd", which are used to designate the decoders, are employed in accordance with the type of clock signals.

The instruction register 311 reads an instruction code I having a length of n bits from the memory (not illustrated), every time a latch signal SA is inputted to the instruction register 311, from the buffer group 216. The instruction register 311 transmits the loaded instruction code I to the instruction decoder 312. The instruction decoder 312 decodes the inputted instruction code I, and the transmits a decode signal DI1, having a length of m1 bits, to the even decoder 314, and a decode signal DI2 having a length of m2 bits to the odd decoder 315.

Figure 13:
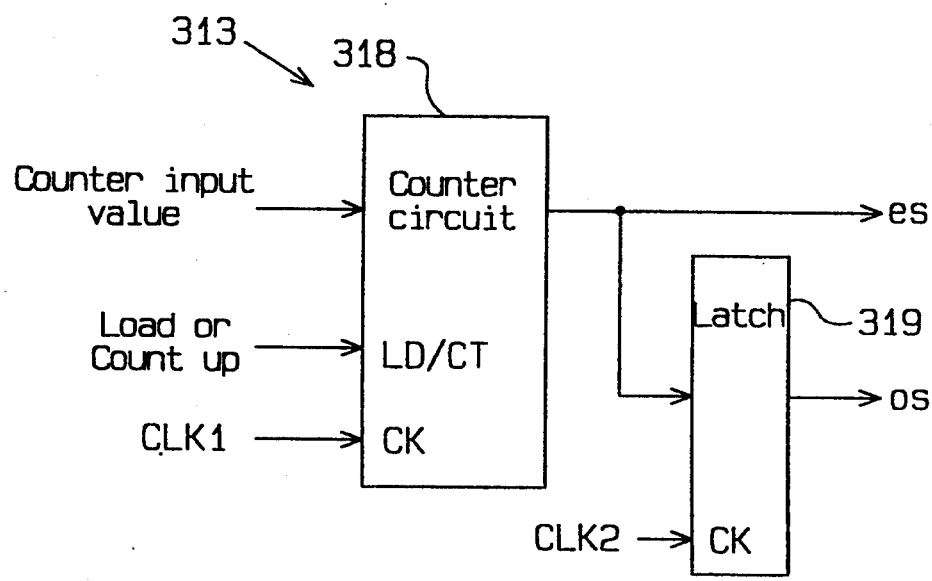
FIG. 13 is a block diagram illustrating a state counter which is employed in the microprocessor of FIG. 12.

As shown in FIG. 13, the state counter 313 includes a counter circuit 318 and a latch circuit 319. Three signals are inputted to the counter circuit 318. The first signal inputted is a counter input value of the state, which indicates the number of operation executed by the CPU registers/operation unit group 317. The second signal is a counter mode command signal MS, which indicates the load operation of the counter input value from the buffer group 316, or a count-up operation. The third signal is a first machine clock signal CLK1, which is synchronized with an instruction cycle of the control unit.

Figure 16:
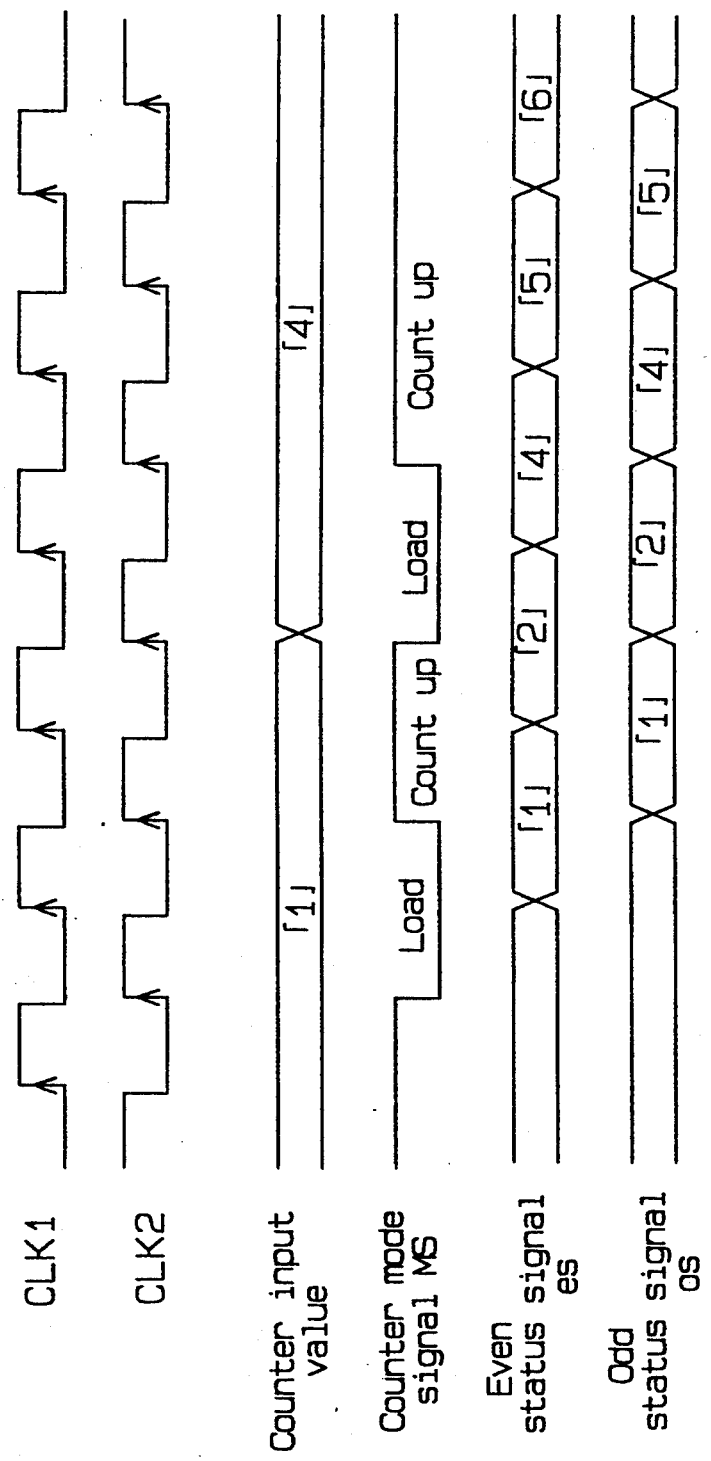
FIG. 16 is a timing chart illustrating the operation of the state counter of FIG. 13.

As shown in FIG. 16, the counter circuit 318 loads the counter value at that time (for example, (1) and (4)), when the leading edge of the first machine clock CLK1 is inputted to the counter circuit 318, while the counter mode command signal MS is at an L level. Moreover, the counter circuit 318 counts the count value currently loaded in the counter circuit 318, when the leading edge of the first machine clock signal CLK1 is inputted to the counter circuit 318, while the counter mode command signal MS is at an H level. The counter circuit 318 outputs the loaded counter value or the counted value as an even state signal es, having a length of K bits, to the even decoder 314.

The even state signal es outputted from the counter circuit 318, and a second machine clock signal CLK2, are inputted to the latch circuit 319. The second machine clock signal CLK2 is out of phase, by one half instruction cycle, with respect to the first machine clock signal CLK1. The second and first machine clock signals CLK2, CLK1 do not overlap, and never reach the H level simultaneously.

The terms "odd cycle" and "even cycle" are used in this specification, for convenience and illustration purpose. "Odd cycle" corresponds to a cycle within a predetermined timing in the first machine signal CLK1, which starts from the rising edge of the first machine signal CLK1. "Even cycle" corresponds to a cycle within a predetermined timing in the second machine signal CLK2, which starts one half cycle after the rising edge of the first machine signal CLK1.

As shown in FIG. 16, the latch circuit 319 latches the even state signal es of the counter circuit 318, when the leading edge of the second machine clock signal CLK2 is inputted to the latch circuit 319. The latch circuit 319 outputs the latched signal as an odd state signal os, having a length of k bits, every time the leading edge of the clock signal CLK2 is inputted. Therefore, the odd state signal os is delayed by one half instruction cycle, with respect to the even state signal es.

As shown in FIG. 12, the even decoder 314 inputs the decode signal DI1 outputted from the instruction decoder 312, and the even state signal es outputted from the state counter 313. Then, the even decoder 314 executes a preprogrammed logical operation based on the decode signal DI1 and the even state signal es, in order to generate a basic control signal CO1. The signal CO1 has a length of p1 bits, and indicates whether the signal is in the even or odd state, and outputs the CO1 to the buffer group 316.

The odd decoder 316 inputs the decode signal D12 outputted from the instruction decoder 312, and the odd state signal os outputted from the state counter 313. The odd decoder 315 executes the preprogrammed logical operation, based on the decode signal DI2 and the odd state signal os, in order to generate a basic control signal CO2 having a length of p2 bits, and to output this basic control signal CO2 to the buffer group 316.

The first and second machine clock signals CLK1, CLK2 are inputted to the buffer group 316. The buffer group 316 generates a control signal Cl1 by performing a waveform shaping operation to the basic control signal CO1, synchronously with the leading edge of the clock signal CLK2. Moreover, similarly to the above, the buffer 316 generates a control signal C12 by performing a waveform shaping operation to the basic control signal CO2, synchronously with the leading edge of the clock signal CLK1. The buffer group 316 outputs each control signal Cl1, C12 as a control signal C1, to the CPU registers/operation unit group 317.

The buffer group 316 transmits the latch signal SA to the instruction register 311, and the counter mode command signal MS to indicate the load operation of the counter value or the counting operation, to the state counter 313, when the CPU registers/operation unit group 317 reaches the predetermined number of operations indicated by the instruction code I.

Figure 14:
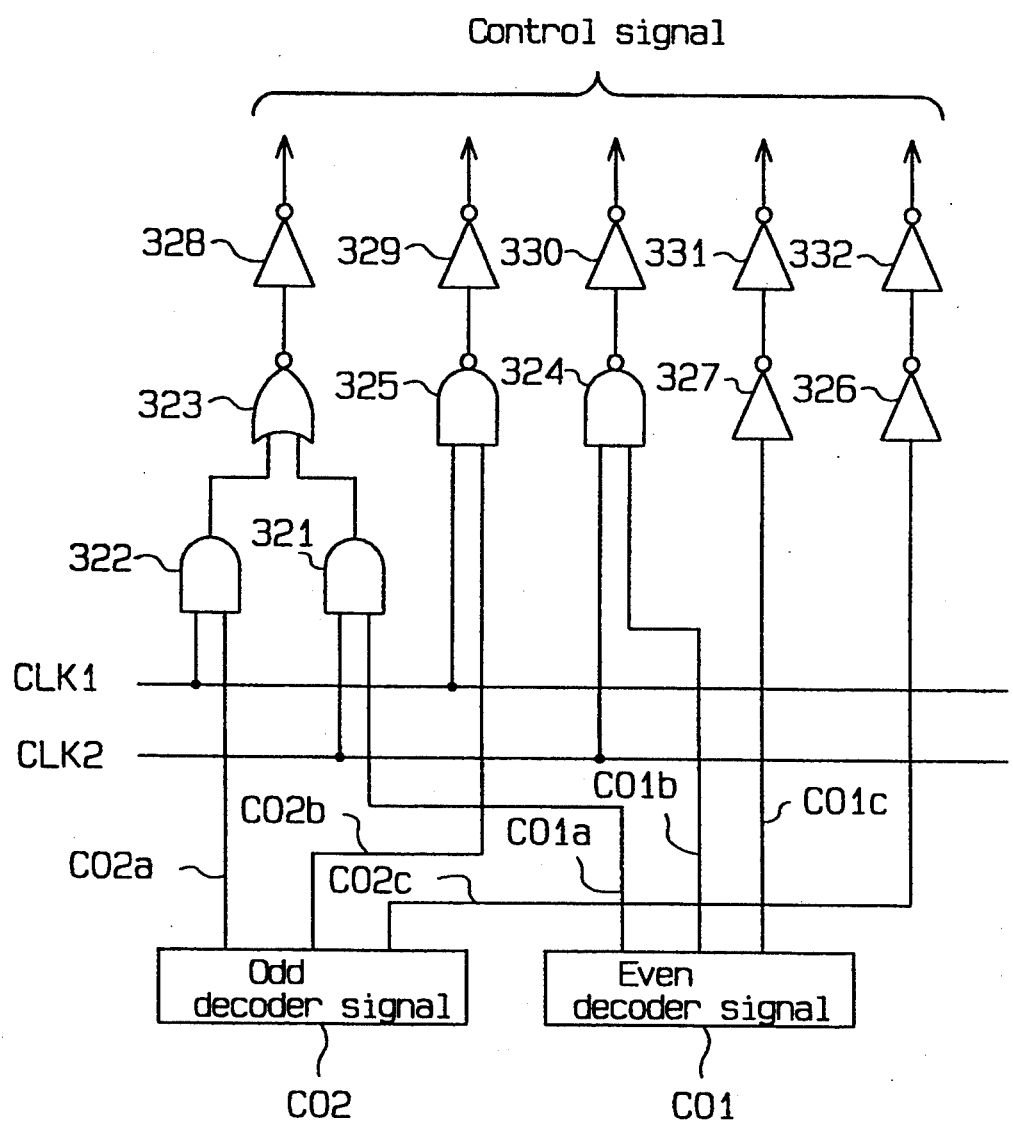
FIG. 14 is a circuit diagram illustrating some of the buffers which are employed in the microprocessor of FIG. 12.

FIG. 14 shows a part of the buffer group 316, which includes AND gates 321, 322, a NOR circuit 323, NAND gates 324, 325, and NOT circuits 326 through 332. The AND gate 321 inputs the clock signal CLK2 and a bit signal CO1a included in the even decoder signal CO1. The AND gate 322 inputs the clock signal CLK1 and a bit signal CO2a included in the odd decoder signal CO2, which corresponds to the bit signal CO1a. Each one of ouput terminals of the AND gates 321, 322 is connected to an input terminal of the NOR circuit 323. An output terminal of the NOR circuit 323 is connected to a NOT circuit 328.

Moreover, the NAND gate 324 inputs the bit signal CO1b of the even decoder signal CO1 and the clock signal CLK2. The NOT circuit 329 is connected to an output terminal of the NAND gate 324. The NAND gate 325 inputs the bit signal CO2b of the odd decoder signal CO2, which corresponds to the bit signal CO1b, and the clock signal CLK1. The NOT circuit 330 is connected to an output terminal of the NAND gate 325. Furthermore, each of the NOT circuits 326, 327 inputs a bit signal CO1c from the even decoder signal CO1, and a bit signal CO2c from the odd decoder signal CO2. The NOT circuits 331, 332 are connected to an output terminal of the NOT circuits 326, 327, respectively.

Therefore, when the clock signal CLK1 is at the H level, and the clock signal CLK2 at the L level, each of the AND gate 321 and the NAND gate 324 is in a cut-off stage. At this time, only the AND gate 322 and the NAND gate 325 are in a conductive stage. The bit signals CO2a, CO2b of the odd decoder CO2 are outputted, via the NOT circuits 328, 329. On the other hand, when the clock signal CLK1 is at the L level, and the clock signal CLK2 at the H level, the AND gate 322 and the NAND gate 325 are in the cut-off stage. Only the AND gate 321 and the NAND gate 324 are in the conductive stage. The bit signals CO1a, CO1b of the even decoder signal CO1 are outputted, via the NOT circuits 328, 329. The bit signal CO1c of the even decoder signal CO1, and the bit signal CO2c of the odd decoder signal CO2 are outputted, via the NOT circuits 331, 332, regardless of the level of the clock signals CLK1, CLK2.

Figure 15:
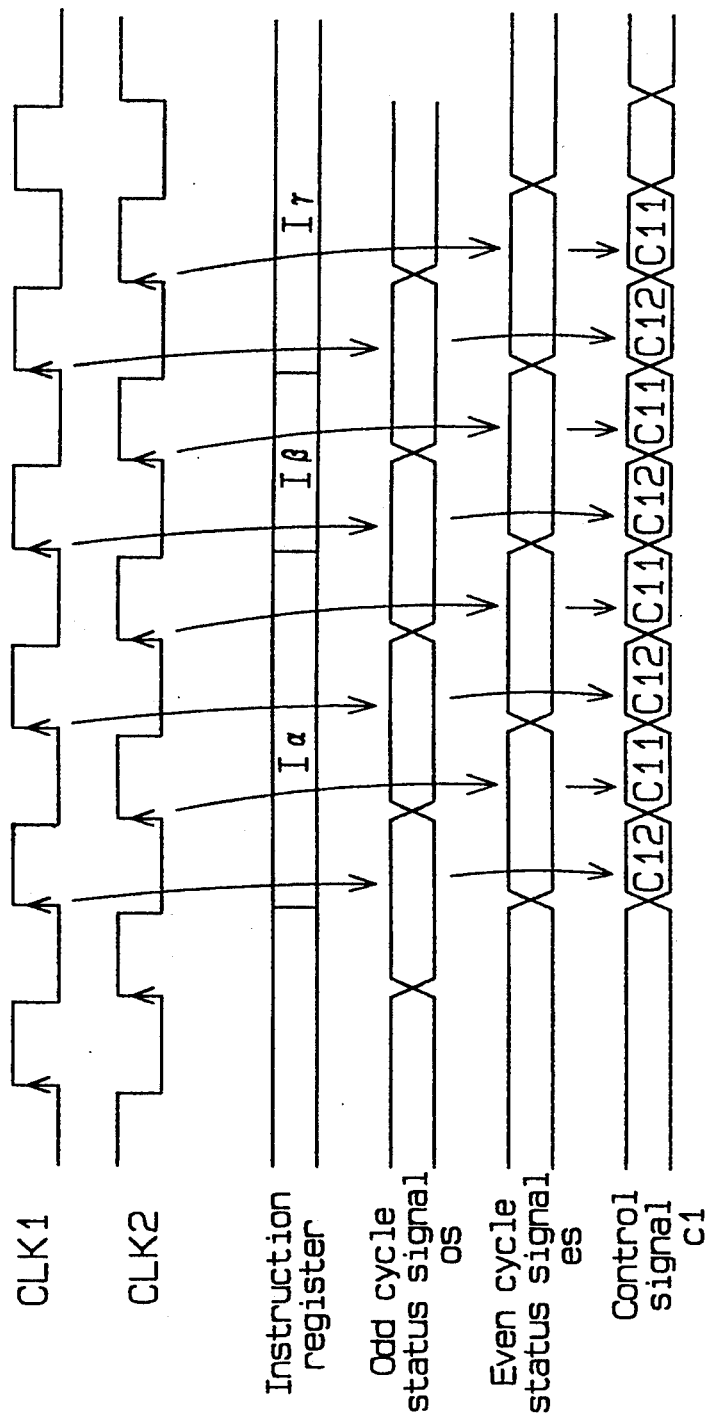
FIG. 15 is a timing chart illustrating the operation of the microprocessor of FIG. 12.

The CPU registers/operation unit group 317 are controlled by control signals C1 inputted from the buffer group 316, and perform the preprogrammed operations such as a product-sum operation or an inputting/outputting data operation, based on the control signals. For example, as shown in FIG. 15, the instruction register 311 latches to an instruction code Iα, which is required to execute the operations four times, when one of the leading edges of the clock signal CLK1 is rising. The instruction code Iα is decoded by the decoder 312. The decode signal DI1 is outputted to the even decoder 314, and the decode signal DI2 is outputted to the odd decoder 315.

The content of the even state signal es of the state counter 313 is changed every time the rising edge of the clock signal CLK1 occurs, and is outputted to the even decoder 314. The content of the odd state signal os of the state counter 313 is changed every time the rising edge of the clock signal CLK2 occurs, which is delayed by one half cycle, with respect to the cycle of the even state signal es, and is outputted to the odd decoder 315.

The even decoder 314 executes the preprogrammed operation, based on each even state signal es and the decode signal DI1, and ouputs a basic control signal CO1 to the buffer group 316, in which reflects on each even state. Moreover, the odd decoder 315 executes the preprogrammed operation based on the decode signal DI2 and odd state signal os, and outputs a basic control signal CO2 to the buffer group 316, in which reflects the each odd state.

In each instruction cycle, the buffer group 316 performs the wave shaping operation of the basic control signal CO1, to form the control signal C12, synchronously with the rising edge of the clock signal CLK2. The basic control signal CO2 is wave-shaped to form the control signal C11, synchronously with the rising edge of the clock signal CLK1. These control signals C12, C11 are outputted to the CPU registers/execution unit group 317. Consequently, the CPU resisters/execution unit group 317 are activated twice, within a single instruction cycle.

The buffer group 316 outputs four control signals C1, to activate the CPU resisters/execution unit group 317 four times, after two instruction cycles have elapsed, from the latching of the instruction code Iα to the instruction register 311. The code Iα requires four operation to be executed. As a result, the execution of the instruction code Iα is completed.

At which time, the buffer group 316 outputs a latch signal SA to the instruction register 311. Moreover, a counter mode command signal MS is outputted to the state counter 313. A next instruction code Iβ is latched to the instruction register 311, based on the latch signal SA. The counter value is loaded to the state counter 313, based on the counter mode command signal MS (the value in the state counter 313 is increased).

According to this embodiment, the CPU registers-/execution unit group 317 are caused to operate twice by a single instruction signal, without increasing the frequencies of the clock signals CLK1, CLK2. In other words, the CPU registers/execution unit group 317 can be operated twice faster than the CPU operates one instruction in a single instruction cycle, so that the high speed operation of the micro processor 310 can be achieved.

Furthermore, according to this embodiment, the power consumption of the micro processor 310 is significantly decreased as compared with a conventional chip which is activated at the same frequency as this embodiment, because there is no requirement to increase the frequency of the clock signals CLK1, CLK2. A semiconductor device can be mounted on an inexpensive package. For the same reason, there is no need to employ an expensive semiconductor, such as a BiCMOS or the like. As a result, the cost of the micro processor 310 can be reduced.

According to this embodiment, the state counter 313 is combined with the counter circuit 318 and the latch circuit 319. The latch circuit 319 has a simpler design than that of the counter circuit 318. Therefore, the design of the state counter 313 is simplified, and the size of the micro processor 310 can be reduced.

Figure 17:
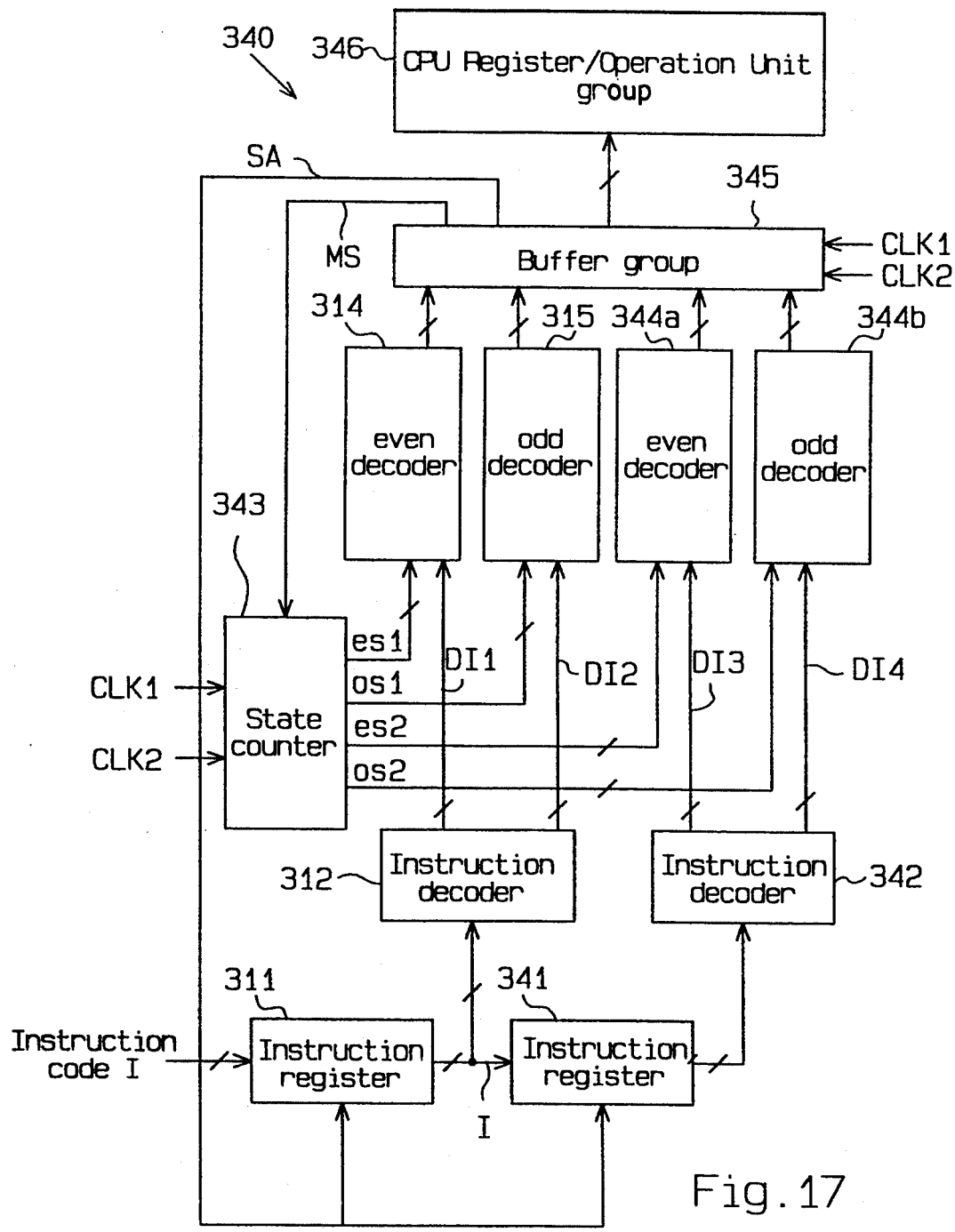
FIG. 17 is a block diagram of a microprocessor, according to another embodiment.

Next, another microprocessor 340 will now be described, with reference to FIG. 17. The elements similar to those in FIG. 12 are given similar reference numerals, and the description of these elements is partly omitted.

According to this embodiment, the micro processor 340 can perform a pipeline operation, and includes instruction registers 311, 341, instruction decoders 312, 342, a state counter 343, even decoders 314, 343, odd decoders 315, 344, buffer group 345, and CPU registers-/execution unit group 346.

The instruction register 341 is connected to the instruction register 311. The instruction register 341 loads the instruction code I outputted from the instruction register 311, and outputs the instruction code I to the instruction decoder 342, each time the latch signal SA, from buffer group 345, is inputted.

An even decoder 344a and odd decoder 344b are connected to the instruction decoder 342. The instruction decoder 342 decodes the instruction code I, which is inputted from the instruction register 341, and outputs a decode signal DI3 to the even decoder 344a, and a decode signal DI4 to the odd decoder 344b.

The clock signals CLK1, CLK2 are inputted to the state counter 343. The state counter 343 outputs even state signals es1, es2 to the even decoders 314, 344a, respectively, every time the rising edge of the CLK1 occurs, and outputs odd state signals os1, os2 to the odd decoders 315, 344b, respectively, every time the rising edge of the CLK2 occurs.

The even decoder 314 generates a basic control signal, in which reflects to each even state, and outputs the basic control signal to the buffer group 345. This operation is carried out as a consequence of the execution of the preprogrammed operation based on the decode signal DI1 which is outputted from the instruction decoder 314, and the even state signal es1 which is outputted from the state counter 343. The odd decoder 315 generates a basic control signal, in which reflects to each odd state, and outputs the basic control signal to the buffer group 345. This operation is carried out as a consequence of the execution of the preprogrammed operation, based on the decode signal DI2 which is outputted from the instruction decoder 312, and the odd state signal os1 which is outputted from the state counter 343.

The even decoder 344a generates a basic control signal reflecting each state and outputs the basic control signal to the buffer group 345. This operation is carried out as a consequence of the executing the preprogrammed operation, based on the decode signal DI3 which is outputted from the instruction decoder 342, and the even state signal es2 which is outputted from the state counter 343. The odd decoder 344b generates a basic control signal and outputs the basic control signal to the buffer group 345. This operation is carried out as a consequence of the executing the preprogrammed operation, based on the decode signal DI4 which is outputted from the odd decoder 342, and the odd state signal os2 which is outputted from the instruction decoder 342.

The buffer group 345 executes the wave-shaping operation of the basic control signal inputted from the even decoder 314, synchronously with the rising edge of the clock signal CLK2, and generates a control signal, when the clock signal CLK2 is at the H level. Moreover, the buffer group 345 executes the wave-shaping operation of the basic control signal inputted from the even decoder 344a, synchronously with the rising edge of the clock signal CLK2, and generates a control signal. The control signals are outputted to CPU registers/execution unit group 346.

Moreover, the buffer group 345 executes the wave-shaping operation of the basic control signal which is inputted from the odd decoder 315, synchronously with the rising edge of the CLK1, and generates a control signal. Further, the buffer group 345 executes the wave-shaping operation of the basic signal inputted from the odd decoder 344b, synchronously with the rising edge of the CLK1, and generates a control signal. The control signals are outputted to the CPU registers/execution unit group 346.

The CPU registers/execution unit group 346 includes a unit which is controlled by the control signals outputted from the even decoder 314 and the odd decoder 315. The CPU registers/execution unit group 346 further includes another unit which is controlled by the control signals from the even decoder 344a and the odd decoder 344b.

Therefore, for example, the CPU registers/execution unit group 346 executes an address arithmetic operation, in response to the instruction code I, which is loaded in the instruction register 311, based on the control signals generated by the even decoder 314 and the odd decoder 315. Thereafter, the CPU registers/execution unit group 346 executes an actual data arithmetic operation, in response to the instruction code I, which is loaded in the instruction register 341, based on the control signals generated by the instruction decoder 342, the even decoder 344a and the odd decoder 344b.

Another embodiment according to the present invention will now be explained, with reference to FIGS. 18 through 27. In this embodiment, the design of register group differs from that of the above-described embodiment, as shown in FIG. 4.

Figure 18:
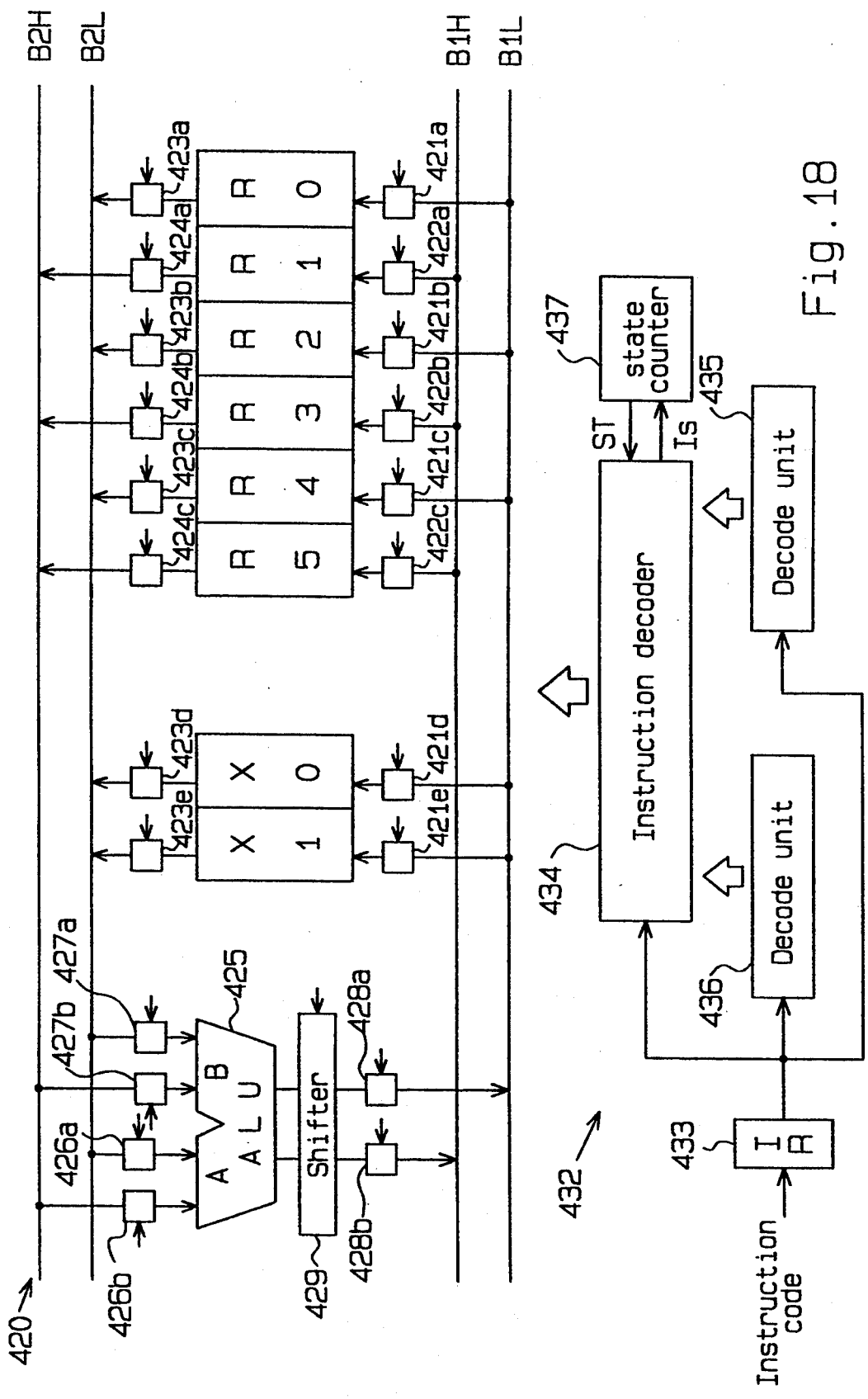
FIG. 18 is a block diagram illustrating the DSP according to yet another embodiment.

FIG. 18 shows a DSP (digital signal processor) 420, according to this embodiment. The DSP 420 includes two pairs of buses, one of which includes an input bus B1H and an output bus B2M. The other pair includes an input bus B1L and an output bus B2l. Each bus B1H, B1L, B2H and B2L transmits data, having a length of n bits (n is a natural number). Therefore, the bus according to this embodiment can transmit data, having a length of 2n bits. In the data having a length of 2n bits, an upper n-bits portion of the data is transmitted via the bus designated by the letter "H", and a lower n-bits portion of the data is transmitted via the bus designated by the letter "L".

Each one of a plurality of general register groups R0, R2, R4 and index registers X0, X1, which corresponds to the input bus B1L, and output bus B2l, loads the data having a length of n bits. Each one of the general register groups R1, R3, R5, which corresponds to the input bus B1H, and the output bus B2H, loads data having a length of n bits. According to this embodiment, the general register R0 pairs up with the register R1, so as the R2 pairs up with the register R3, and the register R4 pairs up with the register R5, respectively. The general register R1 further pairs up with the index registers X0, X1.

Each one of the registers R0, R2, R4, X0, and X1 is connected to the input bus B1L, via buffer circuits (connecting circuit groups at the input side) 421a through 421e, which are disposed at the input side; and is further connected to the output bus B2L, via buffer circuits 423a through 423e (connecting circuit groups), that are disposed at the output side. Moreover, each one of the registers R1, R3, R5 is connected to the input bus B1H, via other buffer circuits 422a through 422e, which are disposed at the input side; and is further connected to the output bus B2H, via buffer circuits 424a through 424c.

An operand number input portion 425A which is disposed in an adder unit (hereinafter, referred to as ALU) 425, is connected to the output bus B2H, via buffer circuits (first input connecting circuit group for the adder) 426a, 426b. An operating number input portion, 425B which is disposed in the ALU 425, is connected to the output bus B2L, via buffer circuits (second input connecting circuit group for the adder) 427a, 427b. The ALU 425 loads data having a length of n bits or 2n bits, as the operand number or the operating number, and executes the preprogrammed operation based on those data.

A shifter 429 is connected to the output side of the ALU 425. The output side of the shifter 429 is connected to the input buses B1L, B1H, via buffer circuits (adder output connecting circuit) 428a, 428b. The shifter 429 loads the calculated result via the ALU 425, and enables the n bits data to be shifted.

Figure 24:
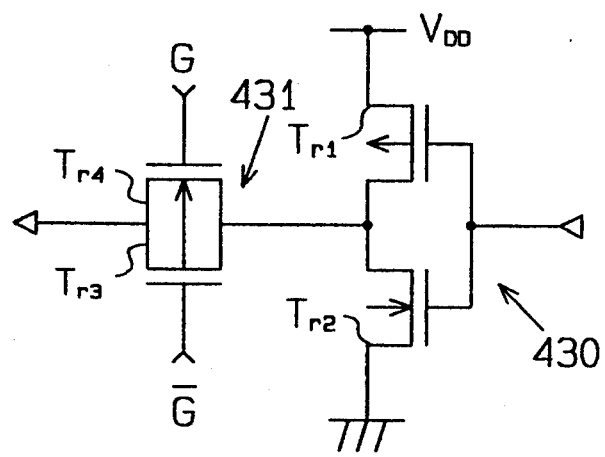
FIG. 24 is a circuit diagram illustrating an input buffer circuit used in the DSP of FIG. 18.

FIG. 24 shows a circuit diagram which illustrates input buffer circuits 421a through 421e, 422a through 422c, 426a, 426b, 427c and 427b. Each input buffer circuit includes an invertor 430 which includes PMOS and NMOS transistors Tr1, Tr2, and a gate circuit 431 which includes PMOS and NMOS transistors Tr3, Tr4. Complementary gate signals bar G, G, which are transmitted from an instruction decoder 434, are inputted through each gate terminal of the PMOS and NMOS transistors Tr3, Tr4.

Figure 26:
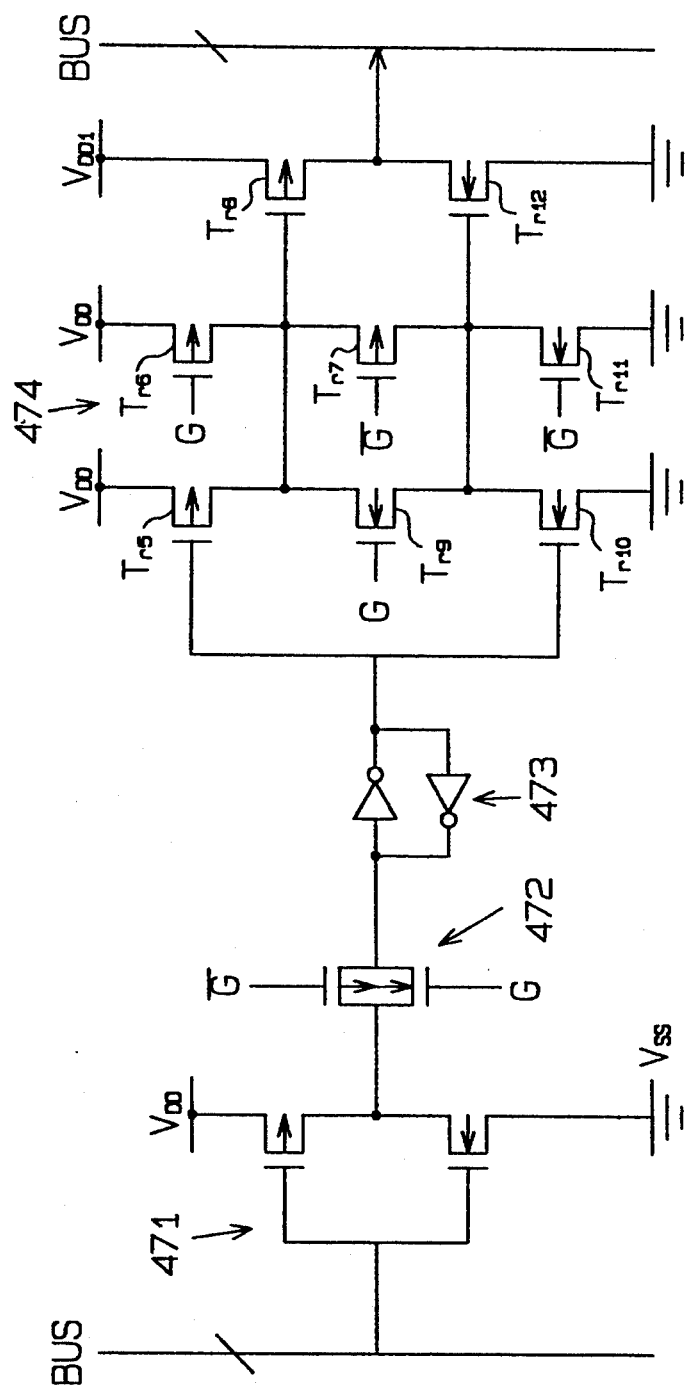
FIG. 26 is a circuit diagram illustrating a buffer circuit disposed at the output side, and used in the DSP of the FIG. 18.

FIG. 26 shows a circuit diagram illustrating output buffer circuits 423a through 423e, 424a through 424c, and 428a and 428b. Each output buffer circuit includes an invertor 471, a gate circuit 472, a latch 473, and a latch output controller circuit 474, which are connected in a sequence that corresponds to the order of the input signals. The invertor 471 and the gate circuit 472 have a similar design to that of the input buffer circuit. The latch circuit 474 includes four PMOS transistors Tr5 through Tr8, and four NMOS transistors Tr9 through Tr12, which are connected in a matrix form. The complimentary gate signals bar G, G are inputted to the predetermined transistor. When the gate signal G is at the "L" level, an output from the latch circuit 474 is at a floating stage, regardless of the logical level at the output of the latch 473. When the gate signal G is at the "H" level, the latch circuit 474 acts as an amplifier. At which time, when an output of the latch 473 is at the "L" level, a logical signal, having the similar signal level as that of the latch 473, is outputted from the latch circuit 474. When the output of the latch 473 is at the "H" level, a signal having a signal level higher than that of the output signal of the latch 473, is outputted from the latch circuit 474.

Figure 19:
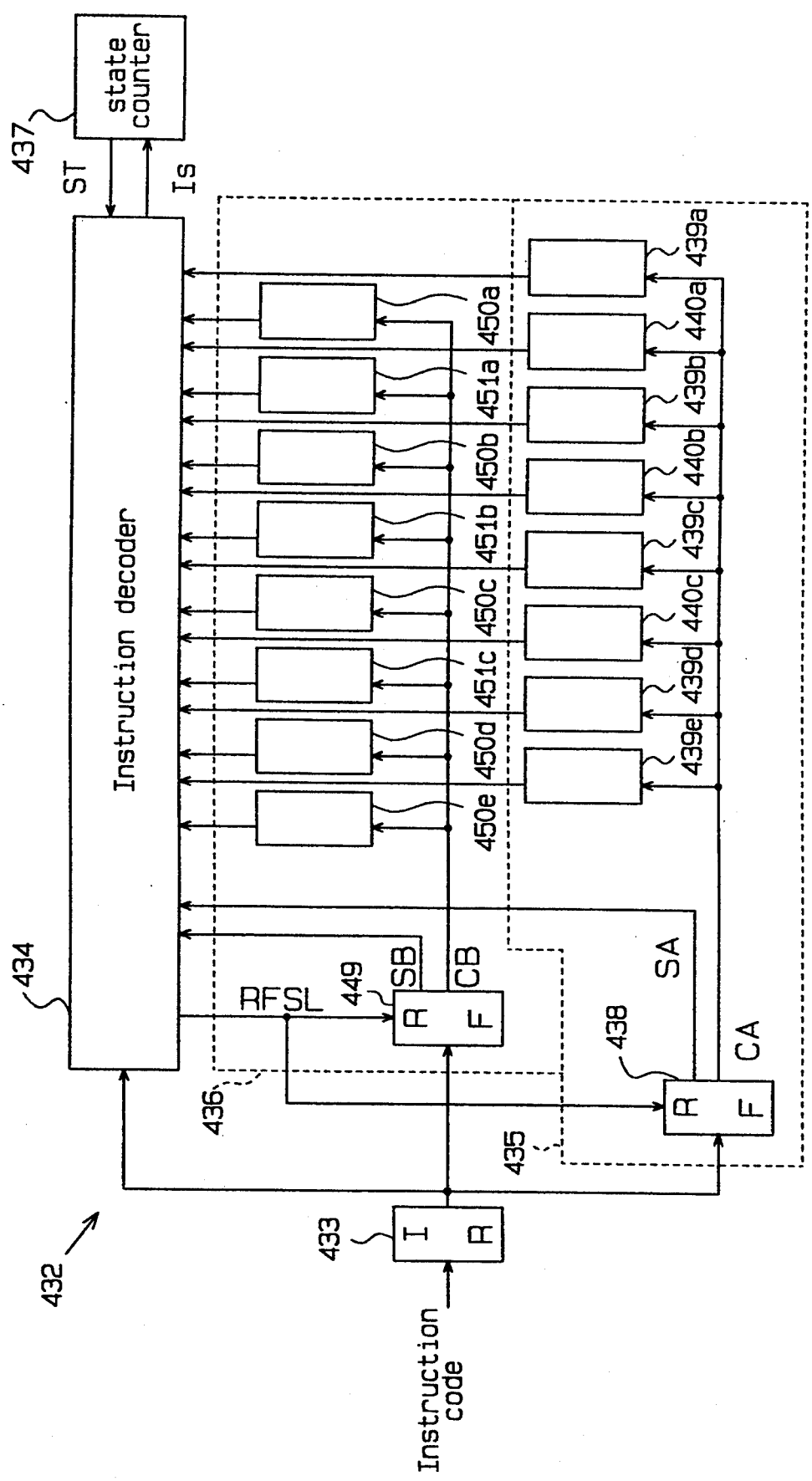
FIG. 19 is a block diagram illustrating a control unit employed in the DSP of FIG. 18.

A control unit 432 as shown in FIGS. 18 and 19 will now be explained.

The control unit 432 according to this example, corresponds to the buffer group 316, and the decoders 312, 314, and 315 in the above embodiment shown in FIG. 12. Moreover, the control unit 432 includes an instruction register 433, an instruction decoder 434, first and second decoder units 435, 436, and a state counter 437. The instruction decoder 434 consists of input portion determining means, connecting circuit control means, register field determining means, shift control means, input side decode signal outputting means, and output side decode signal outputting means. The instruction register 433 loads an instruction code, and outputs it to the instruction decoder 434, and the first and second decoder units 435, 436. A state indicating signal Is from the instruction decoder 434 is inputted to the state counter 437. The state counter 437 counts the number of states in each instruction, synchronously with the machine cycle (clock signal). The state counter 437 outputs the counted value as a state signal ST to the instruction decoder 434.

Further, an instruction code used in this embodiment stores at least an operational code, and some of the instruction codes store a register field (3 bits). An instruction code, which stores a specific operational code, inherently or directly designates the specific register, in order to execute the operation based on the instruction code. The register field is set in an arbitrary position within the instruction code, in order to designate the register used during the execution.

As shown in FIG. 19, the first decoder unit 435 includes a register field code generating circuit 438, register decoder groups 439a through 439e, and register decoder groups 440a through 440c. The register field code generating circuit 438 includes the register connecting circuit and the input side bus determining means.

The instruction code which is outputted from the instruction register 433 is inputted to the register field code generating circuit 438, and a register field determining signal RFSL which is outputted from the instruction decoder 434, is also inputted to the circuit 438. The register field code generating circuit 438 decodes the data of the register field included in the instruction code, and generates a register field code CA having a length of 3 bits, when the register field determining signal RFSL is a signal which is designated the input bus group.

Furthermore, the register field code generating circuit 438 determines which input bus B1L or B1H should be connected to the designated register, and outputs the result signal SA based on the determination to the instruction decoder 434, when the register is designated by the register field in the instruction code.

The register decoder group 439a through 439e corresponds to the buffer circuits 421a through 421e, respectively, and the register decoder group 440a through 440c corresponds to the buffer circuits 422a through 422c, respectively.

Figure 20:
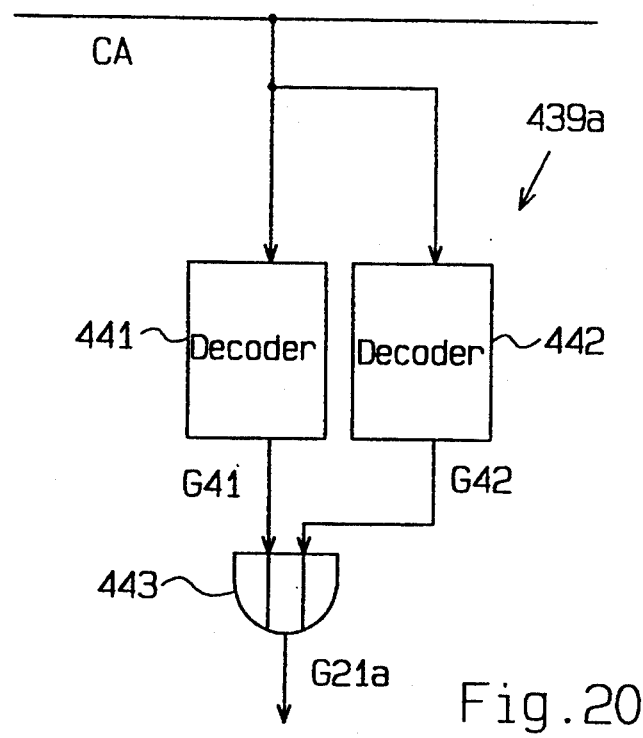
FIG. 20 is a circuit diagram illustrating an input register decoder used in the DSP of FIG. 18.

As shown in FIG. 20, the register decoder 439a includes an input control decoder 441, which corresponds to the buffer circuit 421a, and an input floating preventive decoder 442, which corresponds to the buffer circuit 422a, and which pairs up with the buffer circuit 421a. Moreover, the register decoder 439a includes an OR circuit 443 which executes a logical adding operation between the outputs of the input control decoder 441, and the outputs of the input floating preventive decoder 442. The input control decoder 441 outputs a decode signal G41 to the OR circuit 443, when the register field code CA designates the buffer circuit 421a. The input floating preventive decoder 442 outputs a decode signal G42 to the OR circuit 443, when the register field code CA designates the buffer circuit 422a. When the register field code designates one of the buffer circuits 421a, 422a, in other words, when one of decode signals G41 and G42 is inputted to the OR circuit 443, the OR circuit 443 outputs a control signal G21a, to the instruction decoder 434, for controlling the buffer circuit 421a.

Each one of the register decoders 439b through 439e, 440b, 440c has a similar design to the one described above. An input control decoder of the register decoder 439b corresponds to the buffer circuit 421b, and an input floating preventive decoder corresponds to the buffer circuit 422b, which pairs up with the buffer circuit 421a. An input control decoder of the register decoder 439c corresponds to the buffer circuit 421c, and an input floating preventive decoder corresponds to the buffer circuit 422c, which pairs up with the buffer circuit 421c. An input control decoder of the register decoder 439d corresponds to the buffer circuit 421*d*, and an input floating preventive decoder corresponds to the buffer circuit 422*a* which pairs up with the buffer circuit 421*d*. An input control decoder of the input control decoder 439*e* corresponds to the buffer circuit 421*e*, and an input floating preventive decoder corresponds to the buffer circuit 422*a*, which pairs up with the buffer circuit 421*e*.

Therefore, the register decoder 439*b* outputs a control signal for controlling the buffer circuit 421*b*, to the instruction decoder 434, when a code in the register field is set to designate either one of the buffer circuits 421*b* or 422*b*. The register decoder 439*c* outputs a control signal for controlling the buffer circuit 421*c*, to the instruction decoder 434, when a code in the register field designates either one of the buffer circuits 421*c* or 422*c*. The register decoder 439*d* outputs a control signal, for controlling the buffer circuit 421*d*, to the instruction decoder 434, when a code in the register field designates one of the buffer circuits 421*d*, 422*a*. The register decoder 439*e* outputs a control signal for controlling the buffer circuit 421*e*, when a code in the register field designates either one of the buffer circuits 421*e* or 422*a*.

An input control decoder of the register decoder 440*b* corresponds to the buffer circuit 422*b*, and an input floating preventive decoder corresponds to the buffer circuit 421*b*, which pairs up with the buffer circuit 422*b*. Furthermore, an input control decoder of the register decoder 440*c* corresponds to the buffer circuit 422*c*, and an input floating preventive decoder corresponds to the buffer circuit 421*c*, which pairs up with the buffer circuit 422*c*.

Therefore, when a code in the register field designates either one of the buffer circuit 422*b* or 421*b*, the register decoder 440*b* outputs a control signal, for controlling the buffer circuit 422*b*, to the instruction decoder 434. When a code in the register field designates either one of the buffer circuit 422*c* or 421*c*, the register decoder 440*c* outputs a control signal, for controlling the buffer circuit 422*c*, to the instruction decoder 434.

Figure 21:
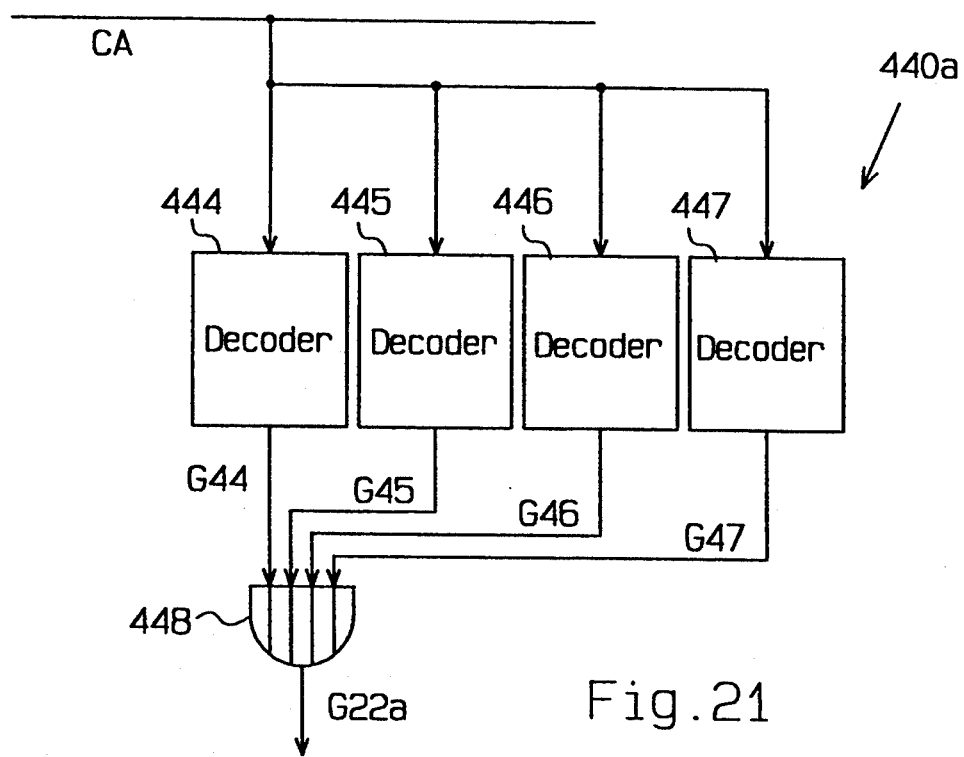
FIG. 21 is a circuit diagram illustrating another input register decoder used in the DSP of FIG. 18.

As shown in FIG. 21, the register decoder 440*a* includes an input control decoder 444, which corresponds to the buffer circuit 422*a*, and three input floating preventive decoders 445 through 447, which correspond to three buffer circuits 421*a*, 421*d*, 421*e*, respectively. Each of the buffer circuits 421*a*, 421*d*, 421*e* pairs up with the buffer circuit 422*a*. Furthermore, the register decoder 440*a* includes an OR circuit 448 which executes a logical adding operation between the outputs of the input control decoder 444 and the input floating preventive decoders 445 through 447. The input control decoder 444 outputs a decode signal G44 to the OR circuit 448, when a register field code CA designates the buffer circuit 422*a*. The input floating preventive decoders 445 through 447 output signals G45 through G47 to the OR circuit 448, when the register field code CA designates each one of the buffer circuits 421*a*, 421*d*, 421*e*. When the register field designates one out of the buffer circuits 422*a*, 421*a*, 421*d*, 421*e*, in other words, when the decode signals G44 through G47 are inputted to the OR circuit 448, a control signal G22*a*, for controlling the buffer circuit 422*a* is outputted from the OR circuit 448, to the instruction decoder 434.

As shown in FIG. 19, the second decoder unit 436 includes a register field code generating circuit 449, register decoder groups 450*a* through 450*e*, and register decoder groups 451*a* through 451*c*. The register field code generating circuit 449 includes a register connecting circuit and an output bus judgement means.

An instruction code from the instruction register 433 is inputted to the register field code generating circuit 449, and a register field determining signal RFSL from the instruction decoder 434, is also inputted to the circuit 449. The register field code generating circuit 449 decodes the data in the register field of an instruction code, and generates a register field code CB having a length of 3 bits, when the register field code determining signal RFSL designates the output bus group.

The register field code generating circuit 449 determines which of the output buses B2L or B2H is connected to the designated register, when the register is designated by the register field code. The circuit 449 outputs a signal SB to the instruction decoder 434, which signal SB is reflective of the determination by the circuit 449. Register groups 450*a* through 450*e* are provided in correspondence with the buffer circuits, 423*a* through 423*e*, respectively. The register decoder groups 451*a* through 451*c* are provided in correspondence with the buffer circuits 424*a* through 424*c*, respectively.

Figure 22:
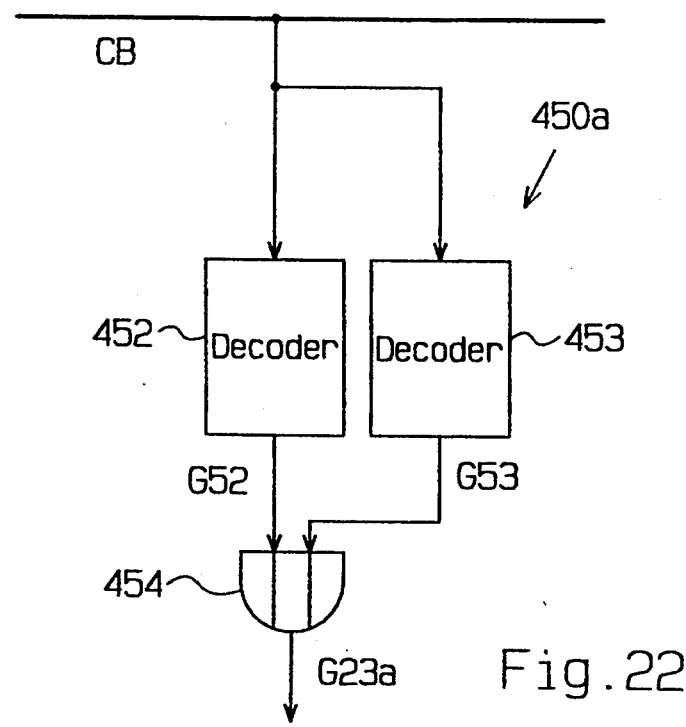
FIG. 22 is a circuit diagram illustrating an output register decoder used in the DSP of FIG. 18.

As shown in FIG. 22, the register decoder 450*a* includes an output control decoder 452 corresponding to the buffer circuit 423*a*, and an output floating preventive decoder 453 corresponding to the buffer circuit 424*a*. Moreover, the register decoder 450*a* includes an OR circuit 454 which executes a logical adding operation between the outputs from the output control decoder 452 and the output floating preventive decoder 453. The output control decoder 452 outputs a decode signal G52 to the OR circuit 454, when the register field code CB designates the buffer circuit 423*a*. The output floating preventive decoder 453 outputs a decode signal G53 to the OR circuit 454, when the register field code CB designates the buffer circuit 424*a*. When the register field appoints either one of the buffer circuits 423*a* or 424*a*, in other words, when either one of the decode signals G52 or G53 is inputted to the buffer circuits 423*a* or 424*a*, the OR circuit 454 outputs a control signal G23*a*, for controlling the buffer circuit 423*a*, to the instruction decoder 434.

Each one of the register decoders 450*b* through 450*e*, 451*b*, 451*c* has a similar design to that of the register decoder 450*a*. In other words, an output control decoder of the register decoder 450*b* corresponds to the buffer circuit 423*b*, and an output floating preventive decoder corresponds to the buffer circuit 424*b*. The buffer circuit 424*b* pairs up with the buffer circuit 423*b*. An output control decoder of the register decoder 450*c* corresponds to the buffer circuit 423*c*, and an output floating preventive decoder corresponds to the buffer circuit 424*c*. The buffer circuit 424*c* pairs up with the buffer circuit 423*c*. An output control decoder of the register decoder 450*d* corresponds to the buffer circuit 423*d*, and an output floating preventive decoder corresponds to the buffer circuit 424*a*. The buffer circuit 424*a* pairs up with 423*d*. An output decoder of the register decoder 450*e* corresponds to the buffer circuit 423*e*, and an output floating preventive decoder corresponds to the buffer circuit 424*a*. The buffer circuit 424*a* pairs up with the buffer circuit 423*e*.

Therefore, the register decoder 450*b* outputs a control signal, for controlling the buffer circuit 423*b*, to the instruction decoder 434, when the register field designates either one of the buffer circuits 423*b* or 424*b*. The register decoder 450*c* outputs a control signal for controlling the buffer circuit 423b, to the instruction decoder 434, when the register field designates either one of the buffer circuits 423c or 424c. The register decoder 450d outputs a control signal, for controlling the buffer circuit 423d, to the instruction decoder 434, when the register field designates either one of the buffer circuits 423d or 424a. The register decoder 450e outputs a control signal, for controlling the buffer circuit 423e, when the register field designates either one of the buffer circuits 423e or 424a.

An output control decoder of the register decoder 451b corresponds to the buffer circuit 424b, and an output floating preventive decoder corresponds to the buffer circuit 423b. The buffer circuit 423b pairs up with the buffer register circuit 424b. Furthermore, an output control decoder of the register decoder 451c corresponds to the buffer circuit 424c, and an output floating preventive decoder corresponds to the buffer circuit 423c. The buffer circuit 423c pairs up with the buffer circuit 424c.

Therefore, the register decoder 451b outputs a control signal, for controlling the buffer circuit 424b, when the register field designates either one of the buffer circuits 424b or 423b. The register decoder 451c outputs a control signal, for controlling the buffer circuit 424c, when the register field designates either one of the buffer circuits 424c or 423c.

Figure 23:
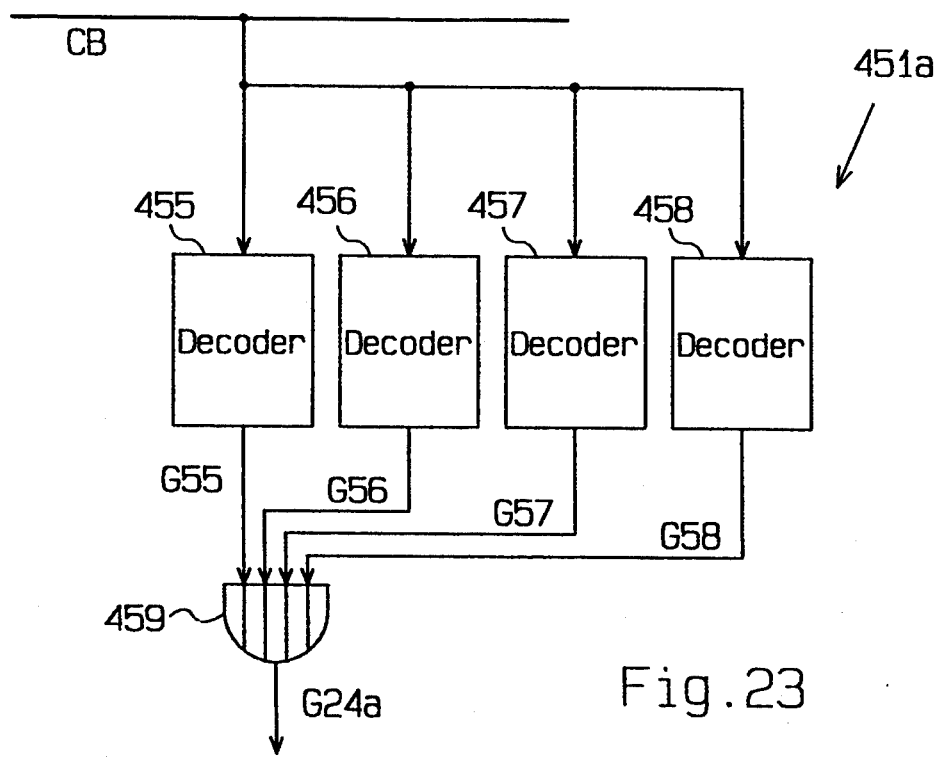
FIG. 23 is a circuit diagram illustrating another output register decoder used in the DSP of FIG. 18.

The register decoder 451a, as shown in FIG. 23, includes an output control decoder 455 corresponding to the buffer circuit 424a, and three output floating preventive decoders 456 through 458 corresponding to the buffer circuits 423a, 423d, 423e, respectively. Each of the buffer circuits 423a, 423d, 423e pairs up with the buffer circuit 424a. Moreover, the register decoder 451a includes an OR circuit 459, which executes logical adding between the outputs from the output control decoder 455 and the output floating preventive decoders 456 through 458.

The output control decoder 455 outputs a decode signal G55, to the OR circuit 459, when the register field code CB designates the buffer circuit 424a. The output floating preventive decoders 456 through 458 output decode signals G56 through G58, to the OR circuit 459, respectively, when the register field codes CB designates the buffer circuits 423a, 423d, 423e. When the register field designates one of the buffer circuits 424a, 423a, 423d, or 423e, in other words, when the decode signals G55 through G58 are inputted to the OR circuit 459, a control signal G24a, for controlling the buffer circuit 424a is outputted from the OR circuit 459 outputs, to the instruction decoder 434.

The instruction decoder 434 decodes the instruction code, which is outputted from the instruction register 433, and outputs a state data required to execute the instruction code, as a state designate signal Is, to the state counter 437. Moreover, the instruction decoder 434 inputs the state signal ST from the state counter 437.

When the register is directly designated, based on the operation in the instruction code, and becomes connected to the input bus, the instruction decoder 434 outputs a decode signal to one of the buffer circuits 421a through 421c, which corresponds to one register among the register group R0, R2, R4, based on the state signal ST from the state counter 437, such that this register is connected to an input bus B1L. Further, the instruction decoder 434 outputs a decode signal to one of the buffer circuits 422a through 422c, which corresponds to one register among the register group R1, R3, R5, such that this register is connected to an input bus B1H. Furthermore, the instruction decoder 434 outputs a control signal to both the buffer circuits 428a and 428b, so as to output the calculation result of the ALU 425, to the shifter 429. As a result, each connected register inputs data from the input bases B1L, B1H, and stores it in each register.

When the register is directly designated, based on the operation of an instruction code, and becomes connected to the output bus, the instruction decoder 434 outputs a decode signal to one of the buffer circuits 423a through 423c, which corresponds to one register among the register groups R0, R2, R4, such that this register is connected to the output bus B2H, based on the state signal ST from the state counter 437. Further, the instruction decoder 434 outputs a decode signal to one of the buffer circuits 424a through 424c, which corresponds to one register among the register groups R1, R3, R5, such that this register is connected to the output bus B2H. As a result, each register outputs data to the output buses B2L, B2H.

On the other hand, when the register is designated by the register field in an instruction code, the instruction decoder 434 determines the position of the register field, and whether the input bus or the output bus becomes connected to the register. The instruction decoder 434 outputs a register field determine signal RFSL, having a length of 3 bits.

When one register is designated by a register field, and is connected to the input bus, the control signals from the register decoders 439a through 439e, and 440a through 440c of the decoder unit 435 are inputted to the instruction decoder 434. The instruction decoder 434 outputs a control signal to one of the buffer circuits 421a through 421e, which corresponds to one register among the register groups R0, R2, R4, X0, X1, such that this register is connected to the input bus B1L, based on the state signal ST from the state counter 437. Simultaneously, the instruction decoder 434 outputs a control signal to one of the buffer circuits 422a through 422c, which corresponds to one register among the register groups R1, R3, R5, such that this register is connected to the input bus B1H. Data from the corresponding input bus B1L or B1H is inputted to the designated register, and stored it in the corresponding register.

When the register is designated by the register field, the instruction decoder 434 outputs a control signals from the register decoders 450a through 450e, and 451a through 451c, to one of the buffer circuits 423a through 423c, which corresponds to one register among the register groups R0, R2, R4, such that this register is connected to the output bus B2L. Moreover, the instruction decoder 434 outputs a control signal to one of the buffer circuits, which corresponds to one register among the register groups R1, R3, R5, such that this register is connected to the output bus B2H. As a result, the designated register outputs data to the corresponding output bus B2L or B2H.

Figure 25:
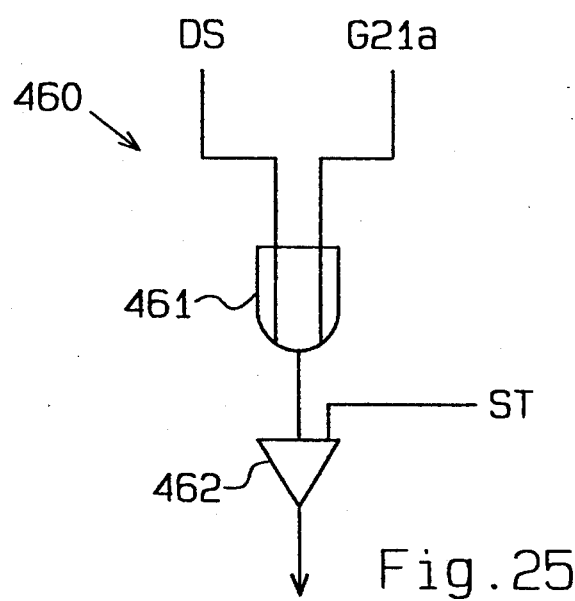
FIG. 25 is a circuit diagram illustrating a decode signal output circuit used in the DSP of FIG. 18.

FIG. 25 shows a decode signal output circuit 460 disposed in the instruction decoder 434, which corresponds to the buffer circuit 421a. An OR circuit 461 outputs the result of a logical adding operation between an instruction direct designate decode signal DS from the instruction decoder 434, and the control signal G21a from the register decoder 439a. A gate circuit 462 outputs the output of the logical adding operation from the OR circuit 461, as a gate signal for the buffer circuit 421a, based on a state signal ST from the state counter 437.

Therefore, even when the register R0 is directly designated by an instruction code or is designated by the register field, the decode signal output circuit 460 outputs a gate signal to the buffer circuit 421a, which corresponds to the register R0.

The instruction decoder 434 includes decode signal outputs circuits each of which had a similar design to the decode signal output circuit 460, and corresponds to each buffer circuit 421b through 421e, 422a through 422c, 423a through 423e, and 424a through 424c.

The instruction decoder 434 determines whether the data should be sent to either one of an operand number input section 425A, or an operating number input section 425B of the adder 425, based on the decoding of the instruction code. When the register is designated by the register field, the instruction decoder 434 controls one buffer circuit which is selected from the buffer circuits 426a, 426b which are disposed at the operand number input section 425A, or the buffer circuits 427a, 427b which are disposed at the operating number section 425B of the ALU 425, to form a transmission path between the designated register and the ALU 425, based on the determination relating to the previously inputted data, and the determination signal SB from the register field code generating circuit 449.

Furthermore, when the register is designated by the register field, the instruction decoder 434 outputs the result calculated by the ALU 425, to the shifter 429. Moreover, the instruction decoder 434 controls the shifter 429, based on a determination signal SA from the register field code generating circuit 438, and outputs the control signals to both buffer circuits 428a and 428b. The result calculated by the ALU 425 is outputted to the input buses B1L, B1H, as is, or is shifted by a unit having a length of n bits.

In this way, according to this embodiment, the input bus B1H and the output bus B2H, and the input bus B1L and the output B2l includes two pairs of bus lines. The register groups R0, R2, R4, X0, X1 are connected to the buses B1H, B2H, via the buffer circuits 421a through 421e, and 423a through 423e. Furthermore, the register groups R1, R3, R5 are connected to the buses B1H, B2H, via the buffer circuits 422a through 422c, and 424a through 424c. Each one of the register decoders 439a through 439e, and 440a through 440c includes an input control decoder for controlling the corresponding buffer circuit, and the input floating preventive decoder of the corresponding buffer circuit. Each one of the register decoders 450a through 450e, and 451a through 451c includes the output control decoder and the output floating preventive decoder, for controlling the corresponding buffer circuit.

Figure 27:
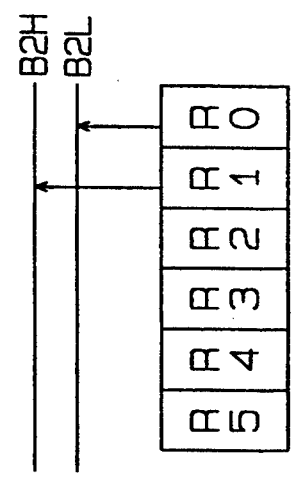
FIGS. 27(a) through (e) are schematic diagrams illustrating the operation of the DSP of FIG. 18.
Figure 27:
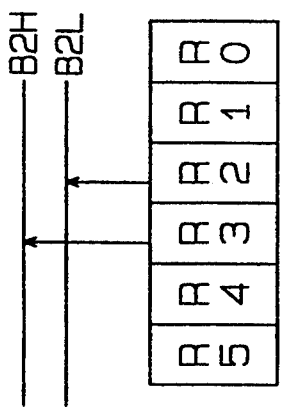
Figure 27:
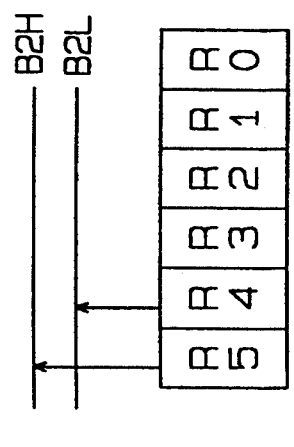
Figure 27:
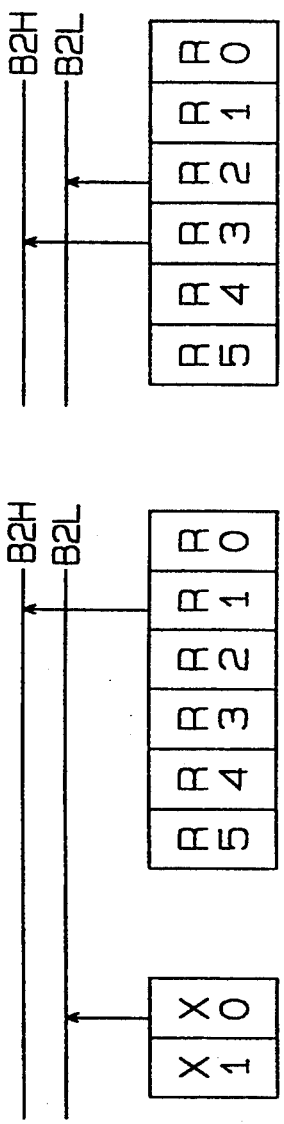
Figure 27:
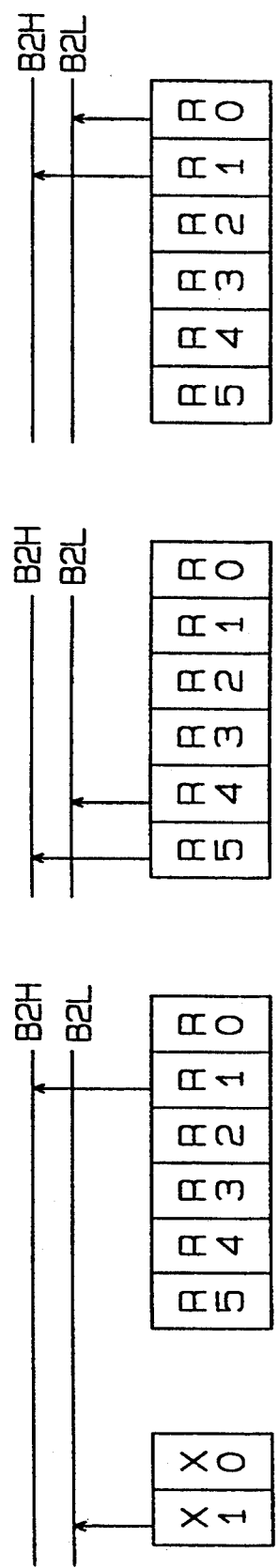

Therefore, when the register is designated by the register field, as shown in FIGS. 27, the designated register is connected to the output bus (or the input bus). The other registers of the register groups which pair up with the designated registers are connected to the same bus disposed at the corresponding register side. Therefore, a floating bus can be omitted in such complex bus design. For example, when one of the registers R0 or R1 is designated by the register field, as shown in FIG. 27(a), the registers R0, R1 are connected to the output buses B2L, B2H, respectively. When one of the registers R2 or R3 is designated by the register field, as shown in FIG. 27(b), the registers R2, R3 are connected to the output buses B2l, B2H, respectively.

When one of the registers R4 or R5 is designated by the register field, as shown in FIG. 27(c), the registers R4, R5 are connected to the output buses B2L, B2H, respectively. When one of the registers X0 or R1 is designated by the register field, as shown in FIG. 27(d), the registers X0, R1 are connected to the output buses B2L, B2H, respectively. Further, when one of the registers X1 or R1 is designated by the register field, as shown in FIG. 27(e), the registers X1, R1 are connected to the output buses B2L, B2H, respectively.

According to this embodiment, the position of the register field in the instruction code is determined by the instruction decoder 434. The register field code is generated by one of the register field code generating circuits 438 or 449, based on the determination by the instruction decoder 434. Therefore, the register field code is accurately determined regardless of its position in the register field, and the floating bus can be omitted.

According to this embodiment, when the register is designated by the register field, the instruction decoder 434 controls one of the buffer circuits of the input sections 425A or 425B in the ALU 425, based on the determination signal SB of the output bus of the register field code generating circuit 449. Therefore, a transmission path is accurately formed from the register designated by the register field to the ALU 425.

According to this embodiment, when the register is designated by the register field, the instruction decoder 434 controls the shifter 429, based on the determination signal of the input bus from the register field code generating circuit 438. The instruction decoder 434 outputs the result of the calculation by the ALU 425, to the input buses B1L and B1H, as is, or is shifted by a unit having a length of n bits. Therefore, an output path to the designated register is formed, and the floating bus can be omitted.

According to this embodiment, the present invention is embodied in the DSP 420, which includes a pair of buses including the input bus B1L and the output bus B2L, and a pair of buses including the input bus B1H and the output bus B2H. However, the number of bus pairs is not limited to that of bus pairs described above. For example, the number of bus pairs can be three. Further, the present invention can be embodied into the micro processor which has three register groups. Each register group includes at least one register which corresponds to each bus pair. In this microprocessor, when the register is designated by the register field, the designated register is connected to one of the input bus or the output bus in relation to the associating bus pair. If one register in the other register groups is connected to either the input bus or the output bus, the floating bus can be omitted.

Figure 28:
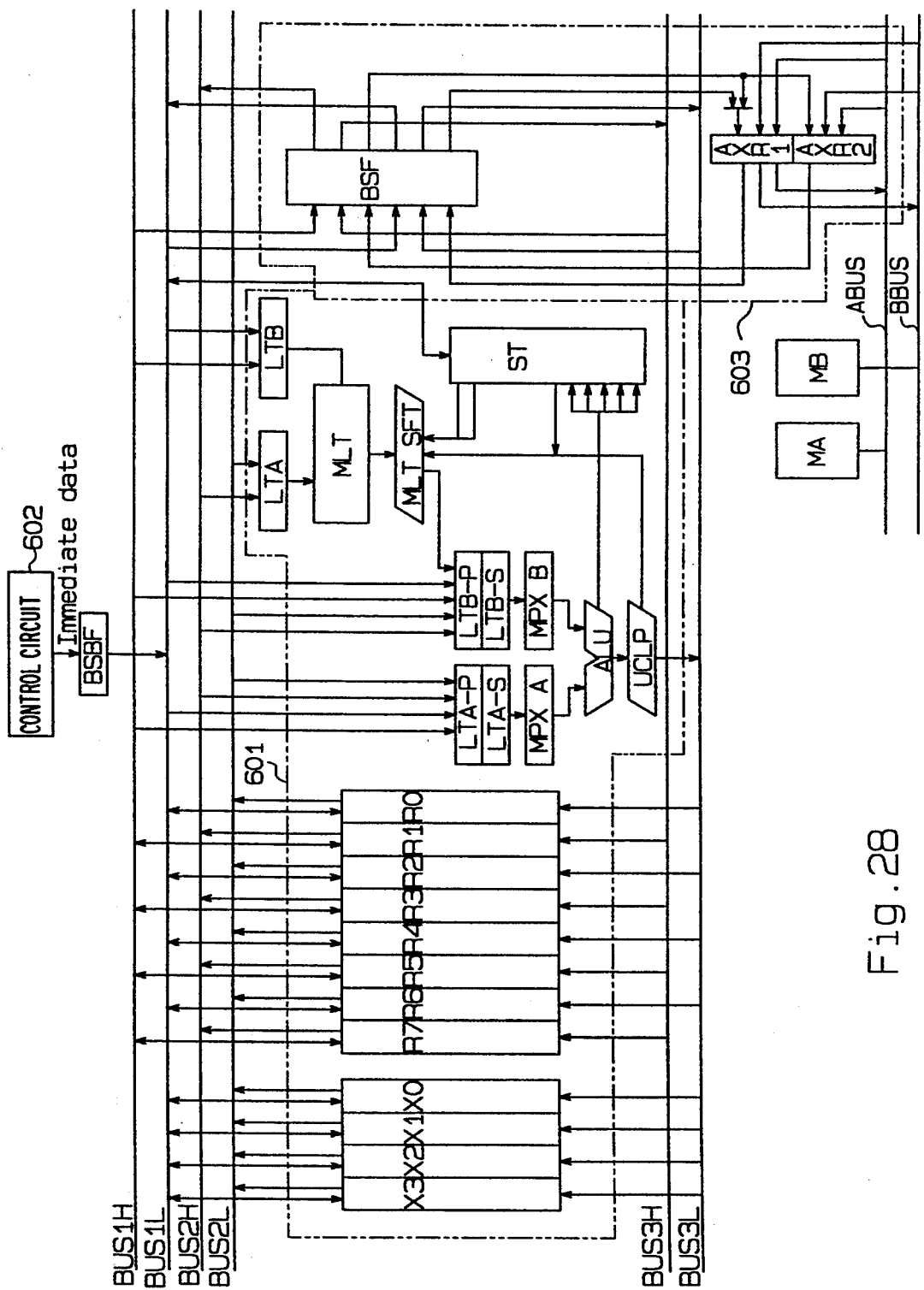
FIG. 28 is an overall schematic design of a multi operational unit, according to another embodiment of the present invention.
Figure 29:
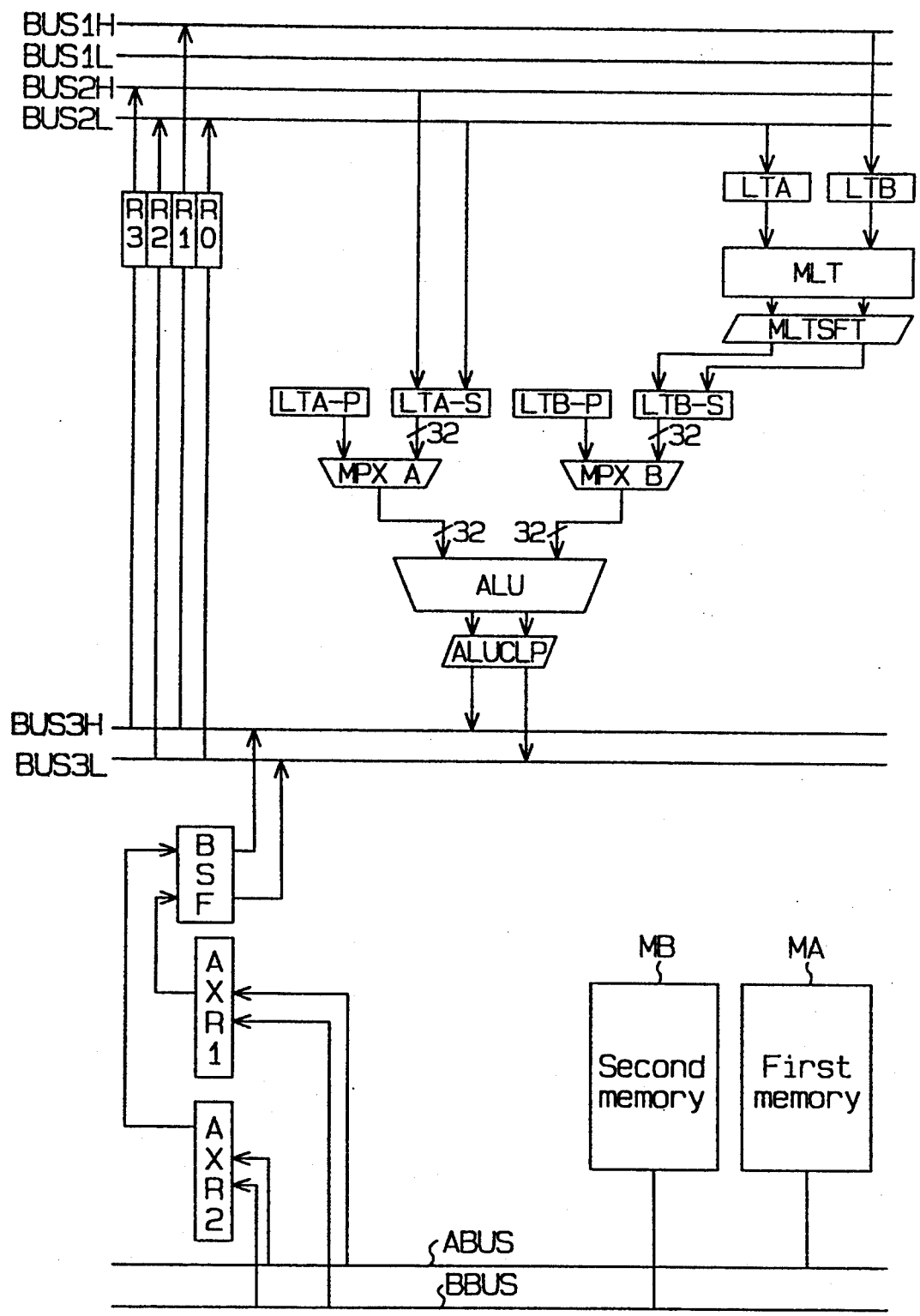
FIG. 29 is a circuit diagram illustrating part of the multi-operational unit of FIG. 28.

Another embodiment according to the present invention will now be explained, with references to the drawings. FIG. 28 shows a design of an execution unit according to this embodiment. As shown in FIG. 28, the operation device includes a CPU registers/execution unit group 601 (hereinafter, referred to as the operation unit group), a control unit, an I/O interface 603, and memories MA, MB. The control circuit 602 corresponds to the sequence unit 11, as shown in FIG. 3, or to each decoder 312, 314, 315 and the buffer group 316, as shown in FIG. 12. The execution unit group 601 includes a plurality of registers R0 through R7, and X0 through X3, a multiplying unit MLT, and a state counter ST, etc. The interface 603 includes a barrel shifter BSF, and buffer registers AXR1, AXR2. This embodiment is characterized by the execution unit group 601 and the interface 603. FIG. 29 shows these characteristic elements.

The execution unit group 601 includes a register R0 having 16 bits, which stores a first operand number, and a register R1 having 16 bits, which stores an upper portion or lower portion of a second operand number B. Moreover, the execution unit group 601 includes registers R2, R3, which store the results calculated by this execution unit group 601, and the (16 bits ×16 bits) multiplying unit MLT (first operation means), which executes a multiplication operation between the first and second operand numbers A and B. Further, the execution unit group 601 includes a shifter MLTSFT (second operating means), which shifts the result calculated by the multiplying unit MLT in the predetermined direction, by a predetermined number of bits, and the 32 bits adder ALU (third operating means), which executes an adding operation between the values stored in the registers R2, R3 and an output value form the shifter MLTSFT. The operation unit 601 is connected to the control circuit 602, which controls and executes the preprogrammed operation, by controlling each element of the operation unit group, based on the control by the microprogram, etc.

The operation unit group 601 according to this embodiment, has a first, second, and third buses BUS1, BUS2, BUS3, used as data transmission buses. FIG. 29 shows separately buses (H) which correspond to the upper portion of the data, and buses (L) which correspond to the lower portion of the data.

16 bits latches LTA, LTB are provided at the input side of the multiplying unit MLT. 32 bits latches LTA-S and LTB-S are provided at the input side of the adder ALU. 32 bits latches LTA-P and LTB-P, and multiplexers MPXA and MPXB are provided at the input side of the adder ALU.

The execution unit in this embodiment is connected to the external first and second memories MA, MB, and the buses ABUS, BBUS, via the interface 603. The interface 603 includes a barrel shifter BSF which executes a shift operation or no operation, based on the data transmitted to either one of the multiplexers AXR1 and AXR2, which selects the data, based on the access address to the first and second memories MA and MB, and the buses BUS3H or BUS3L.

As shown in an equation (1), the operation steps of the operation unit will be explained, taking a for example, a product-sum operation having a 24 bits multiplicand Ai (i is a natural number) and a 16 bits multiplier Bi.

$$c = A1 \times B1 + A2 \times B2 + \quad (1)$$

In this equation, C is the 32 bits result of the calculation.

Figure 30:
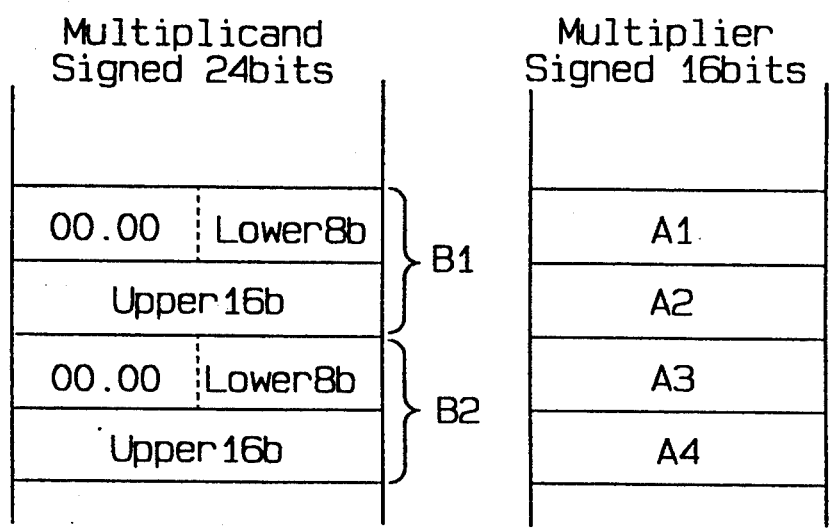
FIGS. 30(a) and (b) are data configuration maps of a multiplier and a multiplicand, respectively, used in a product-sum operation which is executed in the device of FIG. 28.

FIGS. 30(a), (b) show the first and second memories MA, MB, which include memory fields for storing every 16 bits of data. Each memory field of the memories MA, MB stores a 16-bits multiplier A1, A2, etc., and a 24-bits multiplicand B1, B2, etc. The multiplicand B is divided into two parts, a 16-bits upper portion and a 8-bits lower portion. The lower 8-bits portion of the multiplicand is executed by a zero-expand operation in the 16-bits memory field.

Figure 31:
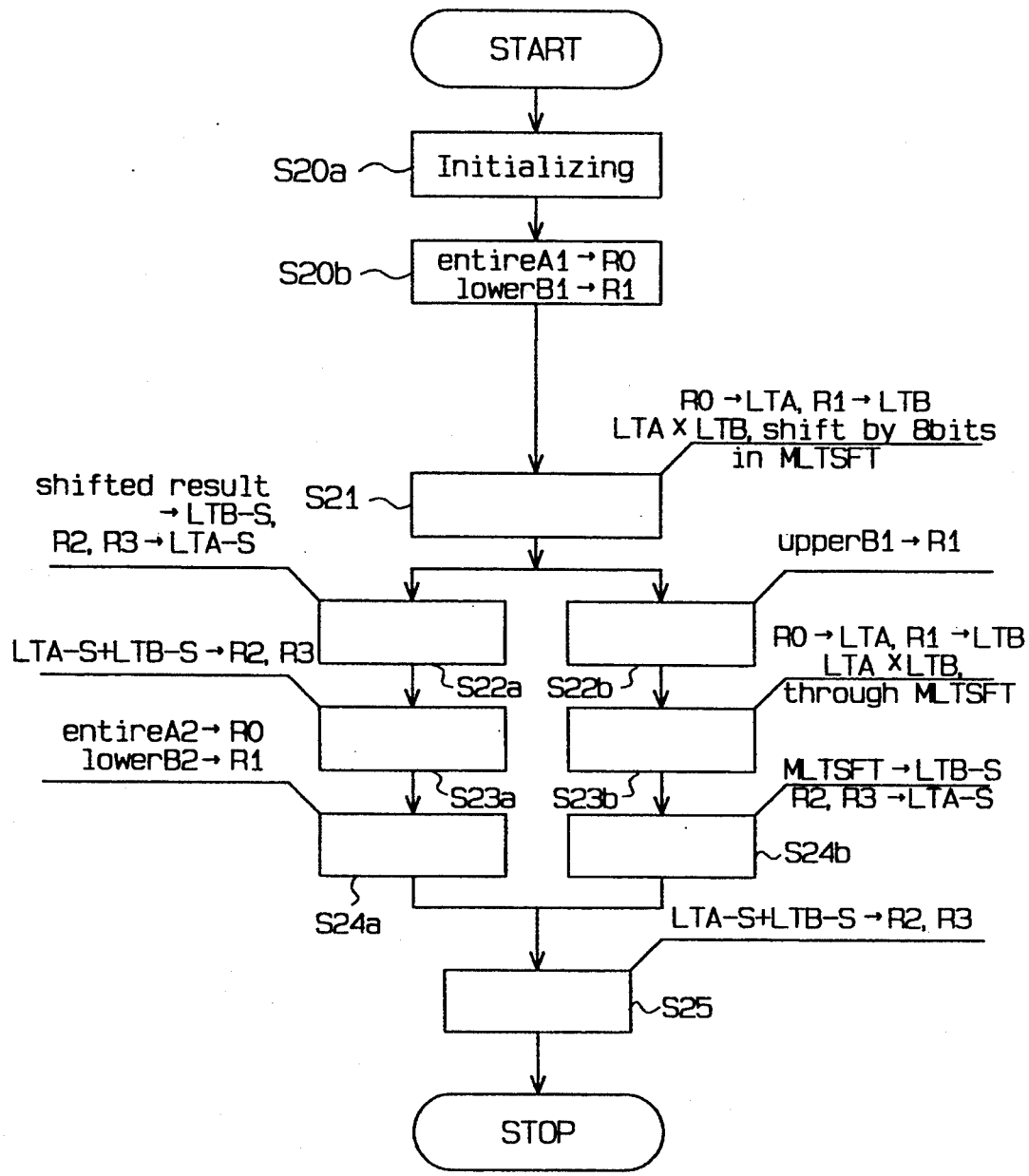
FIG. 31 is a flow chart illustrating the operational steps of a product-sum operation executed in the multi-operational unit of FIG. 28.
Figure 32:
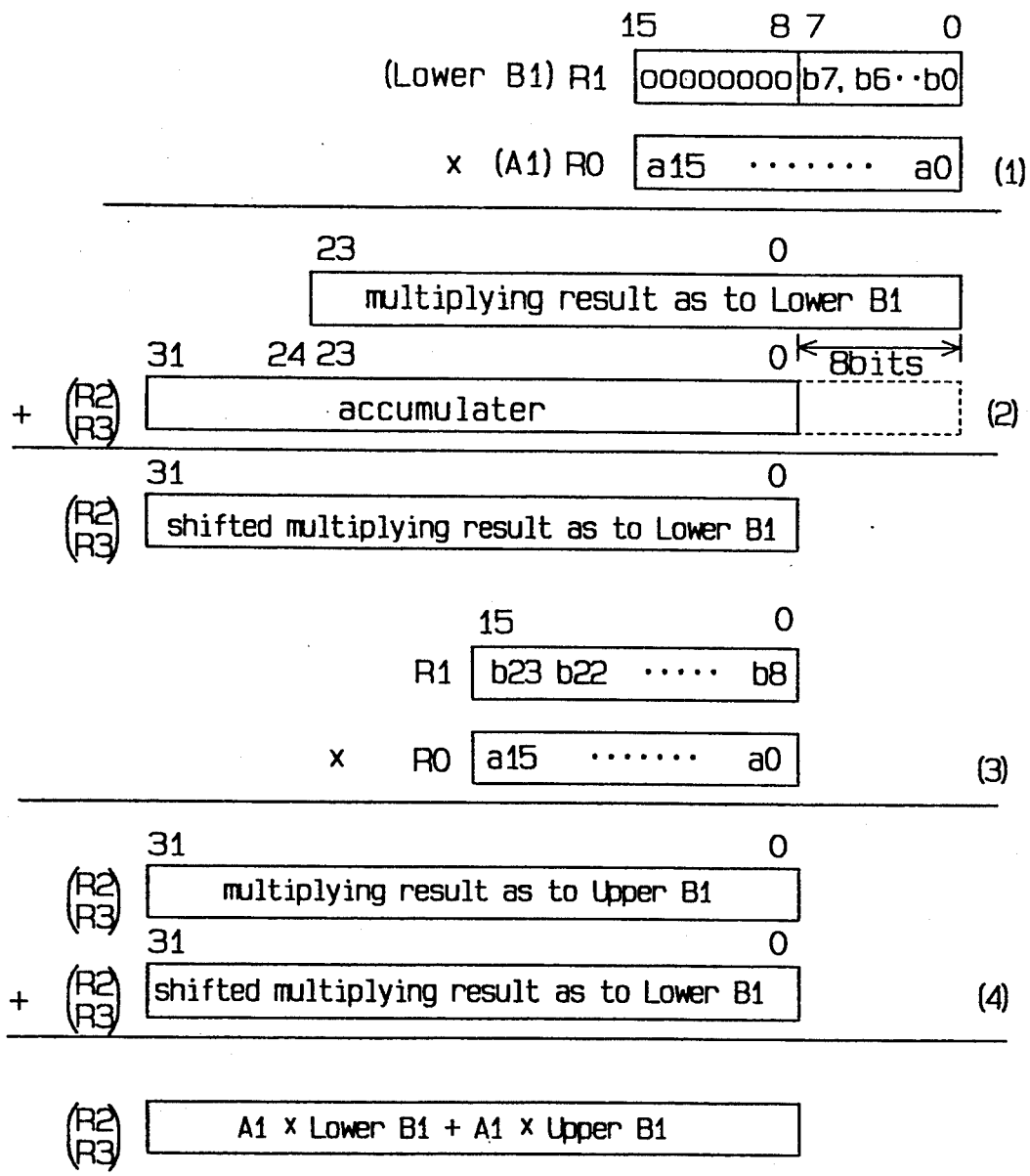
FIG. 32 is a diagram illustrating the steps of a product-sum operation executed in the multi-operational unit of FIG. 28.

FIG. 31 is a flow chart illustrating the operational steps according to this embodiment. FIG. 32 shows the operational steps of a product-sum operation. The control circuit 602 commands each one of the above sections, in order to execute the following operation, based on the microprogram control, etc.

(0) Step S20a through step S20c

First, at step S20a, as shown in FIG. 31, the registers R2, R3, which store the calculated results, are initialized or cleared. At step S20b, the registers R0, R1 load an entire multiplier A1 and the lower portion of a multiplicand B1, from the first and second memories MA, MB, respectively.

(1) Step S21

The contents of the registers R0, R1 are transmitted to the latches LTA, LTB, via the lower BUS2L of the second bus and the upper BUS1H of the first bus. The multiplying unit MLT multiplies two numbers transmitted to the latches LTA and LTB, such as the multiplier A1 and the lower portion of the multiplicand B1 (operation 1 in FIG. 32). Then, the result of this multiplication operation is shifted in the right direction by 8 bits, in the shifter MLTSFT.

(2) Step S22a and step S22b

Next, at step S22a, the shifted result is transmitted to the latch LTB-S, and the contents of the registers R2, R3 are transmitted to the latch LTA-S, via the second buses BUS2H, BUS2L. Simultaneously, at step S22b, the upper portion of the multiplicand B1 is loaded from the second memory MB to the register R1.

(3) Step S23a and step S23b

Next, at step S23a, the adder ALU executes the adding operation between two numbers stored in the latches LTA-S and LTB-S. In other words, the number is shifted after being added, and the contents of the registers R2, R3 are added (operation 2 as shown in FIG. 32). The sums of the upper portion and the lower portion are loaded to the registers R2, R3, via the third buses BUS3H, BUS3L, respectively. Simultaneously, at step S23b, the contents of the registers R0, R1 are transmitted to the latches LTA, LTB, respectively. The multiplier unit MLT multiplies those values (operation 3, as shown in FIG. 32), and the shifter MLTSFT executes the through operation (not shifted).

(4) Step S24a and step S24b

Next, at step S24a, each register R0, R1 loads the next multiplier A2 and the lower portion of next multiplicand B2, from the first and second memories MA, MB, respectively. Simultaneously, at step S24b, the output of the shifter MLTSFT is transmitted to the latch LTB-S, and the contents of the registers R2, R3 are transmitted to the latch LTA-S, via the second buses BUS2H, BUS2L, respectively.

(5) Step S25

Further, at step 25, the adder ALU adds the numbers stored in the latches LTA-S and LTB-S. In other words, the number is shifted after being added, and the contents of the registers R2, R3 {calculated result of A1×(upper portion of B1)} are added (operation 4, as shown in FIG. 32). The sum {A1×(upper portion of B1)+A1×(lower portion of B1)=(A1×B1)} is loaded into the registers R2, R3, via the third buses BUS3H, BUS3L, respectively.

In this example, since the lower portion of the second multiplicand B2 is stored in the register R1, the steps (1) through (5) are repeatedly executed. As a result, the registers R2, R3 store the result of the product-sum A1×B1+A2×B2.

According to this embodiment, the previously calculated results, which are stored in the registers R2, R3, and the product and the shifted result are added together. Thereafter, re-storing the sum in the registers R2, R3 is stored once again, simultaneously with the loading of the multiplier A and either the lower portion or the upper portion of the multiplicand B from the memory. Therefore, when the multiple-precision operations are executed, the increase in the execution speed can be controlled. If the foregoing operations (1) through (5) are executed in a single machine cycle, executing a single product-sum operation requires 5 machine cycles, as compared to the 8 machine cycles, that are required in the conventional unit of this type. Therefore, The execution time is reduced to ⅝ time by the conventional unit.

In this embodiment, the multiplicand number has a length of 24 bits, but it is not limited to the above number of bits. It can be any number of bits between 17 bits and 32 bits. The first, second, third operations in the embodiment include, but are not limited to multiplication, shifting, and addition.

Figure 33:
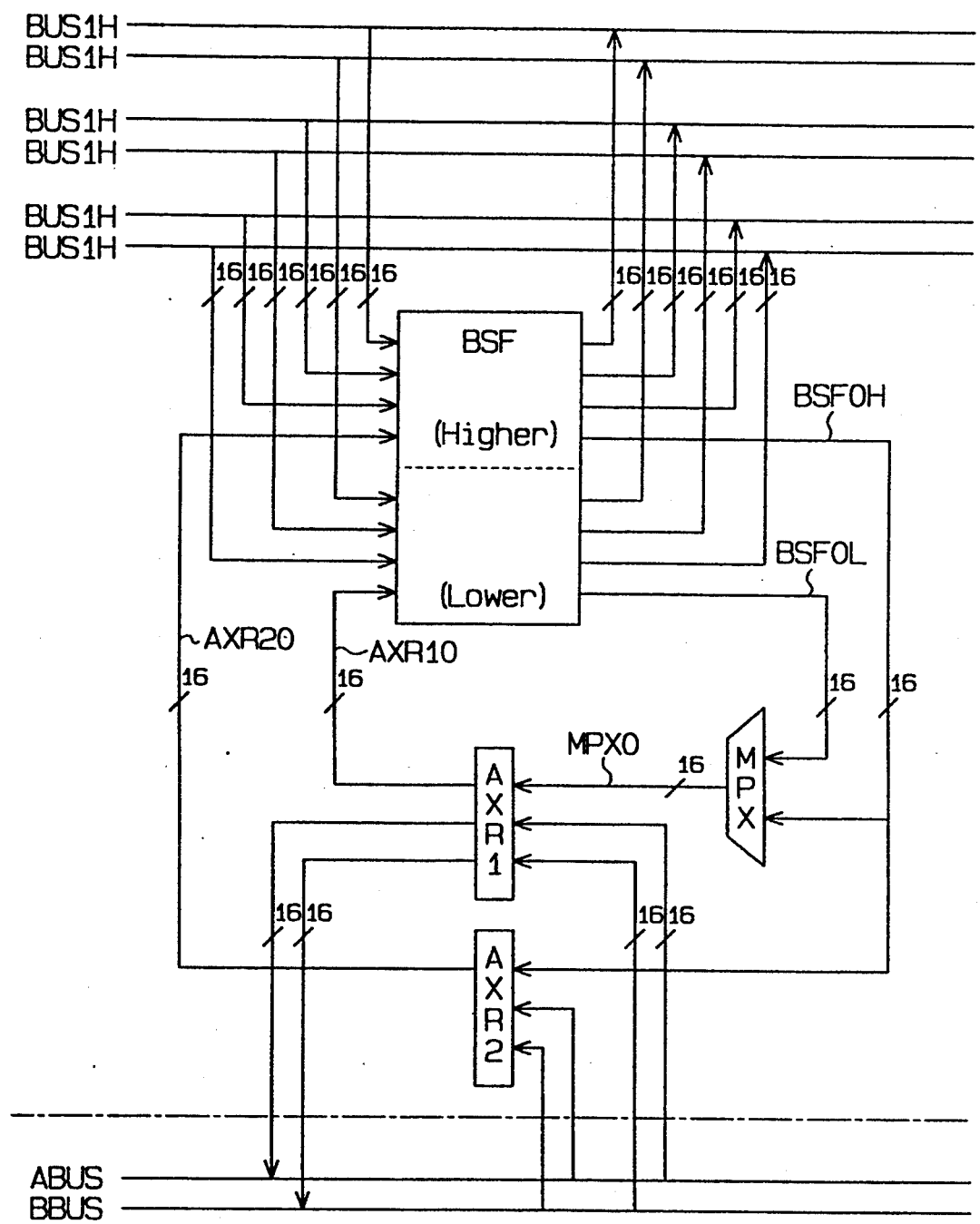
FIG. 33 is a schematic illustrating an interface section of the multi-operational unit of FIG. 28.

Next, the other formation of the interface according to the above described embodiment will now be explained, with reference to the drawings. FIG. 33 shows the interface of the execution unit according to this embodiment. The execution unit of this embodiment uses a word data which has a length of 16 bits or 32 bits. Since the interface shifts 32 bits of data every predetermined length of bits, in the left direction, a 32 bits barrel shifter BSF is provided. Further, the interface includes the first and second 16 bits buffer registers AXR1, AXR2. Furthermore, the interface includes the multiplexer MPX. The multiplexer selects the upper output BSFOH and the lower output BSFLO of the barrel shifter BSF, and transmits a predetermined output MPXO to the barrel shifter AXR1.

Figure 34:
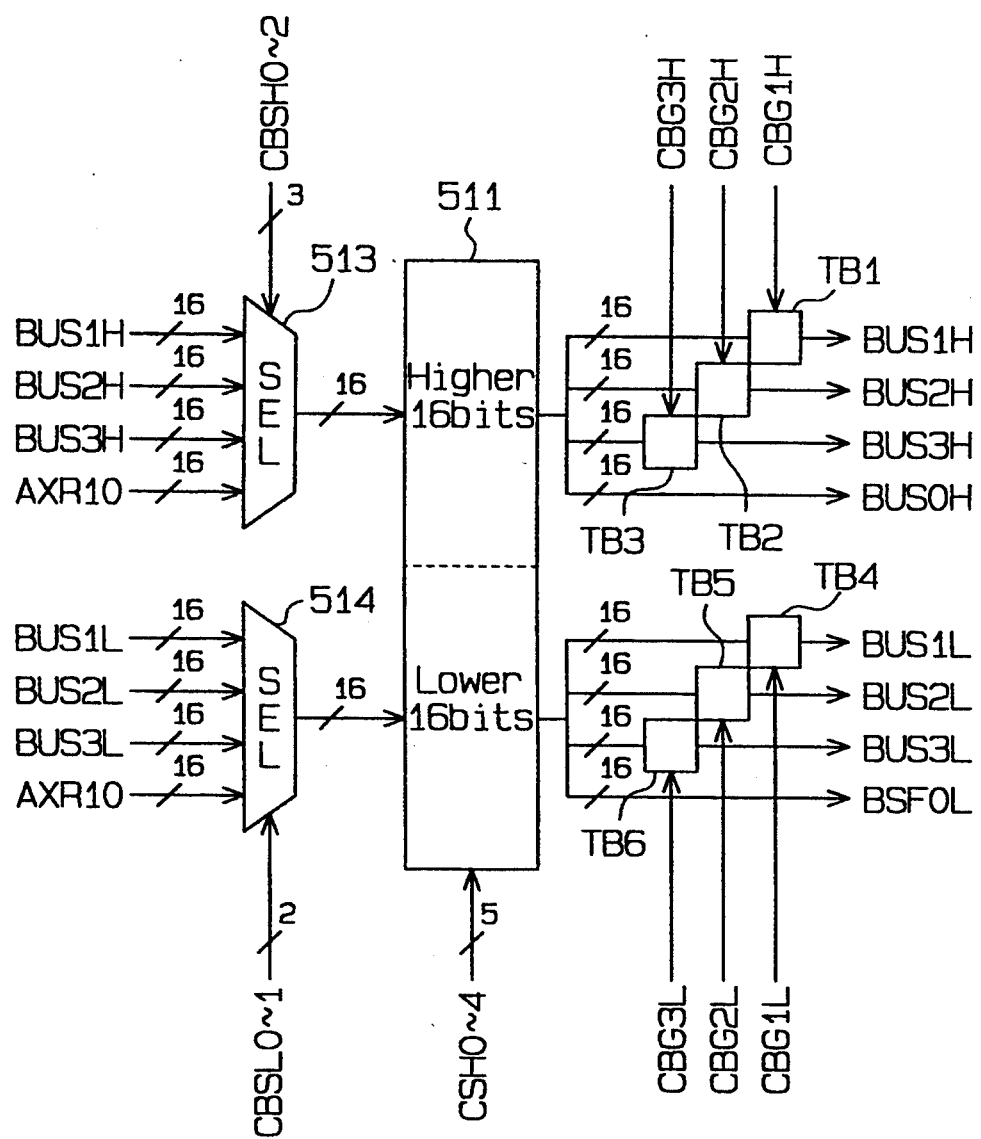
FIG. 34 is a schematic illustrating a barrel shifter employed in the interface section of FIG. 33.

FIG. 34 shows a design of the entire barrel shifter BSF in detail. The barrel shifter BSF includes a shifter 511 which shifts data in the left direction, based on the bit number indicating signals CSH0 through CSH4, which are outputted from the control circuit 602 in the above-described embodiment. The shifter 511 inlcudes peripheral circuits, such as a selector, etc., which corresponds to every input/output of the upper and lower portion of the 16 bits data.

The upper portion of a shifter 511 is connected to a selector 513. The selector 513 inputs the outputs from the first, second, and third buses BUS1, BUS2, BUS3, and the output AXR20 from the second buffer register AXR2. Then, the selector 513 selects the output from each bus and the output AXRO, and outputs the selected output, based on the select control signals CBSH0 through CBSH2, to the upper portion of the shifter 11. The select control signals CBSHO through CBSH2 are ouputted from the control circuit 602.

Further, the upper portion of the shifter 511 is connected to the tristate buffers TB1 through TB3. These tristate buffers TB1 through TB3 transmit the output from the upper portion of the shifter 511 to the first, second, and third buses BUS1, BUS2, BUS3, corresponding to the gate control signals CBG1H through CBG3H. The gate control signals CBG1H through CBG3H are outputted from the control circuit 602.

The Selector 513, which corresponds to the upper 16 bits data, has a function which is capable to clip the output at "0". Then, the selector 513 locks all 16 bits outputs at "0", based on the selec control signals CBSH0 through CBSH2 from the control circuit 602.

The lower portion of the shifter 511 in the barrel shifter BSF connects to the selector 514 and tristate buffers TB4 through Tbr, similar to the upper portion.

Figure 35:
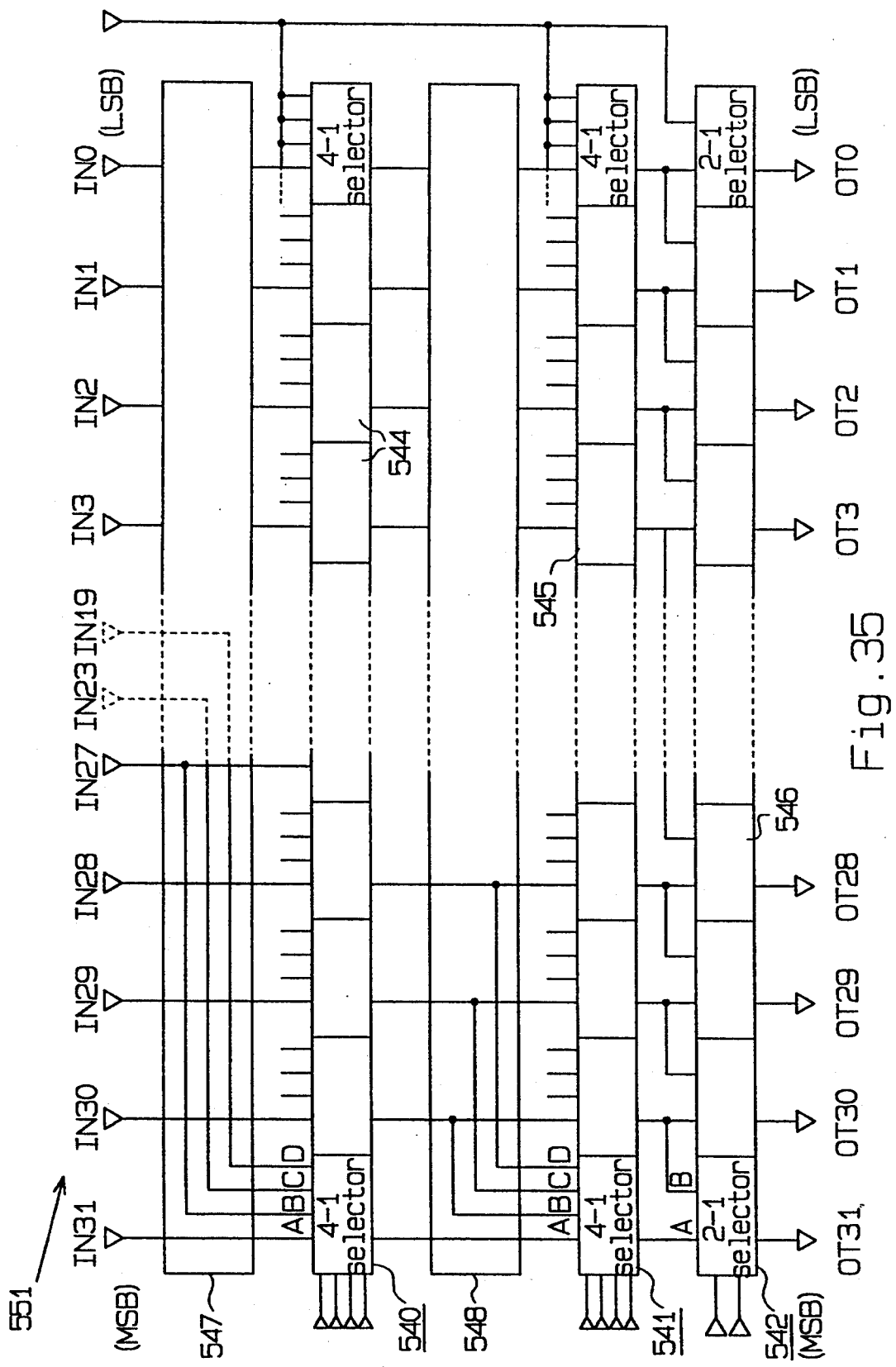
FIG. 35 is a diagram illustrating a shifter section of the barrel shifter of FIG. 34.

The shifter 511, as shown in FIG. 35, includes first, second, and third selector groups 540 through 542, in order to shift the data having a length of 32 bits, by predetermined bits in the range of zero to 16. Each one of the first and second selector groups 540, 541 includes thirty two 4-1 selector units 544, 545. A third selector group 542 includes thirty two 2-1 selector units 546.

A first wiring region 547 includes thirty two input terminals IN0 through IN31, and each selector 513, 514 is connected to the shifter 511, via the input terminals, as shown in FIG. 34. The first, fifth, ninth, and thirteenth input terminals IN31, IN27, IN23, IN19, that are counted from the left end of the first wiring region 547, are connected to each terminal A through D of the selector unit 544, which is disposed at the left end. The second, sixth, tenth, fourteenth input terminals IN30, IN26, IN22, IN18 that are disposed from the left end of the first wiring region 547, are connected respectively to each terminal A through D of the second selector unit, which is disposed at the next to the left end. In general, four input terminals (n+4i)th (n: natural number, i: 0 through 3) counted from the left end of the first wiring region 547, are respectively connected to four terminals of the n-th selector unit, counted from the left.

Figure 36:
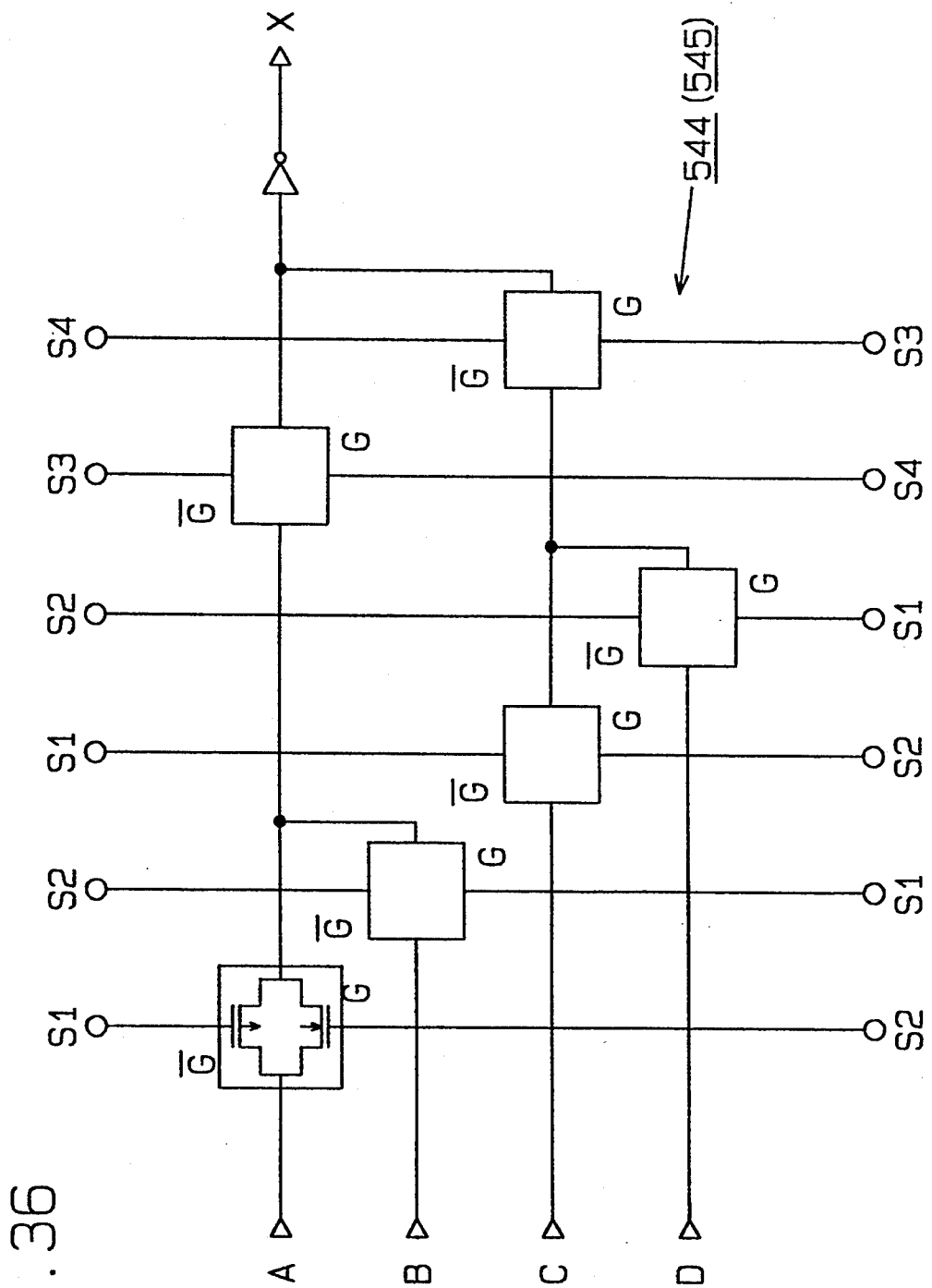
FIG. 36 is a circuit diagram illustrating a 4-1 selector used in the shifter section of FIG. 35.

On the other hand, each 4-1 selector unit 544, 545, as shown in FIG. 36, includes 4 buffers, which are disposed at the predetermined intersections of matrixly provided wires. Responsive to the complimentary gate signals bar G, G being inputted to each buffer from the control circuit 602, via the input terminals S1 through S4 of the selector unit 544, one signal is selected from four input terminals A through D, and is outputted from an output terminal X. Therefore, when the first selector group 540 inputs 32 bits long data from each of the selectors 513, 514, as shown in FIG. 34, via the first wired region 547, the data is shifted by any number of bits, selected from 0, 4, 8, or 12 bits.

Each selector unit 544 of the first selector group 540 is connected to the corresponding selector 545 of the second selector group 541, via a second wiring region 548. Each output from the first through fourth selector units, counted from the left end of the first selector group 540, is connected to the corresponding terminal A through D of the selector unit 545, which is disposed at the left end of the second selector group 541. Each output from the second through fifth selector unit, counted from the left end of the first selector group 540, is connected to each corresponding terminal of the second selector unit 548, counted from the left end of the second selector group 541, via the second wiring region 548. In general, each of the four selector units 545, m-th th through (m+3)−th (m: natural number), is connected to each terminal A through D of the selector unit 545, counted m-th from the left end of the second selector group 541. Therefore, when the 32 bits long data is inputted from the first selector group 540 to the second selector group 541, via the second wiring region 548, the data is shifted by any number of bits, selected from 0, 1, 2, or 3 bits.

The first 4-1 selector unit 545 of the second selector group 541 is connected to the first 2-1 selector unit 546 of the third selector unit 542. The second selector unit 545 is connected to the first and second 2-1 selector units 546. In general, the p-th (p: natural number) selector unit 545 of the second selector group 541 is connected to the p-th and (p-1)—th 2-1 selector units 546.

Figure 37:
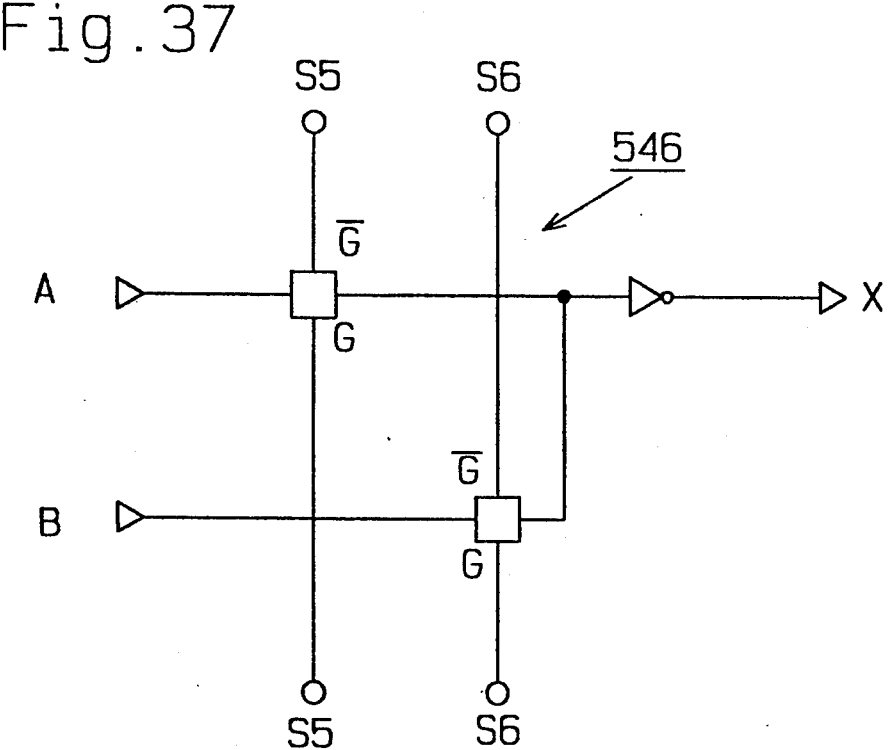
FIG. 37 is a circuit diagram illustrating a 2-1 selector used in the shafter section of FIG. 35.

On the other hand, each 2-1 selector unit 546, as shown in FIG. 37, includes two buffers, which are disposed at the predetermined intersections of matrixly provided wires. Responsive to the complimentary gate signals bar G, G being inputted to each buffer from the control circuit 602, via the input terminals S5, S6 of the selector unit 546, one signal is selected from two input terminals A, B, and outputted from the output terminal X. Therefore, when the 32 bits long data is transmitted from the second selector group 541 to the third selector group 542, the data is shifted by 0 or 1.

As described above, when 32 bits long data is inputted to each selector group 540, 541, 542, sequentially from each selector 513, 514, as shown in FIG. 34, the shifter 511 shifts the data by any number of bits, selected from 0 through 16.

Figure 38:
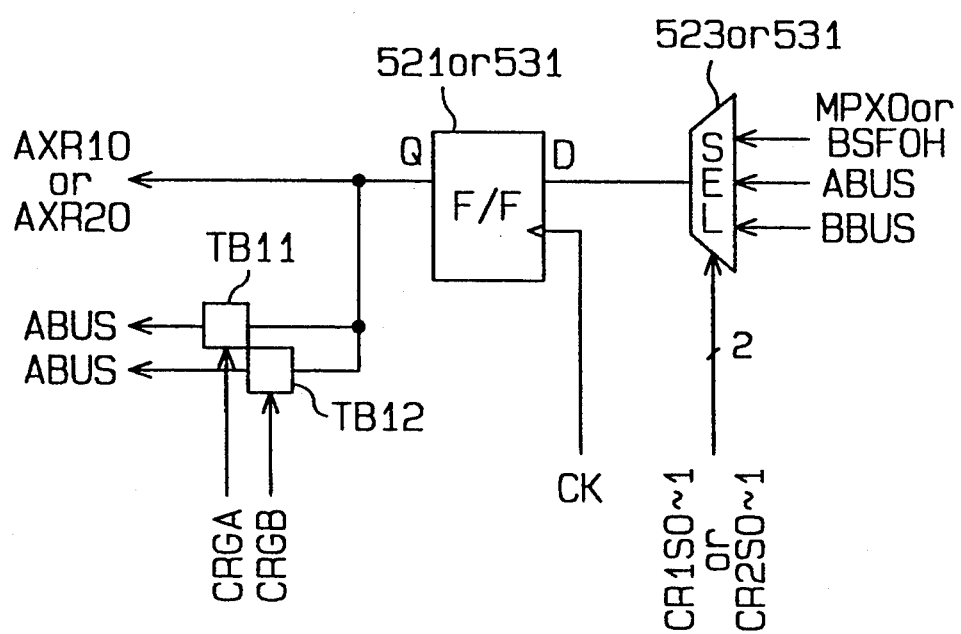
FIG. 38 is a schematic circuit illustrating a first and second buffer registers employed in the interface section of FIG. 33.

FIG. 38 shows the first and second buffer registers AXR1, AXR2 in detail. The first buffer register AXR1 includes a selector 523. The selector 523 selectively inputs the output MPXO from the multiplexer MPX, and the outputs from the external buses ABUS, BBUS, based on the select control signals CR1S0 through CR1S1. The first buffer register AXR1 includes the register 521 which is formed by sixteen D-type flip-flops. Further, the first buffer register AXR1 includes tristate buffers TB11, TB12. These buffers transmit the output of the registers 521 to each one of the external buses ABUS, BBUS, in response to the gate control signals CRGA through CRGB.

The second buffer register AXR2 includes a selector 533 and a register 531. The upper output BSFOH of the barrel shifter BSF and the outputs of the external buses ABUS, BBUS, based on control signals CR2S0 through CR2S1 are selectively inputted to the selector 533. The register 531 includes sixteen D-type flip-flops. Each select control signal CR1S0 through CR1S1, and CR2S0 through CR2S1 is inputted from the control circuit 602.

Figure 39:
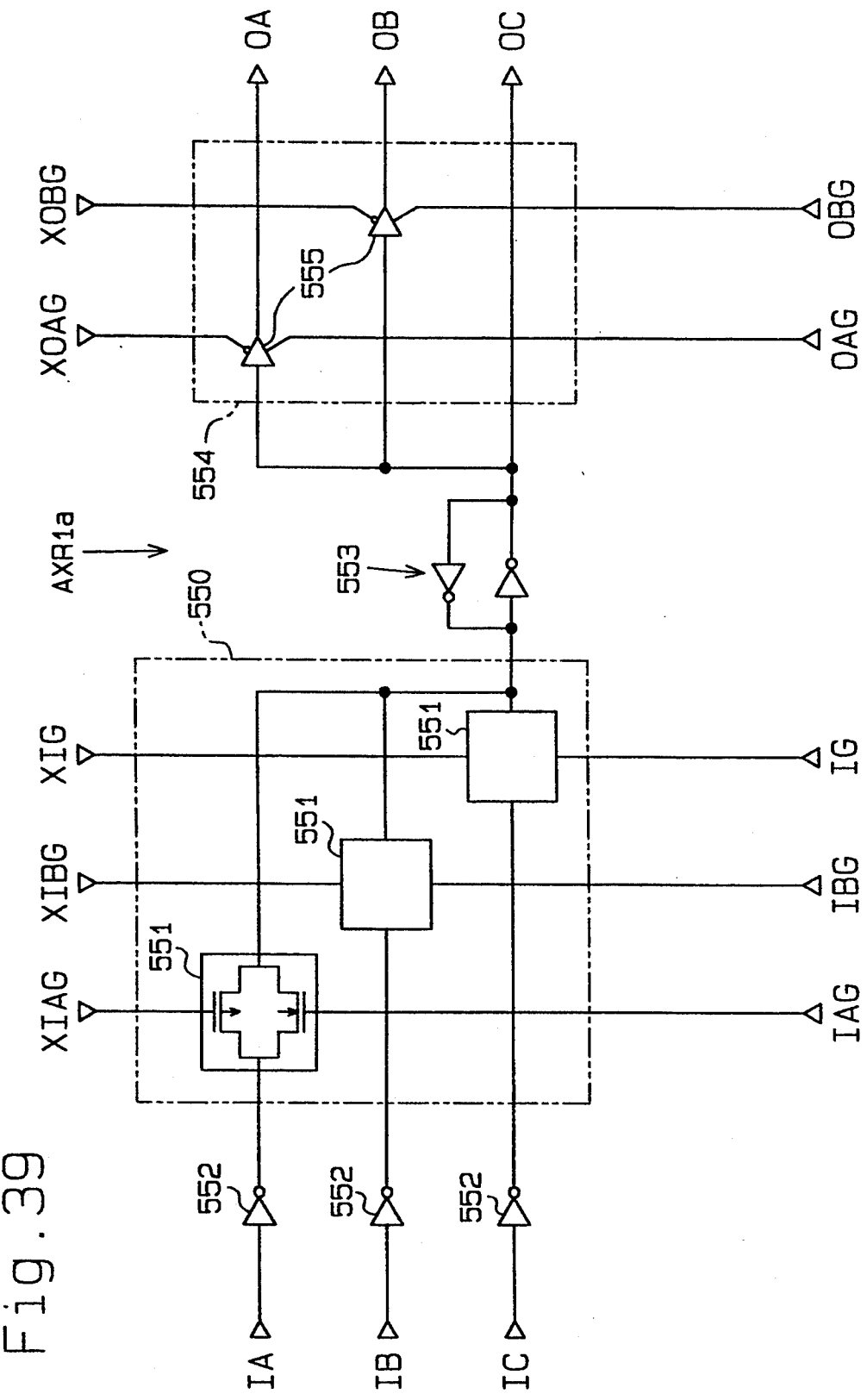
FIG. 39 is a diagram illustrating a buffer register AXR1, employed in another embodiment according to the present invention.

Instead of the buffer registers AXR1, AXR2, as shown in FIG. 38, the buffer registers shown in FIGS. 39 and 40 can be used. A buffer register AXR1a, as shown in FIG. 39 includes a first selector block 550, corresponding to the selector SEL, as shown in FIG. 38. The first selector block 550 includes three buffers 551, three inverters 552, and three inputs IA, IB, IC, corresponding to each bus ABUS, BBUS and a signal MPXO. The first selector block 550 selectively outputs one of three inputs IA, IB, IC, in response to the input signal from the control circuit 602, to each buffer 551.

A buffer register AXR1a includes a buffer circuit 553, corresponding to the register 521 as shown in FIG. 38, and the output of the selector block 550 is inputted to the buffer circuit 553. The buffer register AXR1a includes a second selector block 554. The second selector block 554 includes two buffers 555, and three outputs OA, OB, OC, corresponding to each bus ABUS, BBUS and the signal AXR1O, respectively. The outputs from the output terminals OA, OB, OC of the buffer circuit 553 are outputted, in response to the signal inputting to each buffer 555, from the control circuit 602.

A buffer register AXR2a, as shown in FIG. 40, includes a selector block 561 and a buffer circuit 562. The selector block 561 includes three buffers 563, three inverters 564, three inputs IA, IB, IC corresponding to each bus ABUS, BBUS, and the signal BSFOH. The selector 561 outputs one input which is selected from three inputs IA, IB, IC, in response to the signals inputted to each buffer 563 from the control circuit 602. The selected output is outputted to the barrel shifter BSF, via the buffer circuit 562.

The barrel shifter BSF according to this embodiment, which is described above can handle data having a length of 16 bits and 32 bits. The first and second buffer registers AXR1, AXR2 act as the buffer registers of the external buses ABUS, BBUS, and also act as temporary registers of the barrel shifter BSF.

According to this embodiment, format exchange of data, which is loaded/stored in the operation unit, is executed by means of combining the barrel shifter BSF and the first and second buffer registers AXR1, AXR2. The format change operation includes the operation which transforms data having the length of an ordinary word into data having the length of a long word, and vice versa. A bus selecting function utilizing the shift function of the barrel shifter BSF can be materialized, by means of the above-described combination. The first and second buffer registers AXR1, AXR2 can be employed as temporary registers. Moreover, the above-described combination can be utilized as a supplementary register and bus selector for the operation unit, if entire functions of the above-mentioned elements are combined.

The embodiments, in which the above-described functions are utilized, will now be explained in detail.

(1) Temporary storing for a 16 bit-long data in the buffer register

In this case, data is stored in the first buffer register AXR1 from one of the first, second or third buses BUS1, BUS2, or BUS3, via the barrel shifter BSF. In other words, a 16 bit-long data, which is stored in the lower portion of the barrel shifter BSF, is shifted by 16 bits in the left direction, by the function of the barrel shifter BSF. After that, the shifted data is outputted from the upper portion of the barrel shifter BSF as an output BSFOH, and inputted to the first buffer register AXR1, via the multiplexer MPX. In the case where a 16 bit-long data is inputted in the lower portion of the barrel shifter BSF, the data just goes through the barrel shifter BSF, and is inputted to the first buffer register AXR1, via the multiplexer MPX.

(2) Temporary storing for a 32 bit-long data in the buffer register AXR

In this case, the lower 16 bits of a 32 bit-long data are temporary stored in the first buffer register AXR1, from one of the first, second or third BUS1, BUS2 OR BUS3, via the barrel shifter BSF. Upper 16 bits of the 32 bit-long data are temporarily stored in the second buffer register AXR2. At this time, the multiplexer MPX selects the lower output BSFOL of the barrel shifter BSF.

(3) Temporarily storing for only upper 16 bits of a 32 bit-long data in the buffer register AXR, after shifted by the predetermined number of bits in the barrel shifter BSF In this case, a 32 bit-long data loaded in the barrel shifter BSF is shifted by the predetermined number of bits in the left direction, and is outputted as an output BSFOH from the upper portion of the barrel shifter BSF, and is then inputted to the first buffer register AXR1, via the multiplexer MPX.

When the data stored in the buffer register is to be loaded to the execution unit, in the reverse sequence with respect to the above-described sequence (1) through (3), this operation will be executed according to following steps:

(4) To load a 16 bit-long data stored in the first buffer register AXR1 into the execution unit, and the data having original bit length, via barrel BSF When data is to be outputted to the upper portion of bus BUSiH (i=1 through 3), the data is shifted by 16 bits in the left direction, by the barrel shifter BSF, and the tri-state buffer is opened, in response to the gate control signal CBGiH. Moreover, when data is to be outputted to the lower portion of bus BUSiL (i=1 through 3), the data goes through the barrel shifter BSF, and the tri-state buffer is opened, in response to the gate control signal CBGiL.

(5) To load a 32 bit-long data to the operation unit, after a 16 bit-long data stored in the first buffer register AXR1 is transformed to become the 32 bit-long data by a format expansion operation In this case, the upper portion of the barrel shifter BSF is cleared to "0", and the data stored in the first buffer register AXR1 is inputted to the lower portion. The data is shifted by the predetermined number of bits (selected from 0 through 15), and the shifted data having a 32 bit data format is outputted to the first bus BUSi.

Further, since the barrel shifter BSF can handle 32 bits long data, the upper and lower portions can execute different operation, simultaneously. For example, (6) A 16 bit-long data stored in the second buffer register AXR2 is loaded to the operation unit from the upper portion of the buffer register BSF, via the i-th bus BUSi. At the same time, 16 bits long data from the j-th bus BUSj (j≠i) is loaded to the first buffer register AXR1.

(7) When two 16 bits long operand data are loaded from the external buses ABUS, BBUS, which are used in the operation such as multiplication, the first AXR1 loads one data and the second buffer register AXR2 loads the other data, and two operand data are considered as a single 32 bit-long data, which is loaded at once, via the barrel shifter BSF.

The foregoing is considered illustrative only of the principles of the invention. Further, since numerous modifications and changes will readily occur to those skilled in the art, it is not desired to limited the invention to the exact construction and applications shown and described, and accordingly, all suitable modifications and equivalents may be resorted to, falling within the scope of the invention and the appended claims and their equivalents.

What is claimed is:

1. An operation unit comprising:
a multiplying unit for calculating a product by multiplying a multiplicand and a multiplier;
an adder unit, connected to said multiplying unit, for adding a summand and any one of an output of said multiplying unit or an addend;
timing signal generating means for generating a first timing signal synchronized with a first clock, and a second timing signal having a different phase from said first clock, said second timing signal being synchronized with a second clock;
a first instruction latch, connected to said timing signal generating means, for loading an instruction synchronously with said first timing signal, and for outputting a first control signal corresponding to said instruction;
a second instruction latch, connected to said first instruction latch, for loading an instruction loaded in said first instruction latch synchronously with said second timing signal, and for outputting a second control signal corresponding to said loaded instruction; and
a control signal selector, connected to said first and second instruction latches, for inputting said first and second control signals, to output said second control signal to said adder unit, in response to said first timing signal, and to output said first control signal to said adder unit, in response to said second timing signal.

2. An operation unit according to claim 1, comprising a third timing signal generated synchronously with said first timing signal, and a fourth timing signal generated synchronously with said second timing signal, whereby said control signal selector is controlled by said third and fourth timing signals.

3. An operation unit according to claim 2, wherein said third timing signal is outputted in the same timing as said first timing signal, and said fourth timing signal is outputted in the same timing as said second timing signal.

4. An operation unit according to claim 2, wherein first and second clocks are prepared as basic clocks, for controlling the operation of the operation unit, and wherein said third timing signal is outputted in the same timing as said first clock, and said fourth timing signal is outputted in the same timing as said second clock.

5. An operation unit according to claim 1, further comprising a register, wherein said adder unit adds a summand and an output of said register, based on said second control signal, and also adds a summand and an addend based on said first control signal.

6. An operation unit according to claim 1, further comprising:
an inner bus disposed inside the operation unit and connected to a memory;
an outer bus disposed outside the operation unit and connected to the operation unit and the memory;
a buffer register selectively exchanging data between the operation unit and said outer bus; and
a shift circuit for shifting data selectively inputted from one of said buffer register and said inner bus, by a predetermined bit in a predetermined direction, to selectively output shifted data to one of said buffer register and said inner bus.

7. An operation unit according to claim 6, wherein said buffer register comprises a plurality of buffer groups which load smaller bit data than said data to be shifted by said shift circuit.

8. An operation unit according to claim 6, wherein said shift circuit is divided into higher and lower portions which correspond to said higher and lower portions of said data with predetermined bits, and wherein said buffer register includes a plurality of buffer groups for selectively inputting said higher and lower portions of said data from said outer bus and said shift circuit, to load said smaller bit data.

9. An operation unit according to claim 6, wherein said shift circuit is capable of shifting a given bit of said data to one of "0" and "1".

10. An operation unit comprising:
a multiplying unit for calculating a product by multiplying a multiplicand and a multiplier;
a pipeline register, connected to said multiplying unit, for loading a multiplication result calculated by said multiplying unit;
a data selector for receiving an output of said pipeline register, and an addend to select and output one of an output of said pipeline register and an addend;

an adder unit for adding a summand and an output of said data selector;

a timing signal generating circuit for generating a first timing signal synchronized with a first clock, and a second timing signal having the same frequency as, and a different phase from that of said first clock, said second timing signal being synchronized with a second clock;

a primary instruction register for loading an instruction synchronized with said first timing signal, to output the loaded instruction;

a secondary instruction register for loading an instruction sent via said primary instruction register, synchronized with said second timing signal, to output the loaded instruction;

a control signal selector for inputting an instruction via said primary instruction register, and an instruction via said secondary instruction register and outputting an instruction via said secondary instruction register, in response to said first timing signal, and an instruction via said primary instruction register, in response to said second timing signal;

a first instruction decoder for decoding an instruction via said primary instruction register into a multiplying unit control signal and outputting a decoded instruction to said multiplying unit and said pipeline register; and a second instruction decoder for decoding an instruction outputted from said control signal selector into an arithmetic logic unit, ALU, control signal, and outputting a decoded instruction to said data selector and said adder unit.

11. An operation unit comprising:

a multiplying unit for calculating a product by multiplying a multiplicand and a multiplier;

a pipeline register for loading a multiplication result calculated by said multiplying unit;

a data selector for inputting an output of said pipeline register, and an addend to select and output one of said outputs of said pipeline register and an addend;

an adder unit for adding a summand and an output of said data selector;

a timing signal generating circuit for generating a first timing signal synchronized with a first clock, and a second timing signal having the same frequency as, and a different phase from said first clock, said second timing signal being synchronized with a second clock;

a primary instruction register for loading an instruction synchronized with said first timing signal, to output the loaded instruction;

an instruction decoder for decoding an instruction, via said primary instruction register, into a control signal, and outputting the decoded instruction to said multiplying unit and said pipeline register;

a control signal latch for loading the control signal outputted from said instruction decoder, synchronized with said second timing signal, and outputting the loaded control signal; and a control signal selector for inputting a control signal outputted from said instruction decoder and a control signal via said control signal latch, selecting the control signal via the control signal latch, in response to said first timing signal, selecting the control signal outputted from said instruction decoder in response to said second timing signal, and outputting the selected control signal to said data selector and said adder unit.

12. An operation unit comprising:

a multiplying unit for calculating a product by multiplying a multiplicand and a multiplier and outputting a multiplication result;

a pipeline register for loading the multiplication result calculated by said multiplying unit;

a data selector for inputting an output of said pipeline register and an addend, selecting and outputting one of said output of said pipeline register and an addend;

an adder unit for adding a summand and an output of said data selector;

a state counter for outputting a first state signal by counting a first clock, and outputting a second state signal by counting a second clock having the same frequency as, and a different phase from said first clock;

a first instruction decoder, operatively connected to said multiplying unit and said state counter, for decoding an input instruction into a control signal, for outputting the control signal to said multiplying unit and said pipeline register, and for outputting the control signals when the number of cycles required for execution of the instruction code is matched with the first and second state signals;

a logic circuit for generating a first timing signal synchronized with the first clock, based on said control signals and said first and second clocks, and a second timing signal synchronized with said second clock;

a primary instruction register, operatively connected to said fourth instruction decoder, for loading an instruction, synchronized with said first timing signal, and outputting the loaded instruction to said first instruction decoder;

a secondary instruction register, operatively connected to said primary instruction register, for synchronously loading an instruction with said second timing signal, to output the loaded instruction;

a second instruction decoder operatively connected to said secondary instruction register, for decoding an instruction into an arithmetic logic unit, ALU, control signal and outputting the control signal; and an ALU control signal output circuit, operatively connected to said fourth instruction decoder and said fifth instruction decoder, for receiving the control signal outputted from said first instruction decoder, and the control signal outputted from said second instruction decoder, selecting the control signal from said second instruction decoder based on said first clock, selecting the control signal outputted from said first instruction decoder based on said second clock, and outputting the selected control signal to said data selector and said adder unit.

13. An operation unit according to claim 12, wherein said logic circuit comprises:

a first NAND circuit for generating a first timing signal synchronized with a first clock based on the control signal from one of said first instruction decoder and said second instruction decoder and any one of said first and second clocks; and a second NAND circuit for generating a second timing signal synchronized with a second clock signal based on the control signal from said one of said first instruction decoder and said second instruction decoder and the other one of said first and second clocks.

14. An operation unit according to claim 13, wherein said first NAND circuit includes a NAND circuit for generating a first timing signal synchronized with said first clock, based on said control signal and said second clock, and wherein said second NAND circuit includes a NAND circuit for generating a second timing signal synchronized with said second clock based on said control signal and said first clock.

15. An operation unit comprising:
an instruction register for loading and outputting an instruction code;
a state counter for generating a first state signal in response to a first clock signal synchronized with an instruction cycle of the operation unit, and for generating a second state signal in response to a second clock signal having the same frequency as, and a phase difference of half a cycle with respect to said first clock signal;
a first decoder for generating and outputting a first basic control signal in response to said instruction code, and to said first state signal;
a second decoder for generating and outputting a second basic control signal in response to said instruction code, and to said second state signal;
a buffer group, connected to said first and second decoders, for alternatively outputting a first control signal and a second control signal, said first control signal being generated by causing said first basic control signal to be synchronized with said second clock signal, and said second control signal being generated by causing said second basic control signal to be synchronized with said first clock signal, in response to said first and second basic control signals; and
a central processing unit, CPU, register/execution unit group, connected to said buffer group, for executing predetermined operations in response to said first and second control signals outputted from said buffer group.

16. An operation unit according to claim 15, wherein said state counter comprises:
a counter circuit for outputting said first state signal, by performing one of a count and load operation that is synchronized with said first clock signal; and
a latch circuit, connected to said counter circuit, for outputting said second state signal, by loading output data from said counter circuit, the output data being synchronized with said second clock signal.

17. An operation unit comprising:
a plurality of paired buses for transferring "n", n being a natural number digits data, said paired buses including input and output buses;
a plurality of register groups, each register group corresponding to one of said paired buses, each of said plurality of register groups including at least one register for storing said "n" digits data;
a plurality of input connector circuit groups, for connecting said at least one register in said plurality of register groups corresponding to said paired buses, to said input bus in each one of said paired buses;
a plurality of output connector circuit groups for connecting said at least one register in each of said register groups corresponding to said paired buses, to said output bus in each one of said paired buses;
an operation field inherently designating said at least one register, and a register field designating said at least one register;
an instruction code including at least said operation field and said register field;
an instruction decoder for receiving and decoding said instruction code, and, when one register of said plurality of register groups is designated by said operation field, said instruction decoder controlling one of one input connector circuit in said plurality of input connector circuit groups corresponding to said designated register, to connect said designated register to said input bus of each of said paired buses and each output connector circuit of said plurality of output connector circuit groups corresponding to said designated register, to connect said designated register to said output bus of each one of said paired buses;
a register connector circuit for receiving and decoding said instruction code when said register is designated by said register field, said register connector circuit controls only one of said input and output connector circuit corresponding to said designated register, to connect said designated register to one of said input and output bus corresponding to said designated register; and
a floating preventive circuit for receiving and decoding said instruction code when said register is designated by said designated register field, said floating preventive circuit controls one of said input and output connector circuit corresponding to said designated register to connect each one of said registers in all said register groups, with the exception of said registers in all said register groups, with the exception of said register group including said designated register, to one of said input and output bus.

18. An operation unit according to claim 12, wherein said instruction decoder has a register field determining means for identifying a position of said register field in said instruction code, and for determining which bus in said input or output buses is to be connected to said register, when said register is designated by said register field;
wherein said register connector circuit comprises:
an input register field code generating circuit, for generating a register field code that designates a register for said input connector circuit, based on data from said register field in said instruction code, when said register field determining means determines that said input bus is to be connected to said designated register;
an output register field code generating circuit, for generating a register field code that designates a register for said output connector circuit corresponding to said designated register, based on data from said register field in said instruction code, when said register field determining means determines that said output bus is to be connected to said designated register;
an input control decoder group, corresponding to each input connect circuit in said input connector circuit groups, for decoding said register field code generated by said input register field code generating circuit, to control said input connector circuit corresponding to said designated register in each of said input connector circuit groups; and an output control decoder group, corresponding to each output connector circuit in each of said output connector circuit groups, for decoding said register field code generated by said output register field code generating circuit, to control said output connector circuit corresponding to said designated register in each of said output connector circuit groups; and wherein said floating preventive circuit comprises:

an input floating preventive decoder group, corresponding to each said input connector circuit in each of said input connector circuit groups, for decoding said register field code generated by said input register field code generating circuit, to control each said input connector circuit, such that each one of said registers in all of said register groups, with the exception of said register group including said designated register in said input connector circuit groups, is connected to the corresponding input bus in said paired buses; and an output floating preventive decoder group, corresponding to each said output connector circuit in said output connector circuit groups, for decoding said register field code generated by said output register field code generating circuit, to control said output connector circuit, such that each one of said registers in all of said register groups, with the exception of said register group including said designated register in said output connector circuit groups, is connected to the corresponding output bus in said paired buses.

19. An operation unit according to claim 18, further comprising:

a computing element provided between said paired buses, for inputting data transferred, via said output bus in each one of said paired buses, as an operand number and an operating number, and for executing an operation based on said operand number and said operating number;

first and second computing element input connector circuit groups, provided between said paired buses, for connecting an operand number input portion and an operating number input portion of said computing element, to said output bus in said paired buses;

a shifter connected to said input bus in said paired buses, to shift a result calculated by said computing element every "n" digits;

a computing element output connector circuit group provided between said paired buses, to connect an output side of said computing element to said shifter;

an output bus determining means provided with said output register field code generating circuit, for determining said output bus in said output bus group that is to be connected to said designated register;

an input portion determining means provided with said instruction decoder, for decoding said instruction code, to determine which one of said operand number input portion and said operating number input portion, inputs data; and connector circuit control means provided with said instruction decoder, for controlling a computing element input connector circuit in one of said first and second computing element input connector circuit groups, based on the resulting determination by said output and input bus determining means.

20. An operation unit according to claim 19, wherein said input register field code generating circuit comprises an input bus determining means, for designating an input bus to be connected to said designated register in said input bus group; and wherein said instruction decoder includes shifter control means for controlling said shifter, to output a result from said computing element to said input bus designated by said input bus determining means.

21. An operation unit according to claim 18, further comprising a state counter for counting the state in each instruction code, and wherein said instruction decoder comprises:

input decode signal output means, for outputting a direct decode signal decoded by said instruction decoder, based on state information from said state counter, or a decode signal from each said input control decoder group, to said input connector circuit corresponding to said designated register; and output decode signal output means for outputting a direct decode signal decoded by said instruction decoder based on state information from said state counter, or a decode signal from each said output control decoder group, to said output connector circuit corresponding to said designated register.

22. An operation unit according to claim 12, wherein said register includes an input register, having higher and lower portions, for loading at least one of a first operand number having a predetermined bit, or a second operand number having a higher portion and a lower portion, and an output register for loading an operation result of said operation unit, said operation unit further comprising:

first operation means for executing a first operation with said first and second operand numbers;

second operation means for shifting an operation result of said first operation means, by a predetermined bit, in a predetermined direction; and third operation means for executing a third operation with data loaded in said output register and an output of said second operation means, said operation unit loading said first operand number and one of said higher portion and said lower portion of said second operand number into said one of said higher portion and said lower portion of said input register;

said operation unit transferring data loaded in said input register to said first operation means, to execute said first operation with said first operand number and one of said higher portion and said lower portion of said second operand number;

said operation unit causing said second operation means to shift said operation result by said predetermined bits in said predetermined direction;

said operation unit causing said third operation means to execute said third operation with data loaded into said output register and said output of said second operation means;

said operation unit loading said operation result of said third operation into said output register, and said operation unit loading one of said lower portion and said higher portion of said second operand number into one of said lower portion and said higher portion of said input register;

said operation unit transferring said data, in said input register, to said first operation unit, to execute said first operation with said first operand number and one of said lower portion and said higher portion of said second operand number;

said operation unit causing said second operation means to shift said operation result of said first operation result by said predetermined bit in said predetermined direction; and said operation unit causing said third operation means to execute said third operation with said data loaded in said output register and said output of said second operation means, and loading a resulting data into said output register.

23. An operation unit according to claim 22, further comprising:

a first latch having at least $(N+\frac{1}{2}M)$ bits at an input side of said first operation means; and second and third latches having at least $(N+\frac{1}{2}M)$ bits at an input side of said third operation means, where the digit of said first operand number is "N", N being a natural number, and the digit of said second operand number is "M", M being a natural number.

24. An operation unit according to claim 23, wherein said first operation is a multiplication operation, and wherein said third operation is an addition operation.

* * * * *